US011648677B2

(12) United States Patent
Taylor et al.

(10) Patent No.: US 11,648,677 B2
(45) Date of Patent: May 16, 2023

(54) AUTOMATIC WHEEL CHANGER ROBOT

(71) Applicant: Vehicle Service Group, LLC, Madison, IN (US)

(72) Inventors: Steven Taylor, Madison, IN (US); Gerry Lauderbaugh, Madison, IN (US); Robert Elliott, Madison, IN (US)

(73) Assignee: Vehicle Service Group, LLC, Madison, IN (US)

( * ) Notice: Subject to any disclaimer, the term of this patent is extended or adjusted under 35 U.S.C. 154(b) by 228 days.

(21) Appl. No.: 16/886,320

(22) Filed: May 28, 2020

(65) Prior Publication Data

US 2020/0376671 A1 Dec. 3, 2020

Related U.S. Application Data

(60) Provisional application No. 62/853,685, filed on May 28, 2019.

(51) Int. Cl.
*B25J 9/16* (2006.01)
*B25J 11/00* (2006.01)
(Continued)

(52) U.S. Cl.
CPC .......... *B25J 9/1687* (2013.01); *B25J 9/1697* (2013.01); *B25J 11/005* (2013.01);
(Continued)

(58) Field of Classification Search
CPC .... B25J 19/023; B25J 15/0052; B25J 11/005; B25J 9/1697; B25J 9/1687;
(Continued)

(56) References Cited

U.S. PATENT DOCUMENTS 5,125,298 A * 6/1992 Smith .................. B23P 19/069
81/57.35
5,257,443 A * 11/1993 Tanimura .............. B60B 29/002
29/33 R
(Continued)

FOREIGN PATENT DOCUMENTS

| JP | 59118277 A * | 7/1984 | .......... B23K 9/1272 |
| WO | WO-0101068 A1 * | 1/2001 | .......... G01B 11/002 |
| WO | WO 2022/026776 A1 | 2/2022 | |

OTHER PUBLICATIONS

Screen capture from YouTube video clip entitled "TIREBOT—A Tire workshop roBOTic assistant," 1 page, uploaded on May 12, 2017, by user "ECHORD Plus Plus". Retrieved from Internet: <https://www.youtube.com/watch?v=NwTe5aKiTcs>.

(Continued)

*Primary Examiner* — Jermie E Cozart
(74) *Attorney, Agent, or Firm* — Frost Brown Todd LLP

(57) ABSTRACT

An automatic wheel changer robot has a includes a drive assembly, a torque gun, a sensor assembly, and a controller. The drive assembly has a mobile base and two wheel-clamping assemblies, each configured to engage a wheel. The controller generates a set of instructions based, at least in part, on information obtained from the sensor assembly. The drive assembly uses the set of instructions to cooperatively remove respective wheels from respective hubs on a vehicle and/or attach respective wheels to respective hubs on a vehicle. The device may have lidar sensors and Mecanum wheels that the controller is programmed to use to move between respective hubs and wheel storage locations install wheels, replace wheels, rotate tires, and perform similar operations.

16 Claims, 45 Drawing Sheets

(51) Int. Cl.
    *B60B 29/00*     (2006.01)
    *B25J 15/00*     (2006.01)
    *B25J 19/02*     (2006.01)

(52) U.S. Cl.
    CPC ....... *B25J 15/0019* (2013.01); *B25J 15/0052* (2013.01); *B25J 19/023* (2013.01); *B60B 29/001* (2013.01); *B60B 2340/18* (2013.01); *B60B 2340/32* (2013.01); *B60B 2340/34* (2013.01); *B60B 2340/50* (2013.01); *B60B 2340/70* (2013.01)

(58) Field of Classification Search
    CPC .............. B60B 2340/18; B60B 29/001; B60B 2340/50; B60B 2340/34; B60B 2340/32
    See application file for complete search history.

(56) References Cited

U.S. PATENT DOCUMENTS

| | | | | |
|---|---|---|---|---|
| 5,345,675 | A | * | 9/1994 | Yamanaka ............. B62D 65/12 356/153 |
| 5,640,750 | A | * | 6/1997 | Yoshida ................. B62D 65/12 901/7 |
| 6,422,285 | B1 | * | 7/2002 | Gonzaga ............... B60C 25/132 157/1.24 |
| 10,773,550 | B1 | | 9/2020 | Downey et al. |
| 10,974,546 | B2 | | 4/2021 | Downey et al. |
| 11,059,325 | B2 | | 7/2021 | Downey et al. |
| 11,203,228 | B2 | | 12/2021 | Mica et al. |
| 2009/0297307 | A1 | * | 12/2009 | Laffitte Figueras ... B62D 65/12 414/429 |
| 2011/0048649 | A1 | * | 3/2011 | Komatsu .................. B25J 15/10 157/1.35 |
| 2021/0003453 | A1 | | 1/2021 | Ruther et al. |
| 2021/0003454 | A1 | | 1/2021 | Ruther et al. |
| 2021/0004970 | A1 | | 1/2021 | Ruther et al. |
| 2021/0005031 | A1 | | 1/2021 | Brauer et al. |
| 2021/0114408 | A1 | | 4/2021 | Darolfi |
| 2021/0339991 | A1 | | 11/2021 | Russchen et al. |
| 2022/0072899 | A1 | | 3/2022 | Mica et al. |

OTHER PUBLICATIONS

Screen capture from YouTube video clip entitled " IBG—First fully automatic wheel assembly at Ford," 1 page, uploaded on Feb. 20, 2015, by user "IBG Automation". Retrieved from Internet: <https://www.youtube.com/watch?v=imnAYcF05Yo>.

Screen capture from YouTube video clip entitled " RoboTire," 1 page, uploaded on Nov. 5, 2021, by user " Hunter Engineering". Retrieved from Internet <https://www.youtube.com/watch?v=oyPWuKuqs0E>.

* cited by examiner

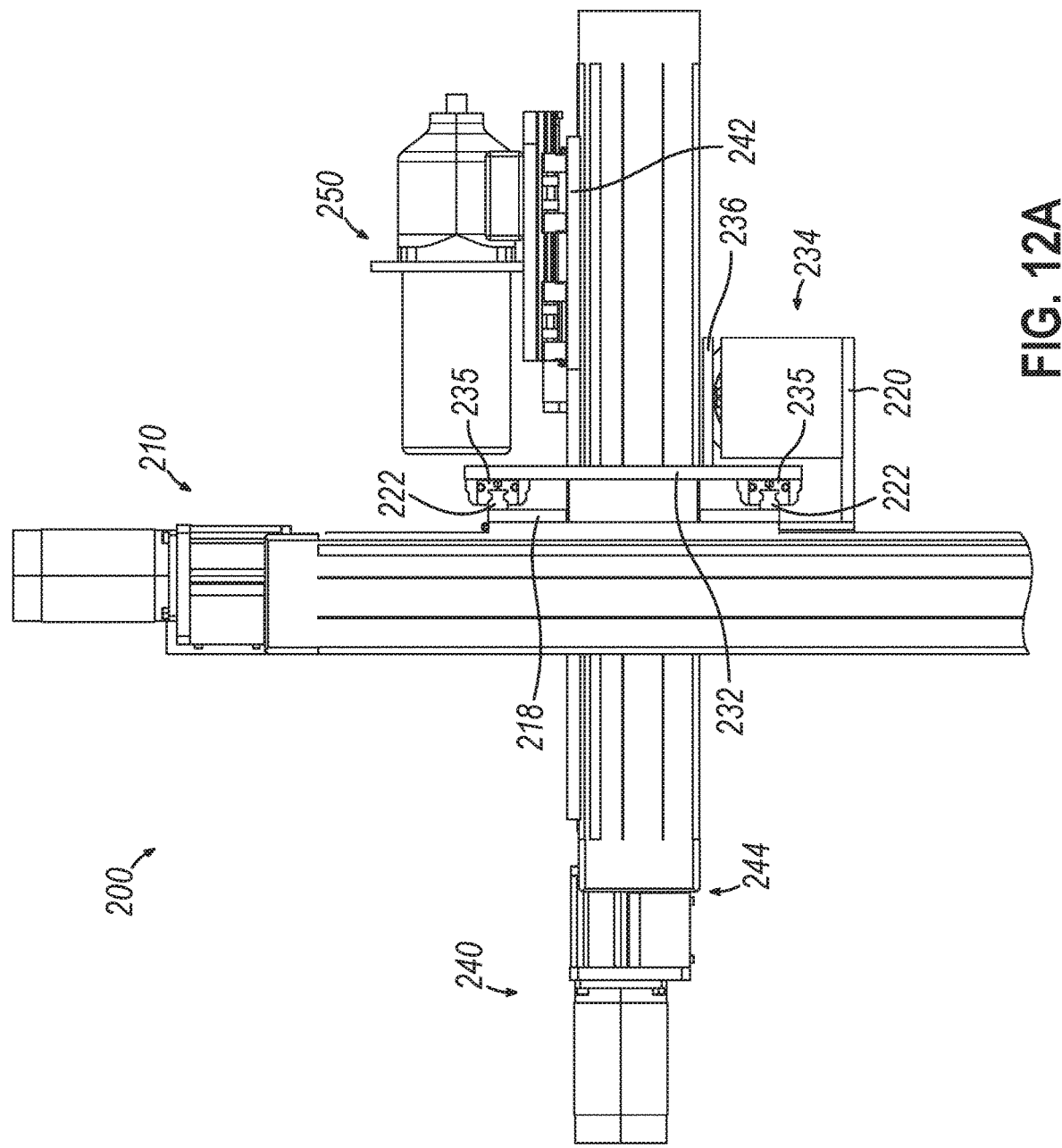

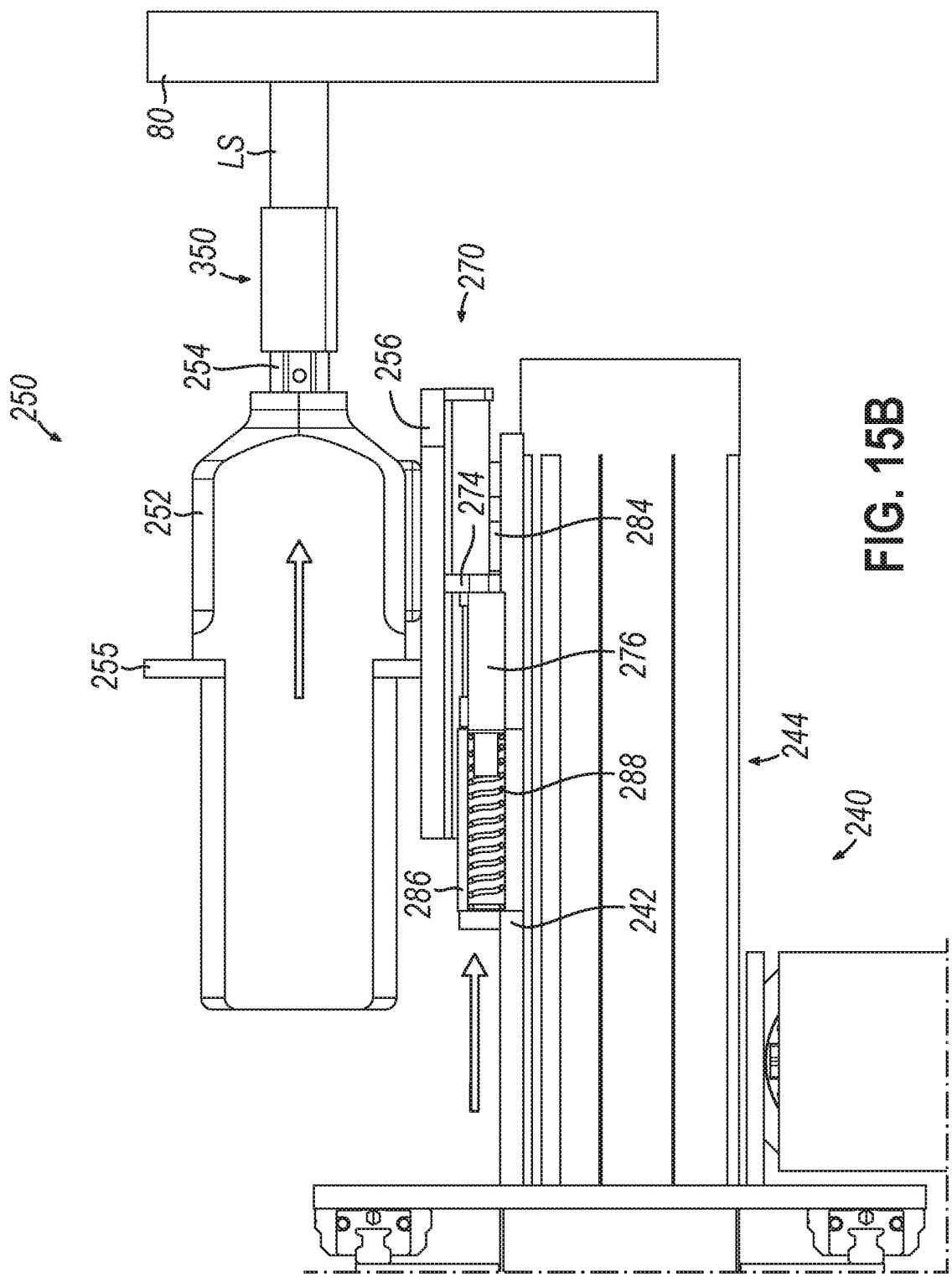

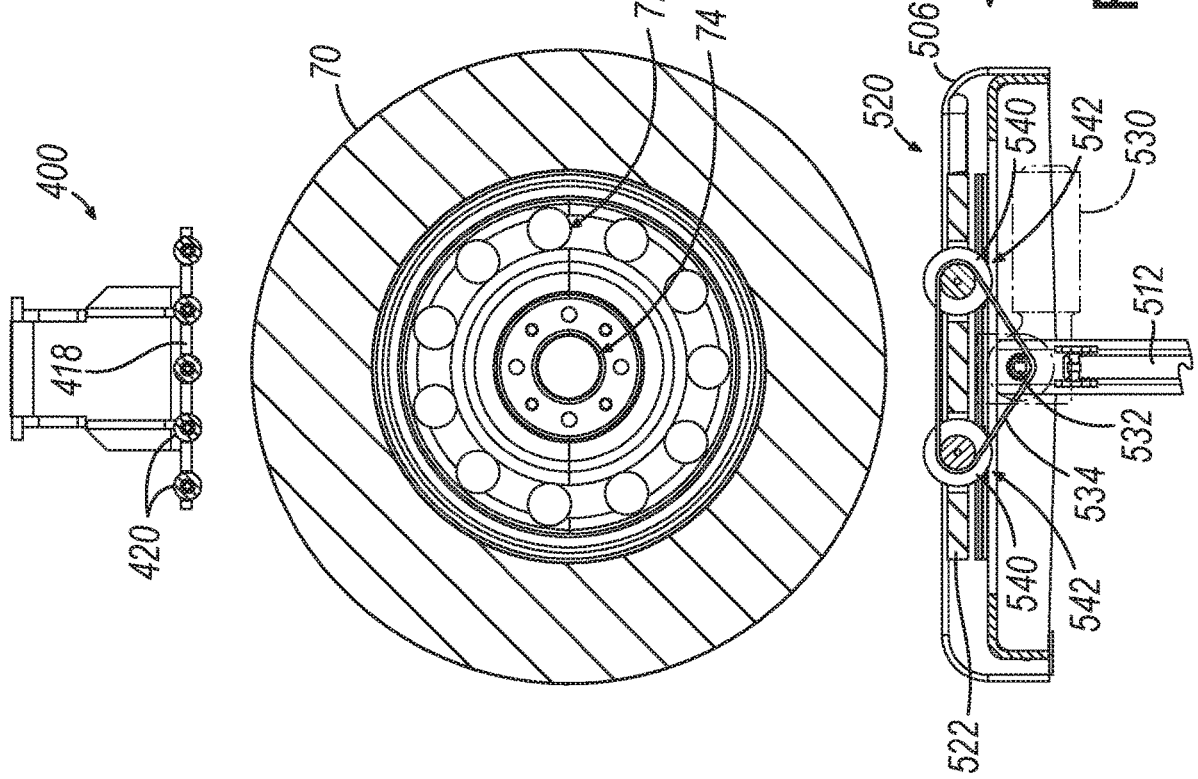

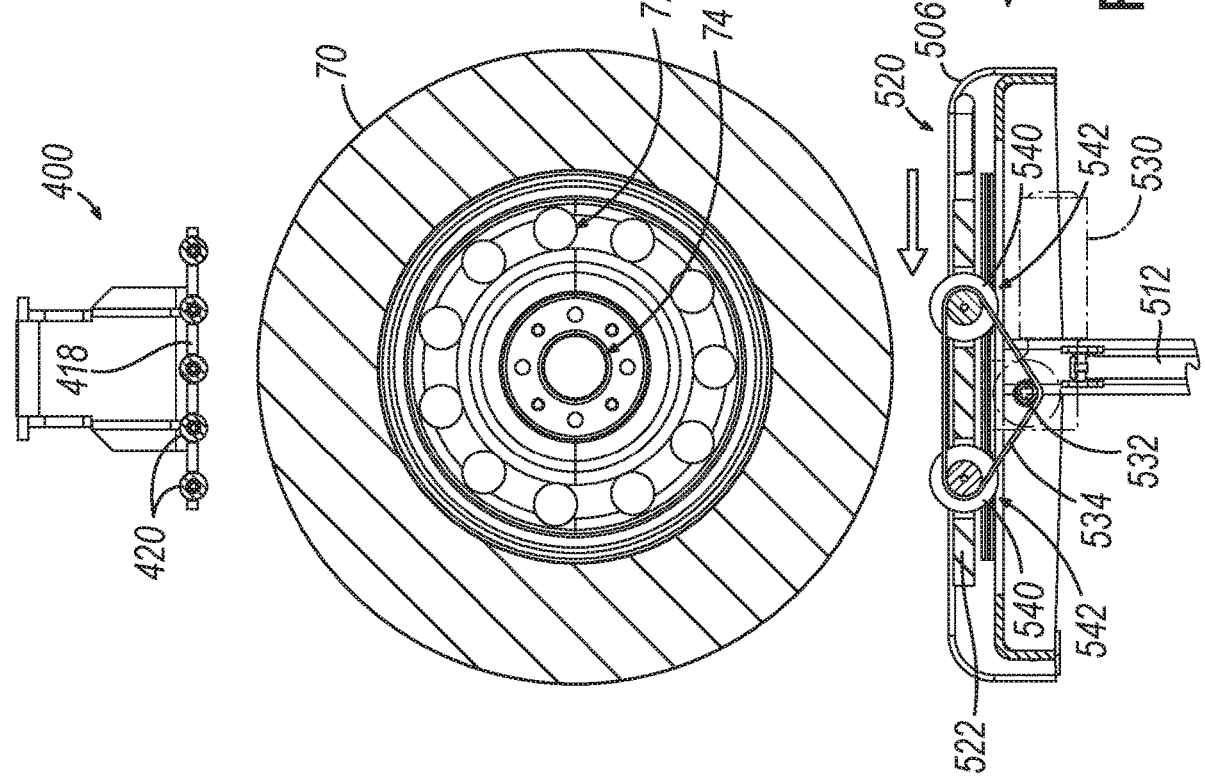

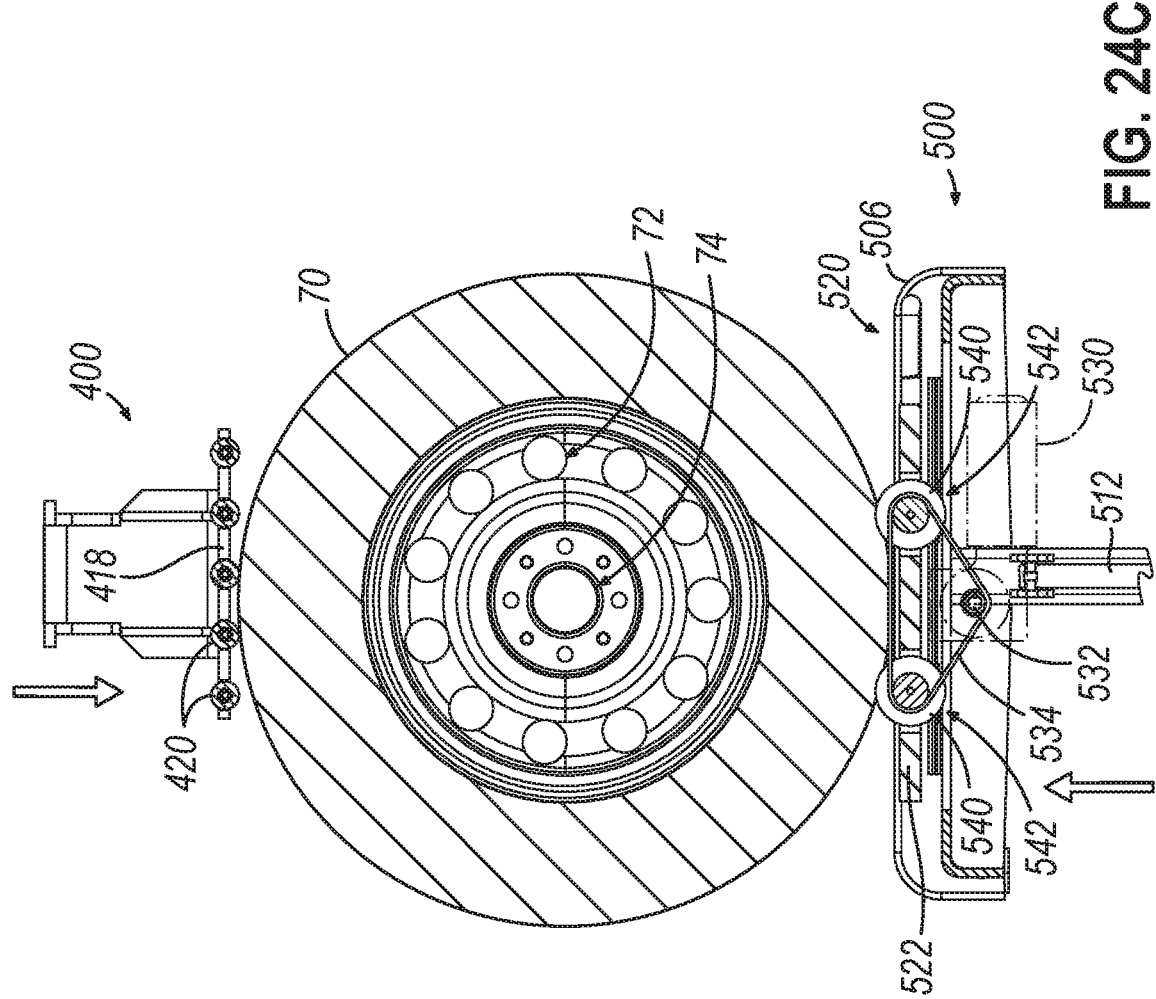

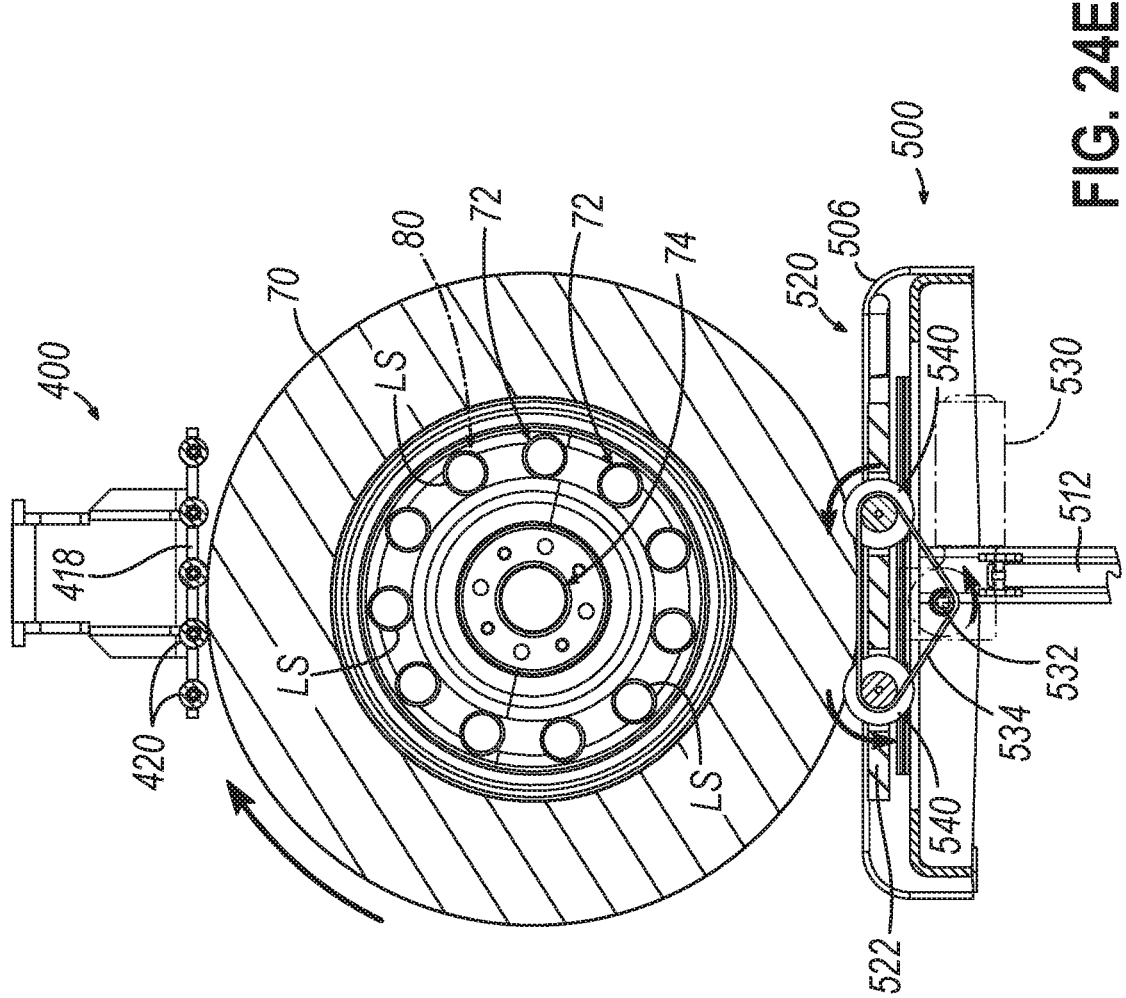

AUTOMATIC WHEEL CHANGER ROBOT

REFERENCE TO RELATED APPLICATION

This is a nonprovisional of, claims priority to, and hereby incorporates by reference U.S. Provisional Application 62/853,685, which was filed on May 28, 2019, with title AUTOMATIC WHEEL CHANGER ROBOT.

BACKGROUND

When a vehicle is being serviced, wheels (such as tires) on the vehicle may be rotated or replaced by a technician utilizing their hands and manually operated hand tools. Similarly, when a vehicle is being assembled, wheels may be initially installed on the hub assembly of the vehicle by a technician. Rotating wheels on a vehicle may include removing the lug nuts from the hub assemblies when wheels are attached to the corresponding hub assembly, removing the wheels from the corresponding hub assembly, reattaching the wheels to different hub assemblies of the same vehicle, and then reattaching the lug nuts to the lug studs of each hub assembly to suitably fix the wheels to their new corresponding hub assembly. Wheels may be rotated in various suitable patterns, which are usually determined by the Original Equipment Manufacturer (OEM) as will be understood by those skilled in the art. Currently, technicians are required to manually operate tools in order rotate, replace, or initially install wheels on a vehicle. In some instances, such as while a vehicle is being assembled, factory floor equipment is also used to help install new wheels on a vehicle in an assembly line within tightly controlled parameters.

While a variety of tire changing/installing equipment has been made and used, it is believed that no one prior to the inventor(s) has made or used an invention as described herein.

SUMMARY

A robotic wheel changing device includes a drive assembly, a torque gun, a sensor assembly, and a controller. The drive assembly has a mobile base and two wheel-clamping assemblies, each configured to engage a wheel. The controller generates a set of instructions based, at least in part, on information obtained from the sensor assembly. The drive assembly uses the set of instructions to cooperatively remove respective wheels from respective hubs on a vehicle and/or attach respective wheels to respective hubs on a vehicle. The device may have lidar sensors and Mecanum wheels that the controller is programmed to use to move between respective hubs and wheel storage locations install wheels, replace wheels, rotate tires, and perform similar operations.

BRIEF DESCRIPTION OF THE DRAWINGS

While the specification may conclude with claims which particularly point out and distinctly claim the invention, it is believed the present invention will be better understood from the following description of certain examples taken in conjunction with the accompanying drawings, in which like reference numerals identify the same elements and in which:

FIG. 12A in an elevated side view of the torque gun actuation assembly of FIG. 9, where the torque gun assembly of FIG. 11A is in a first longitudinal position;

FIG. 15B is a partial cross-sectional side view of the longitudinal actuation assembly of FIG. 13 and the torque gun assembly of FIG. 11A, where the socket housing a lug nut of FIG. 15A is initially engaged with a lug stud, where the trolley of FIG. 15A is in a second position, where the torque gun assembly is in the first position relative to the trolley;

FIG. 24A is a cross-sectional rear plan view of the upper and lower wheel-clamping assemblies of FIG. 20A positioned adjacent to a wheel prior to clamping the wheel;

FIG. 24B is a cross-sectional rear plan view of the upper and lower wheel-clamping assemblies of FIG. 20A, where the drive roller assembly of FIG. 23 is moved laterally to suitably align with a vertical center of the wheel of FIG. 24A;

FIG. 24C is a cross-sectional rear plan view of the upper and lower wheel-clamping assemblies of FIG. 20A actuated to cooperatively grasp the wheel of FIG. 24A;

FIG. 24E is a cross-sectional rear plan view of the upper and lower wheel-clamping assemblies of FIG. 20A gripping the wheel of FIG. 24A, where the drive roller assembly of FIG. 23 rotates the wheel such that the lug stud openings of the wheel are rotationally aligned with the lug studs of a hub assembly;

Figure 1:
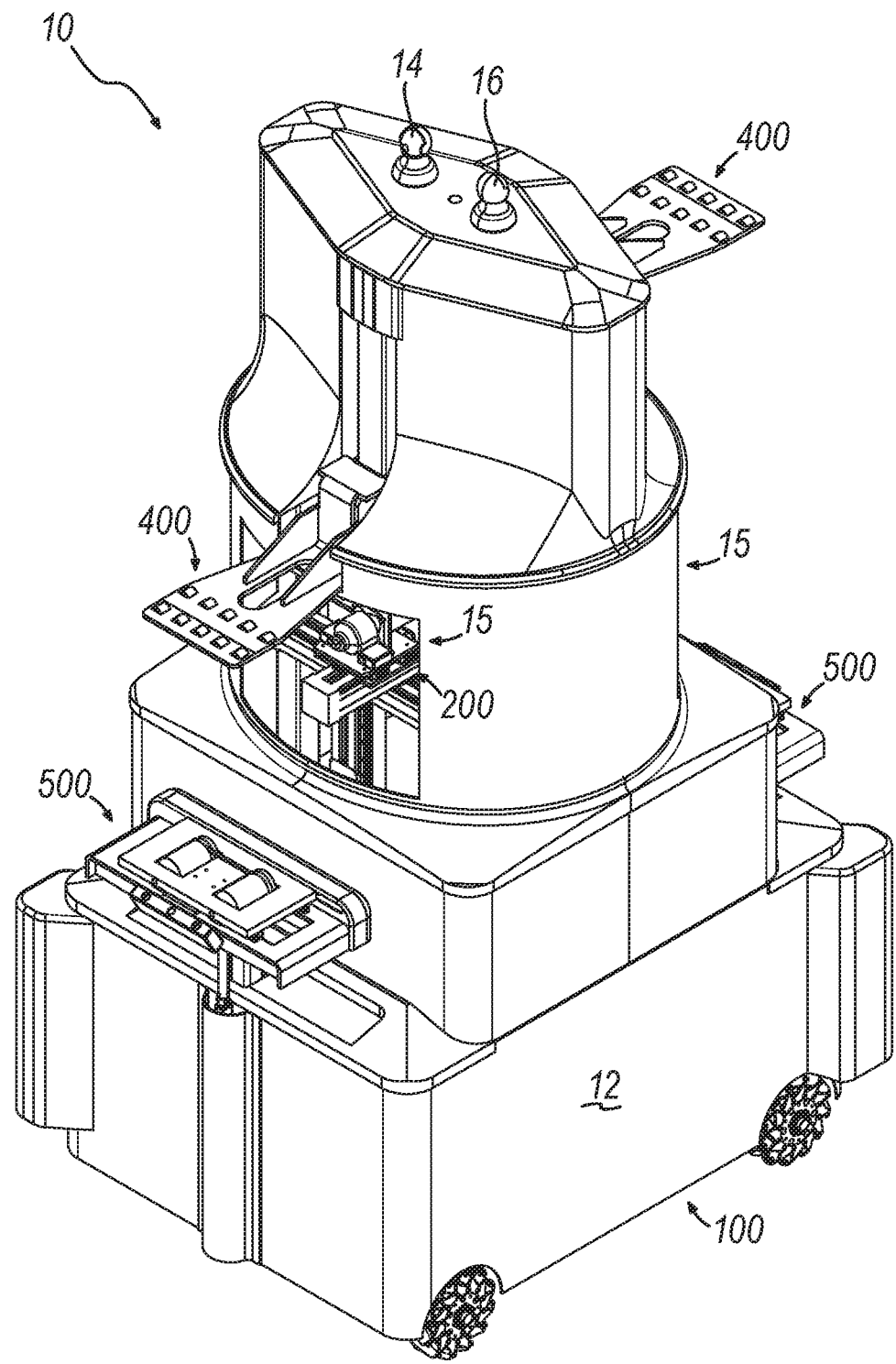
FIG. 1 is a perspective view an exemplary automatic wheel changer robot assembly.
Figure 2:
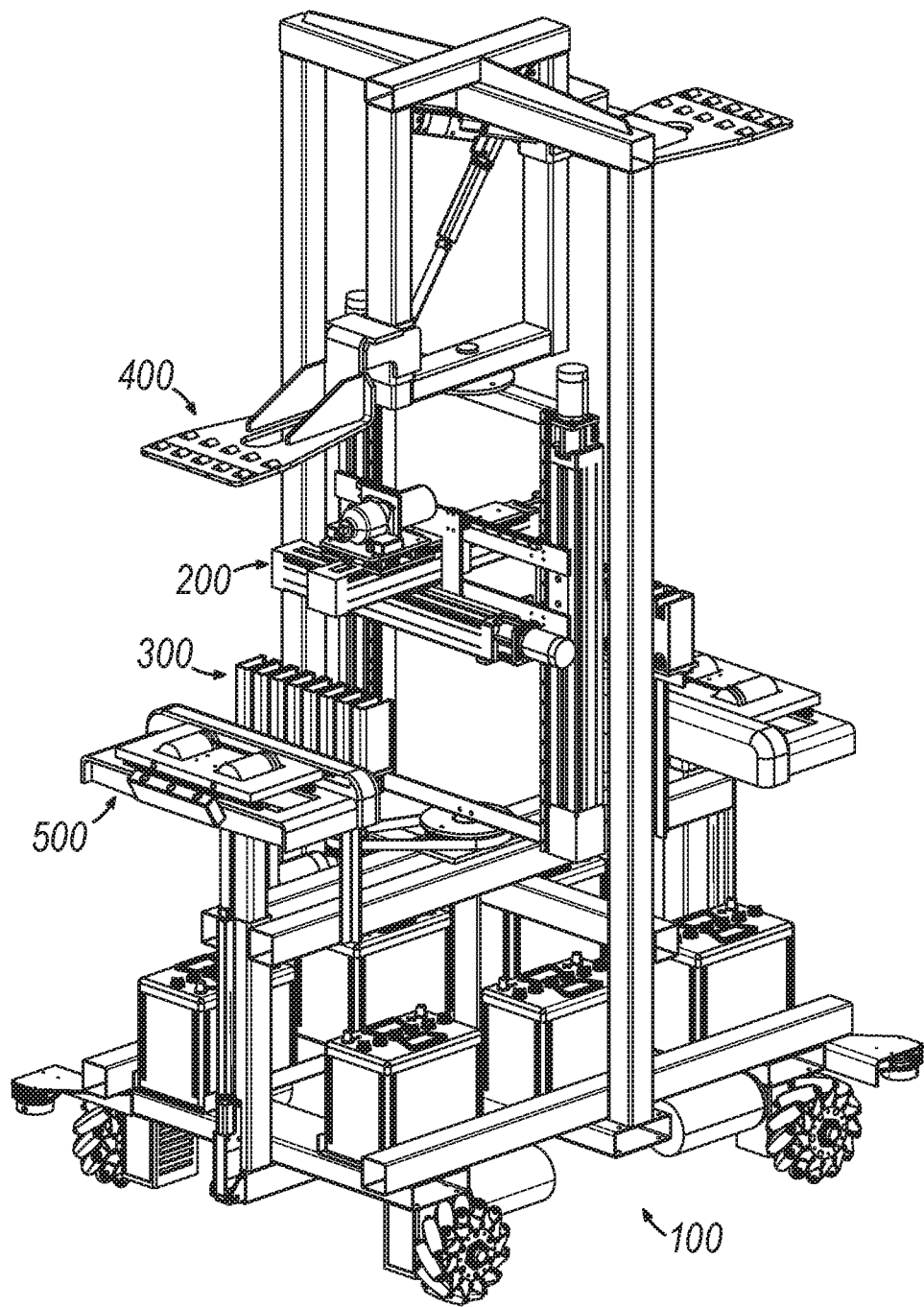
FIG. 2 is a perspective view of the automatic wheel changer robot assembly of FIG. 1, with an external casing omitted to reveal internal components.
Figure 3:
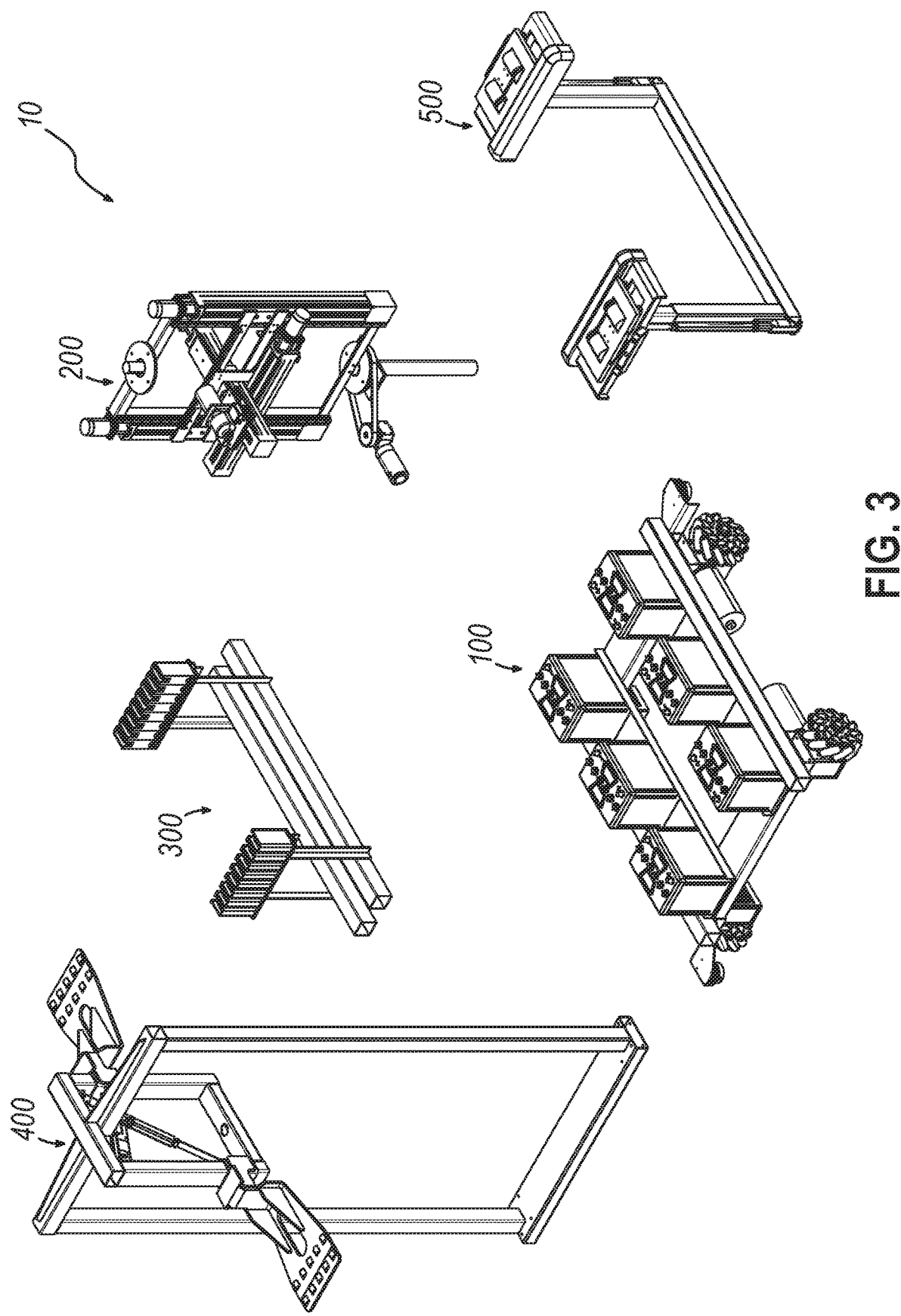
FIG. 3 is an exploded perspective view of the automatic wheel changer robot assembly of FIG. 1, with the external casing omitted to reveal internal components.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the resent invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is, by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

I. Overview of Exemplary Automatic Wheel Changer Robot Assembly

As mentioned above, the process of rotating, replacing, or initially installing wheels (e.g. tires) on a vehicle involves a technician utilizing manual tools to remove and attach lug nuts, as well as utilizing their hands to attach and remove wheels to/from hub assemblies. When rotating tires on a vehicle, the technician should keep track of individual tires in order to reattach tires to the appropriate hub assembly, as generally recommended by the OEM. When attaching tires to a hub assembly, the technician will have to suitably align lug studs of a hub assembly with lug stud openings of a tire prior to coupling the tire with the hub assembly. Additionally, once the tire is coupled with hub assembly, the technician may have to reapply lug nuts to lug studs of a hub assembly in a specified pattern with specified torque limits.

While rotating, replacing, or initially installing tires, a technician may take longer than desired to rotate, replace, or initially install tires. Alternatively, it may be desirable for the technician to utilize their time on other tasks instead of rotating, replacing, or installing tires. Additionally, a technician may accidentally commit errors during the tire rotation/installation process. For instance, the technician may lose track of individual tires during the rotation process, such that tires are reattached to the wrong hub assembly of a vehicle; or a technician may attach lug nuts to lug studs at a wrong torque value, or in the wrong coupling pattern. Therefore, it may be desirable to have a robotic assembly configured to rotate, replace, or initially install tires on a vehicle, such that a technician only has to initiate a request for tires to be rotated/replaced/installed, and the robot then completes the desired task.

Figure 15A:
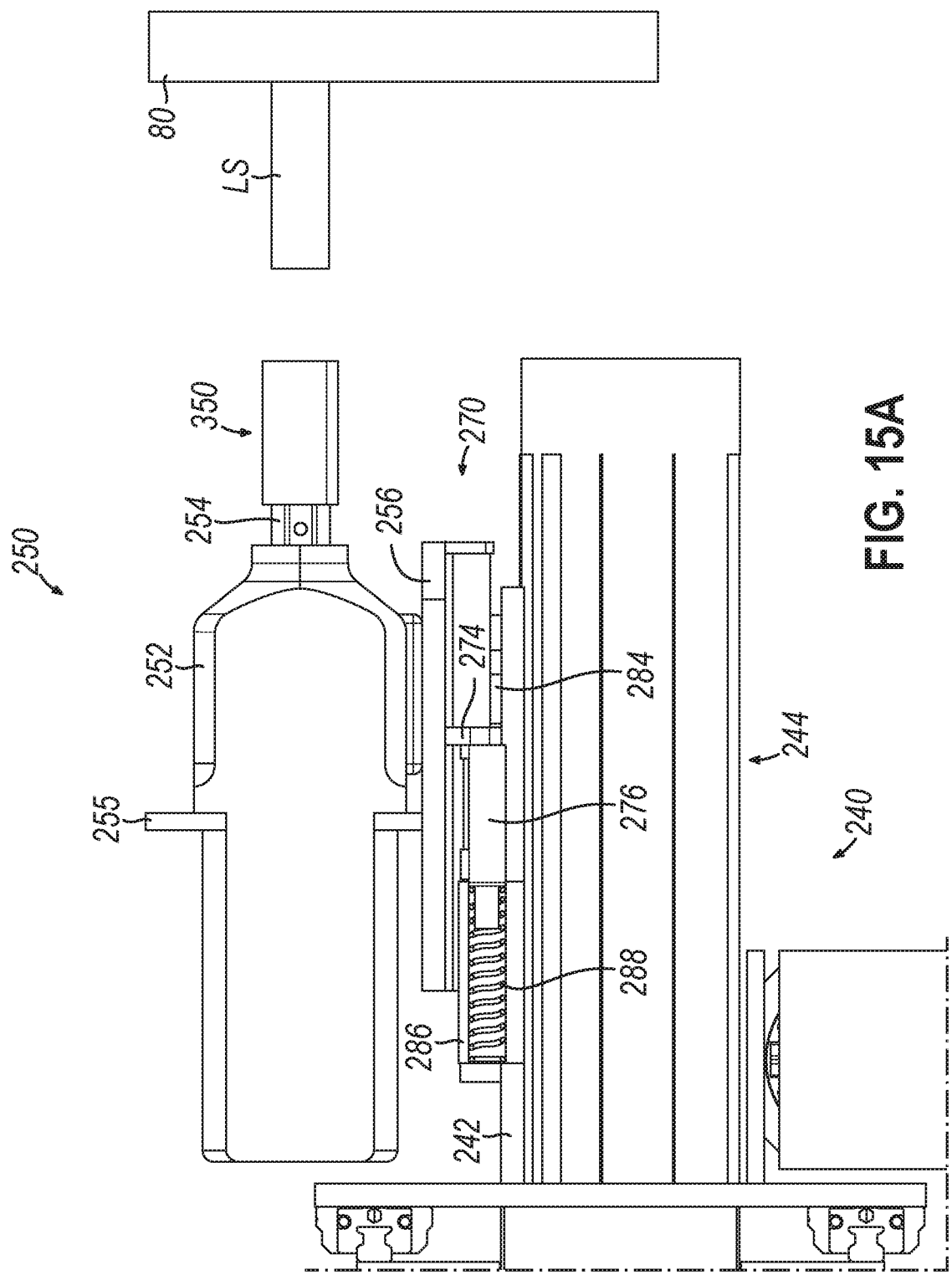
FIG. 15A is a partial cross-sectional side view of the longitudinal actuation assembly of FIG. 13 and the torque gun assembly of FIG. 11A, where a socket housing a lug nut is disengaged with a lug stud, where a trolley of the longitudinal actuation assembly is in a first position, where the torque gun assembly is in a first position relative to the trolley.
Figure 24D:
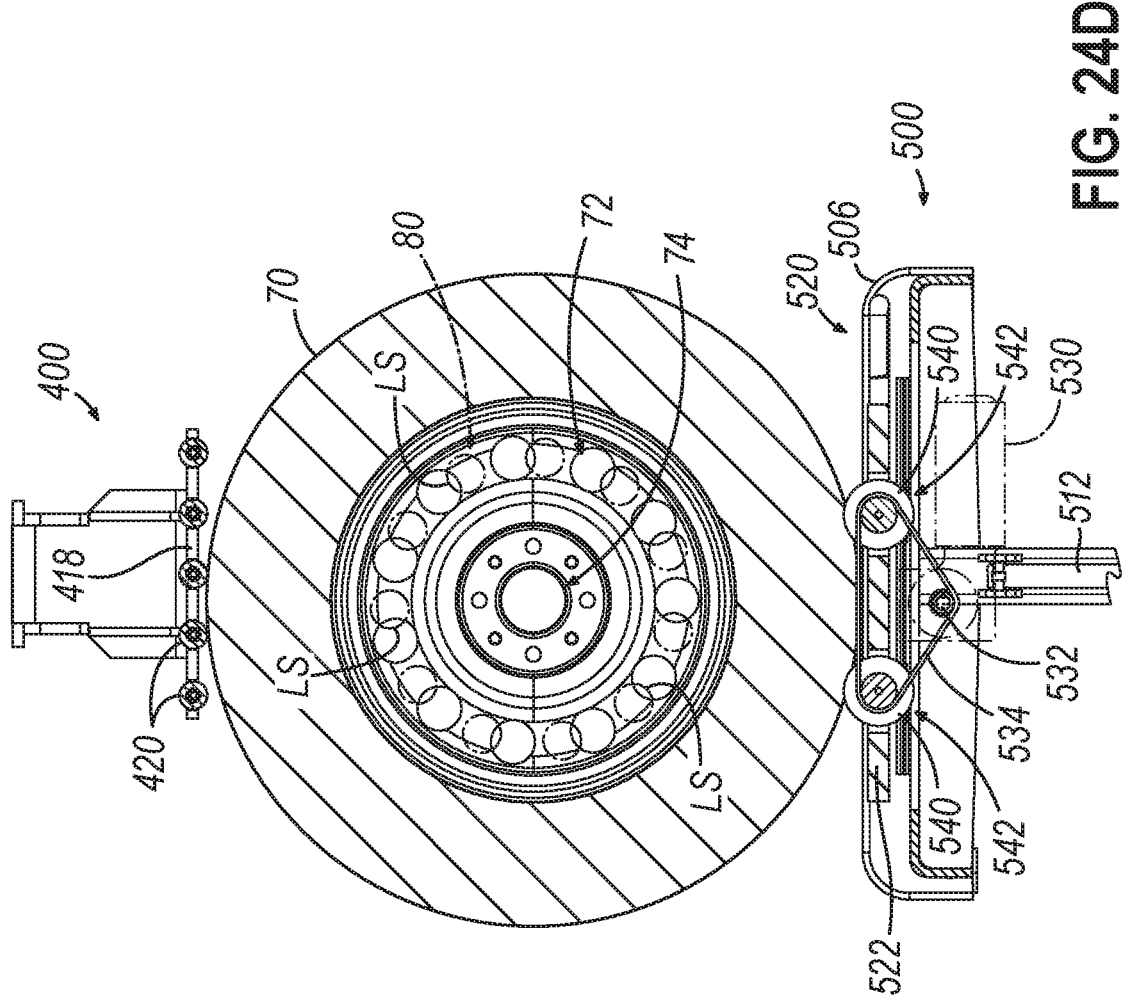
FIG. 24D is a cross-sectional rear plan view of the upper and lower wheel-clamping assemblies of FIG. 20A gripping the wheel of FIG. 24A, where the lug stud openings of the wheel are rotationally misaligned with the lug studs of a hub assembly.

FIGS. 1-4 show an exemplary automatic wheel changer robot assembly (10) that may be used to rotate, change, or install tires (70) (as shown in FIGS. 24A-24E) on one or more hub assemblies (80) of a vehicle (as shown in FIGS. 15A-15A and 24D-24E). Robot assembly (10) includes an external casing (12), a pair of cameras (14, 16) attached to the top of external casing (12), a mobile base assembly (100), a torque gun actuation assembly (200), a socket holder assembly (300), an upper wheel-clamping assembly (400), and a lower-wheel-clamping assembly (500).

As will be described in greater detail below, mobile base assembly (100) is configured to actuate robot assembly (10) around a shop floor in order for torque gun actuation assembly (200), upper wheel-clamping assembly (400), and lower wheel-clamping assembly (500) to suitably interact with tires (70) and hub assemblies (80) of the vehicle in accordance with the description herein. As will also be described in greater detail below, torque gun actuation assembly (200), in conjunction with socket holder assembly (300), is configured to selectively engage lug nuts and lug studs (LS) of wheel hub assemblies in order to suitably couple and decouple lug nuts with lug studs (LS). As will also be described in greater detail below, upper wheel-clamping assembly (400) and lower wheel-clamping assembly (500) are configured to selectively grasp (by moving into an engaged position) and rotate tires (70) so robot assembly (10) may remove tires (70) from a first hub assembly (80), and then reattach tires (70) to a second hub assembly (80). Upper wheel-clamping assembly (400) and lower wheel-clamping assembly (500) then release tires (70) by moving into a disengaged position.

External casing (12) defines a pair of windows (15) for a torque gun (252) of torque gun actuation assembly (200) to extend out of in order to selectively engage hub assembly (80) of vehicles. Each wheel-clamping assembly (400, 500) includes a pair of independently controlled clamps located adjacent to a respective window (15). Therefore, as will be described in greater detail below, wheel-clamping assemblies (400, 500) are configured to control two tires (70), at one time, independently of each other, such that torque gun (252) may extend through a respective window (15) in order to suitably interact with each tire (70) grasped by wheel-clamping assemblies (400, 500) and corresponding hub assembly (80).

Figure 4:
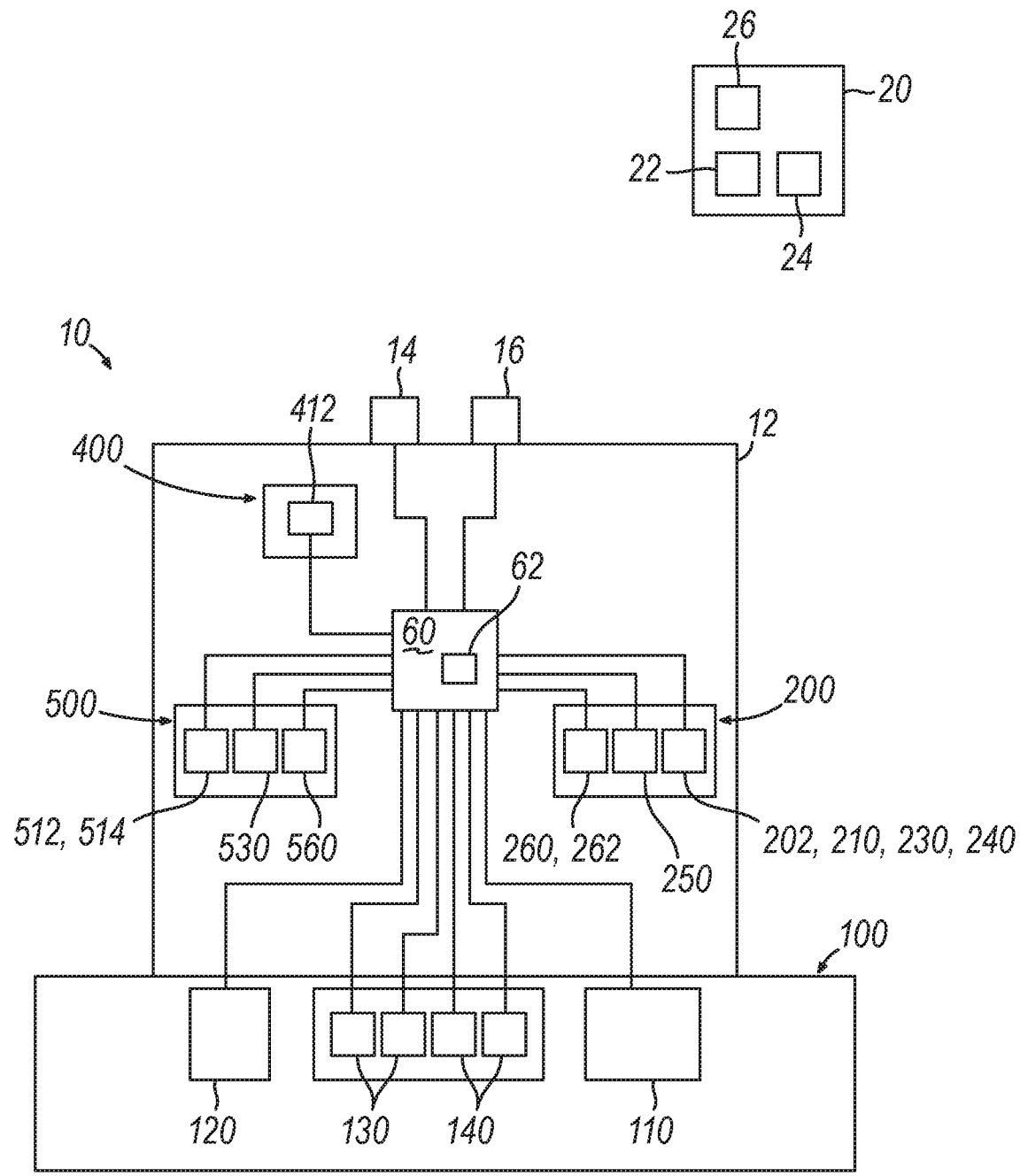
FIG. 4 is a schematic view of the automatic wheel changer robot assembly and a central external processing unit.
Figure 5:
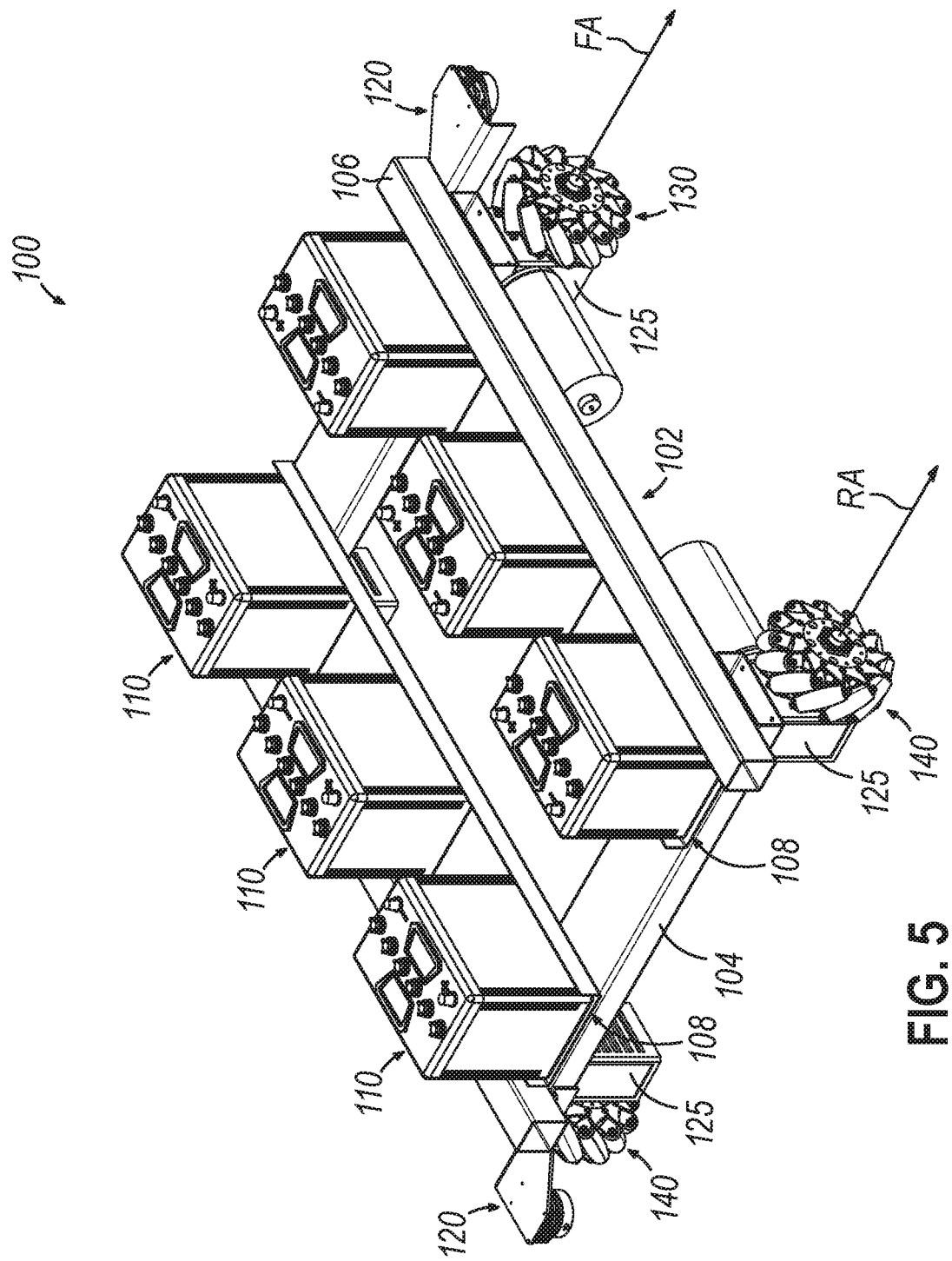
FIG. 5 is a perspective view of a mobile base assembly of the automatic wheel changer robot assembly of FIG. 1.
Figure 6:
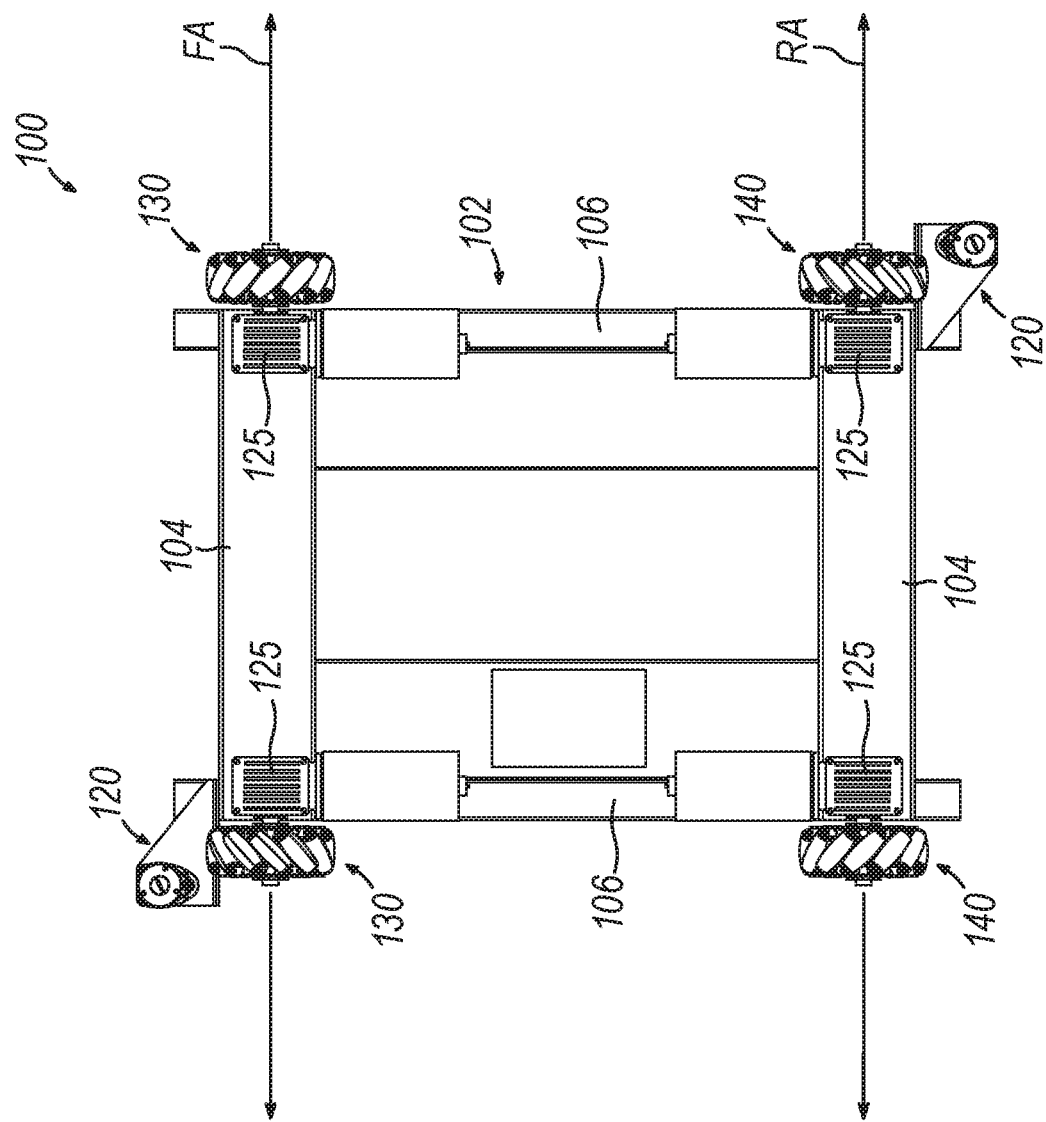
FIG. 6 is a bottom plan view of the mobile base assembly of FIG. 5.

As best seen in FIG. 4, robot assembly (10) also includes an internal processing and storage unit (60) housed within robot assembly (10). Therefore, internal processing and storage unit (60) is configured to travel with robot assembly (10) during exemplary use. Processing and storage unit (60) includes a wireless communication device (62) configured to establish communication between processing and storage unit (60) and a central/external processing unit (20). External processing unit (20) includes a wireless communicator (22), a storage device (24), and processor (26) in communication with each of the other components of external processing unit (20).

External processing unit (20) and internal processing unit (60) are configured to communicate with each other via wireless communication devices (22, 62). Internal unit (60) may communicate various suitable data to external unit (20). For instance, internal unit (60) may communicate information obtained from robot assembly (10) during exemplary use. External unit (20) may use this information to modify or update software algorithms and upload the modified or updated software to robot assembly (10). Additionally, external unit (20) may upload information obtained from one robot assembly (10) to multiple robot assemblies (10).

External unit (20) may also upload any other suitable information or software to robot assembly (10) as would be apparent to one having skill in the art in view of the teachings herein. For instance, external unit (20) may obtain software updates via an outside source, such as a CD-ROM or the internet, and upload the software updates to internal unit (60). External unit (20) may be configured to generate a command to robot assembly (10), such as an initial request to rotate tires (70) on a vehicle, as will be described in greater detail below.

Processing and storage unit (60) may also be in communication with other suitable devices, such as a remote control (such as a stand-alone control unit or an application running on a smart phone, tablet, etc.) that allows a technician to input an activation request for robot assembly (10) to preform various commands as would be apparent to one of skill in the art in view of the teachings herein. Therefore, robot assembly (10) may be activated with an external device located within the shop or elsewhere. Additionally, or alternatively, robot assembly (10) may include a command center located on external casing (12) that allows a technician to directly input an activation request for robot assembly (10). Such a command center may include a touch screen, various buttons, etc. Additionally, or alternatively, robot assembly (10) may include a microphone such that a technician may vocally request a robot assembly (10) to perform one or more various functions. Other suitable means of requesting robot assembly (10) to perform a task will be apparent to those of skill in the art in view of the teachings herein.

Processing and storage unit (60) is configured in communication with various components of robot assembly (10). In particular, as will be described in greater detail below, processing and storage unit (60) is configured to receive information from various cameras, sensors, and actuating bodies of robot assembly (10), process that information, and instruct/command various actuating bodies of robot assembly (10) to perform various functions in accordance with the description herein.

Internal processing and storage unit (60) is in communication with cameras (14, 16), mobile base assembly (100), torque gun actuator assembly (200), upper wheel-clamping assembly (400), and lower wheel-clamping assembly (500). Processing and storage unit (60) is configured to store and run suitable software in order for robot assembly (10) to suitably complete the various tasks described herein. Additionally, processing storage unit (60) may store any suitable data obtained during activation of robot assembly (10), such as photos obtained by cameras, data obtained by assemblies, any type of operational monitoring data of various motors or actuators, etc.

As will be described in greater detail below, processing and storage unit (60) may be configured to utilize data obtained from one or more components and stored within unit (60), and/or to instruct other components (or the same component) in communication with unit (60) based on the obtained data. For example, processing storage unit (60) may determine a course of action for torque gun actuator assembly (200) based on data received from torque gun actuator assembly (200), mobile base assembly (100), and lower wheel-clamping assembly (500); or processing storage unit (60) may instruct mobile base assembly (100) based on data received from cameras (14, 16).

Internal processing and storage unit (60) may include a plurality of vehicle profiles, where each vehicle profile contains information related to a make, model, and year of a vehicle. Processing and storage unit (60) may utilize this information when completing a specific task, such as rotating tires, in accordance with the description herein. A technician may be asked to choose a vehicle profile prior to finalizing a request for robot assembly (10) to complete a task.

An exemplary vehicle profile may contain an OEM-recommended tire rotation pattern, the lug nut/bolt pattern and spacing, the lug nut/bolt socket size, the wheel base and wheel track width, the vehicle body length and width, the OEM-recommended lug nut/bolt torque values, any type of hub cap information, standard tire configuration used on the specific vehicle, distance from top of the vehicle wheel to the vehicle body, and the vehicle hub assembly diameter.

Unit (60) is configured to transmit and receive information with cameras (14, 16) in accordance with the description herein. Cameras (14, 16) are configured to rotate relative to external casing (12), pan up, and pan down in order to capture images in accordance with the description herein. Unit (60) may instruct cameras (14, 16) to rotate, pan up, pan down, and capture images. Camera (14, 16) may communicate images captured to unit (60) so unit (60) may analyze those images and instruct other components of robot assembly (10) in accordance with the description herein.

With regard to mobile base assembly (100), internal processing and storage unit (60) is in communication with one or more batteries (110), one or more collision avoidance detectors (for example, one or more lidar detectors), one or more wheel assemblies for movement of mobile base assembly (100) (for example, a pair of front Mecanum wheel assemblies (130) and a pair of rear Mecanum wheel assemblies (140)). Batteries (110) are configured to selectively power internal processing and storage unit (60) so unit (60) may operate in accordance with the description herein. Unit (60) is configured to transmit and receive information with lidar collision avoidance detectors (120) in accordance with the description herein. Unit (60) is also configured to transmit and receive information with Mecanum wheel assemblies (130, 140) to achieve the functionality described herein.

With regard to torque gun actuation assembly (200), internal processing and storage unit (60) is in communication with rotation actuation assembly (202), vertical actuation assembly (210), lateral actuation assembly (230), longitudinal actuation assembly (240), torque gun assembly (250), a pair of torque gun lidar assemblies (260), and a camera assembly (262). Unit (60) is configured to transmit and receive information with actuations assemblies (202, 210, 230, 240) in accordance with the description herein. Unit (60) is also configured to transmit and receive information with torque gun assemblies (250) in accordance with the description herein. Unit (60) is also configured to transmit and receive information to and from torque gun lidar assemblies (260) and camera (262) in accordance with the description herein.

With regard to upper wheel-clamping assembly (400), unit (60) is in communication with linear actuator (412) such that unit (60) may transmit and receive information from linear actuator (412) in accordance with the description herein. With regard to lower wheel-clamping assembly (500), unit (60) is in communication with vertical linear actuator (512), lateral linear actuator (514), a DC reduced-speed stepper motor (530), and a sensor assembly (560), which includes a pair of lidar assemblies (562) and a camera (564). Unit (60) is configured to transmit and receive information from vertical linear actuator (512), lateral linear actuator (514), a DC reduced-speed stepper motor (530), and a sensor assembly (560), which includes a pair of lidar assemblies (562) and a camera (564) in accordance with the description herein.

Internal unit (60) may be in bidirectional or unidirectional communication with various other suitable components of robot assembly (10) as would be apparent to one of skill in the art in view of the teachings herein.

Processing and storage unit (60) may establish communication between any of the suitable components herein via any suitable means as would be apparent to one skilled in the art in view of the teachings herein. For instance, unit (60) may be coupled with any of the above-mentioned components via communication wires housed within external casing (12). Unit (60) may be coupled with any the of the above-mentioned components via wireless communication.

Processing and storage unit (60) may include a processor, memory, storage device, and any other suitable components as would be apparent to one having skill in the art in view of the teachings herein. For example, processing and storage unit (60) may have a USB hub configured to selectively receive one or multiple USB storage devices. USB storage devices may upload information to internal unit (60), and/or USB storage devices may receive information from internal unit (60).

II. Exemplary Mobile Base Assembly

FIGS. 5-7F show mobile base assembly (100) in greater detail. As mentioned above, and as will be described in greater detail below, mobile base assembly (100) is configured to actuate robot assembly (10) around a shop floor.

Mobile base assembly (100) includes a base frame assembly (102), a plurality of batteries (110), a pair of lidar collision avoidance detectors (120), a pair of front Mecanum wheel assemblies (130), and a pair of rear Mecanum wheel assemblies (140).

Figure 8:
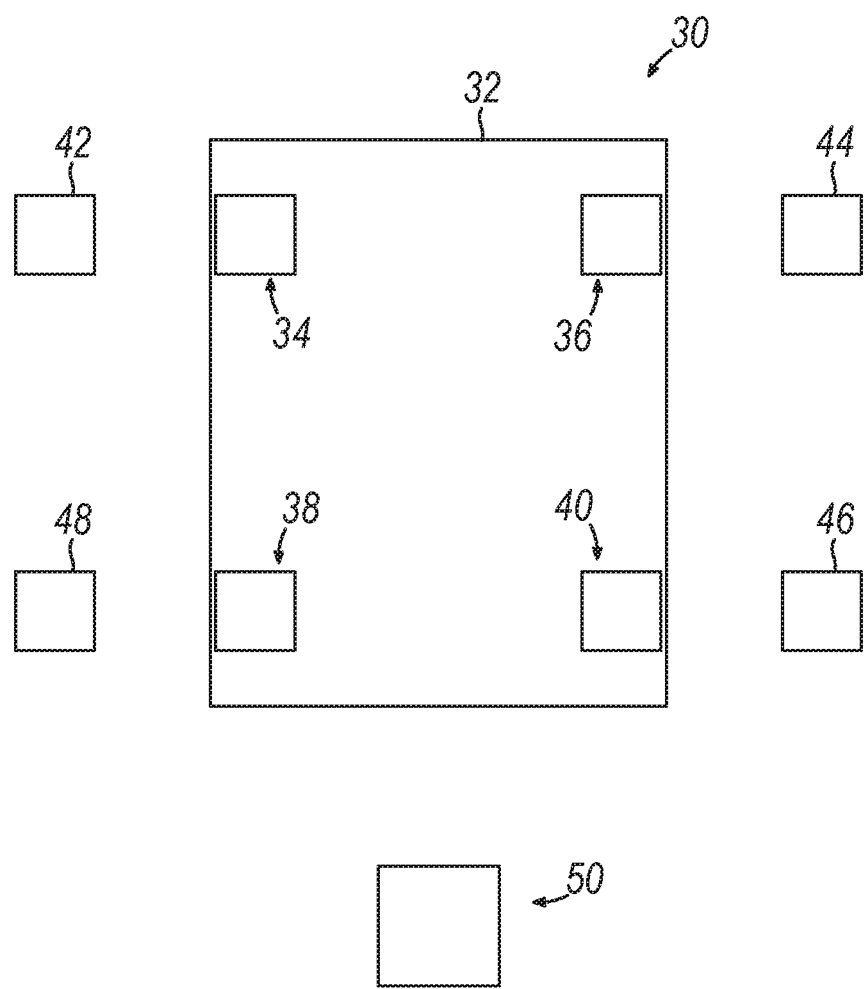
FIG. 8 is a schematic view of an exemplary shop floor having a general vehicle lift area, a home position for the automatic wheel changer robot assembly of FIG. 1, and a plurality of QR Code Identifiers positioned around the general vehicle lift area.
Figure 9:
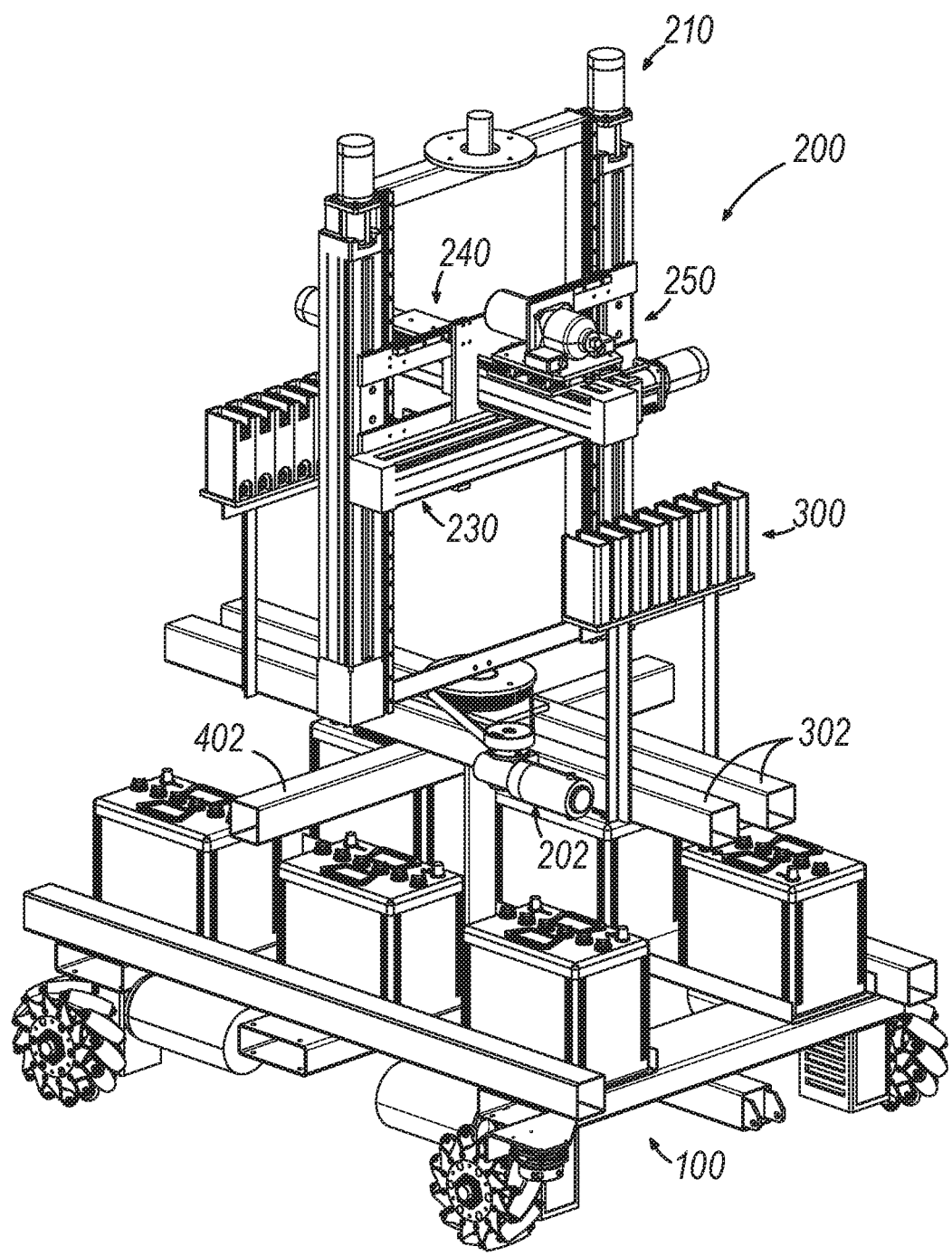
FIG. 9 is a perspective view of the mobile base assembly of FIG. 5 and a torque gun actuation assembly of the automatic wheel changer robot assembly of FIG. 1.

Base frame assembly (102) includes a pair of lateral bodies (104) connected to a pair of longitudinal bodies (106), which together form the structural base of robot assembly (10). A pair of battery trays (108) also extend between lateral bodies (104). Battery trays (108) house batteries (110) such that batteries (110) are supported by base frame assembly (102). As mentioned above, batteries (110) are in communication with internal processing and storage unit (60) such that batteries (110) may selectively power unit (60). Internal processing and storage unit (60) may in turn distribute power from batteries (110) to other suitable components of robot assembly (10) that require electrical energy in order to suitably operate. Alternatively, batteries (110) may be in direct electrical communication with various components requiring electrical energy in order to suitably operate. Mobile base assembly (100) may include a home charging port configured to electrically couple with a charging port of a home position/charging station (50) (as shown in FIG. 8) located on a shop floor. In particular, robot assembly (10) may locate itself at home position/charging station (50) while not in use. Lidar collision avoidance detectors (120) are attached on opposite corners of base frame assembly (102). As mentioned above, lidar collision avoidance detectors (120) are in communication with processing and storage unit (60). Processing and storage unit (60) may activate and receive information from lidar collision avoidance detectors (120). In particular, prior to and during movement of robot assembly (10) in accordance with the description herein, lidar collision avoidance detectors (120) are configured to scan the area around base frame assembly (102) in order to detect any potential obstructions with which robot assembly (10) may collide with during movement of robot assembly (10) in accordance with the description herein. Processing and storage unit (60) may utilize information from lidar collision avoidance detectors (120) in order to alter the path which robot assembly (10) takes in order to arrive at a targeted destination in accordance with the description herein. Alternatively, processing and storage unit (60) may deactivate movement of robot assembly (10) until lidar collision avoidance detectors (120) no longer detect a potential obstruction.

In the current example, there are two lidar collision avoidance detectors (120). However, any suitable number of avoidance detectors (120) may be used as would be apparent to one having ordinary skill in the art in view of the teachings herein. While lidar technology is used for collision avoidance detectors (120) in the current example, any other suitable technology may be used as would be apparent to one skilled in the art in view of the teachings herein.

Each Mecanum wheel assembly (130, 140) is coupled to an individual DC motor (125). DC motors (125) are fixed to base frame assembly (102), while Mecanum wheel assemblies (130, 140) are configured to support mobile base assembly (100) on a floor. Additionally, DC motors (125) are in communication with internal processing and storage unit (60) such that processing and storage unit (60) may command DC motor (125) to drive wheel assemblies (130, 140) in accordance with the description herein. Mecanum wheel assemblies (130, 140) are rotatably coupled to DC motors (125) such that DC motors (125) are configured to rotate corresponding front Mecanum wheel assemblies (130) about front drive axis (FA) and corresponding rear Mecanum wheel assemblies (140) about rear drive axis (RA). In particular, DC motors (125) may rotate Mecanum wheel assemblies (130, 140) about corresponding axis (FA, RA) in two rotational directions. As will be described in greater detail below, internal processing and storage unit (60) may instruct individual DC motors (125) to drive corresponding Mecanum wheel assemblies (130, 140) in various combinations of rotational directions in order to translate and rotate base frame assembly (102) in various directions and about various axes.

Figure 7A:
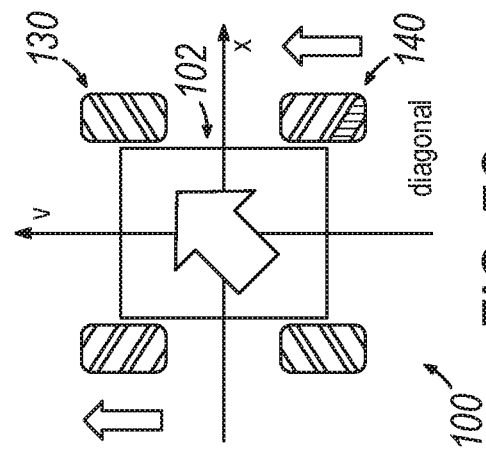
FIG. 7A is a top plan view of the mobile base assembly of FIG. 5, where Mecanum wheel assemblies are activated to translate a base frame assembly of the mobile base assembly of FIG. 5 in a forward direction.
Figure 7B:
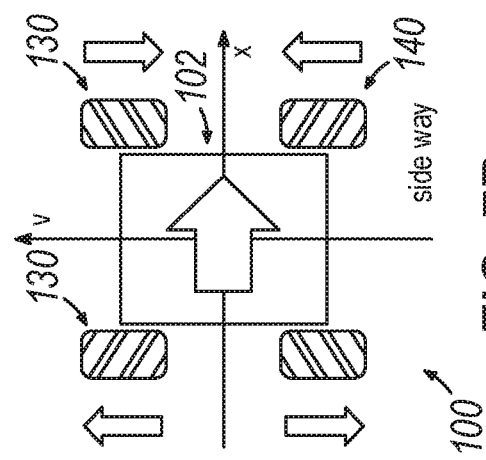
FIG. 7B is a top plan view of the mobile base assembly of FIG. 5, where Mecanum wheel assemblies of FIG. 7A are activated to translate the base frame assembly of FIG. 7A in a lateral direction.
Figure 7C:
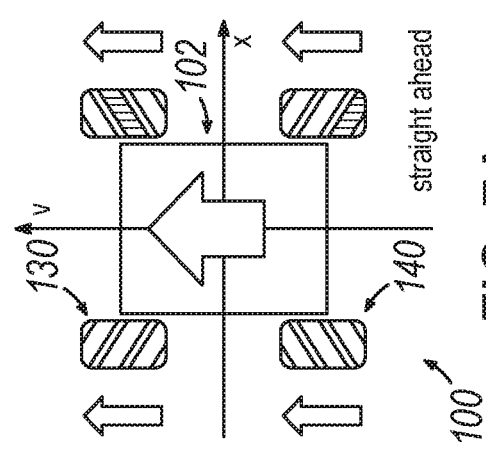
FIG. 7C is a top plan view of the mobile base assembly of FIG. 5, where Mecanum wheel assemblies of FIG. 7A are activated to translate the base frame assembly of FIG. 7A in a diagonal direction.

For instance, as shown in FIG. 7A, if internal processing and storage unit (60) desires to drive mobile base assembly (100) forward, unit (60) may instruct DC motors (125) of each Mecanum wheel assembly (130, 140) to rotate in the first angular direction about their respective drive axis (FA, RA). As shown in FIG. 7B, if internal processing and storage unit (60) desires to drive mobile base assembly (100) sideways, unit (60) may instruct front-left Mecanum wheel assembly (130) and rear-right Mecanum wheel assembly (140) to rotate in the first angular direction about their respective axis (FA, RA), while also instructing front-right Mecanum wheel assembly (130) and rear-left Mecanum wheel assembly (140) to rotate in the second, opposite, angular direction about their respective axis (FA, RA). As shown in FIG. 7C, if internal processing and storage unit (60) desires to drive mobile base assembly (100) diagonally, unit (60) may instruct front-left Mecanum wheel assembly (130) and rear-right Mecanum wheel assembly (140) to rotate in the first angular direction about their respective axis (FA, RA), while also instructing front-right Mecanum wheel assembly (130) and rear-left Mecanum wheel assembly (140) to remain stationary.

Figure 7D:
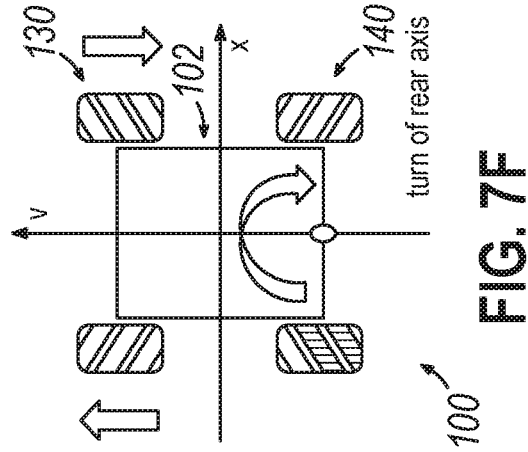
FIG. 7D is a top plan view of the mobile base assembly of FIG. 5, where Mecanum wheel assemblies of FIG. 7A are activated to rotate the base frame assembly of FIG. 7A about a corner axis of the base frame assembly.
Figure 7E:
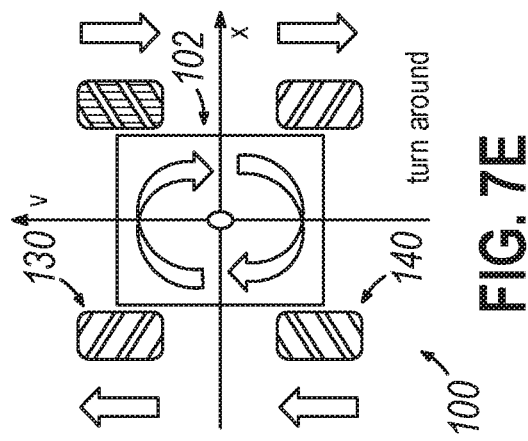
FIG. 7E is a top plan view of the mobile base assembly of FIG. 5, where Mecanum wheel assemblies of FIG. 7A are activated to rotate the base frame assembly of FIG. 7A about a central axis of the base frame assembly.
Figure 7F:
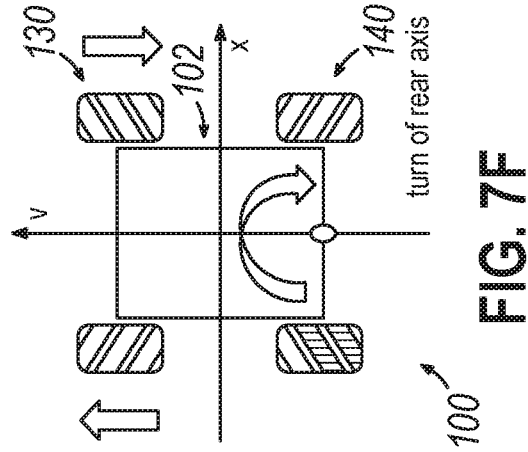
FIG. 7F is a top plan view of the mobile base assembly of FIG. 5, where Mecanum wheel assemblies of FIG. 7A are activated to rotate the base frame assembly of FIG. 7A about a central rear axis of the base frame assembly.

As shown in FIG. 7D, if internal processing and storage unit (60) desires to rotate base assembly (100) about a right-rear corner axis, unit (60) may instruct front-left Mecanum wheel assembly (130) and rear-left Mecanum wheel assembly (140) to rotate in the first angular direct about their respective axis (FA, RA), while also instructing front-right Mecanum wheel assembly (130) and rear-right Mecanum wheel assembly (140) to remain stationary. As shown in FIG. 7E, if internal processing and storage unit (60) desires to rotate base (100) assembly about a central axis, unit (60) may instruct front-left Mecanum wheel assembly (130) and rear-left Mecanum wheel assembly (140) to rotate in the first angular direct about their respective axis (FA, RA), while also instructing front-right Mecanum wheel assembly (130) and rear-right Mecanum wheel assembly (140) to rotate in the second angular direct about their respective axis (FA, RA). As shown in FIG. 7F, if internal processing and storage unit (60) desires to rotate base (100) assembly about a rear central axis, unit (60) may instruct front Mecanum wheel assemblies (130) to rotate about front drive axis (FA) in opposite directions.

While Mecanum wheel assemblies (130, 140) are used to move mobile base assembly (100) in accordance with the description herein, any other suitable wheel assemblies may be used as would be apparent to one skilled in the art in view of the teachings herein. For instance, omni wheels or active castor wheel mechanisms may be used in lieu of Mecanum wheel assemblies (130, 140).

Additionally, DC motors (125) are configured to provide rotation per minute (RPM) data to processing and storage unit (60). Storage unit (60) may use this information to calculate the distance or angular displacement traveled of base frame assembly (102) in accordance with the description above.

Internal processing and storage unit (60) may instruct DC motors (125) to drive corresponding Mecanum wheel assemblies (130, 140) to move robot assembly (10) to a desired location. Internal processing storage unit (60) may generate instructions such that Mecanum wheel assemblies (130, 140) move robot assembly (10), in accordance with the description herein, based on information received from various cameras and sensors on robot assembly (10).

For instance, FIG. 8 shows an exemplary shop floor designed to be used in conjunction with robot assembly (10). The shop floor includes a general vehicle lift area (30) defined by a general perimeter (32), a home position/charging station (50), and a plurality of QR code identifiers (42, 44, 46, 48). As mentioned above, robot assembly (10) may remain at home position/charging station (50) while not in use.

General vehicle lift area (30) may include any suitable mechanisms to lift a vehicle for service. General vehicle lift area (30) include a plurality of pre-identified general wheel locations (34, 36, 38, 40). General wheel locations (34, 36, 38, 40) are associated location where tires (70) of a serviced vehicle are generally located when raised during service. QR code identifiers (42, 44, 46, 48) are located generally adjacent to a corresponding general wheel location (34, 36, 38, 40), but in a direction away from lift area (32) of general vehicle lift area (30). In particular, QR code identifiers (42, 44, 46, 48) are at a corresponding location where robot assembly (10) will initially travel to before engaging hub assembly (80) in accordance with the description herein. QR code identifiers (42, 44, 46, 48) may be located on the shop ceiling or shop floor.

Once robot assembly (10) receives an initial request to start a tire maintenance procedure, robot assembly (10) may use cameras (14, 16) to scan for the appropriate QR code identifier (42, 44, 46, 48). Once camera (14, 16) finds the proper QR code identifier (42, 44, 46, 48), camera (14, 16) may communicate this image/signal to internal processing and storage unit (60) such that processing and storage unit (60) may determine the location of robot assembly (10) on the shop floor. Processing and storage unit (60) may then generate suitable instructions to DC motors (125) such that DC motors (125) activate Mecanum wheel assemblies (130, 140) to drive robot assembly (10) to a position under or above the appropriate QR code identifiers (42, 44, 46, 48). Internal processing and storage unit (60) may then instruct DC motors (125) to suitably rotate robot assembly (10) such that a window (15) defined by external casing (12) suitably faces the corresponding general wheel location (34, 36, 38, 40). It should be understood that lidar collision avoidance detectors (120) may also communicate information to processing and storage unit (60) such that processing and storage unit (60) modifies, stops, or delays the route which robot assembly (10) takes to get to the appropriate QR code identifier (42, 44, 46, 48).

Robot assembly (10) may then suitably interact with a hub assembly (80) with the vehicle raised by suitably lift components of generally vehicle lift area (30) in accordance with the description herein. After robot assembly (10) has completed its desired task at the hub assembly (80) associated with the first corresponding QR code identifier (42, 44, 46, 48), internal processing and storage unit (60) may then instruct robot assembly (10) to move to the next suitable QR code identifier (42, 44, 46, 48) in accordance with the description herein. The pattern of which robot assembly (10) travels to QR code identifiers (42, 44, 46, 48), and the pattern of what tasks are performed by robot assembly (10) may be predetermined by the type of request made by the technician.

Alternatively, the pattern of which robot assembly (10) travels and the pattern of which robot assembly (10) performs tasks may be determined by robot assemblies (10) assessment of general vehicle lift areas (30) in combination with data from previous tasks performed by robot assembly (10). For instance, robot assembly (10) may utilize artificial intelligence to analyze all images and data of all tasks (or selected tasks) performed by robot assembly (10) in accordance with the description herein. Those images and data may be sent to external processing unit (20), which may then analyze the data utilizing artificial intelligence to modify the software from which robot assemblies (10) operate. External processing unit (20) may then communicate these updates to all robot assemblies (10). Therefore, robot assembly (10) may modify its future performance of tasks based on previous performance of the same or similar tasks by the same robot assembly (10) or different robot assemblies (10). External processing unit (20) may use images and data to create new vehicle profiles or update old vehicle profiles.

Of course, internal processing and storage unit (60) may generate instructions for Mecanum wheel assemblies (130, 140) utilizing other cameras or sensors, as will be described in greater detail below, and as will be apparent to one having skill in the art in view of the teachings herein.

It should be understood that robot assembly (10) may be utilized on a shop floor with multiple general lift areas (30), each configured to service a vehicle. Therefore, each general lift area (30) may have their own QR code identifiers (42, 44, 46, 48) associated with each respective general wheel location (34, 36, 38, 40).

III. Exemplary Torque Gun Actuation Assembly

FIGS. 9-16C show torque gun actuation assembly (200) in greater detail. As mentioned above, and as will be described in greater detail below torque gun actuation assembly (200), in conjunction with socket holder assembly (300), is configured to selectively engage lug nuts and lug studs (LS) of wheel hub assemblies (80) in order to suitably couple and decouple lug nuts with lug studs (LS). Torque gun actuation assembly (200) includes a rotation actuation assembly (202), a vertical actuation assembly (210), a lateral actuation assembly (230), a longitudinal actuation assembly (240), a torque gun assembly (250), and a torque displacement assembly (270). Each actuation assembly (202, 210, 230, 240) is configured to actuate torque gun assembly (250) relative to the rest of robot assembly (10) in order to vertically and horizontally align and engage torque gun assembly (250) with various lug studs (LS) of hub assembly (80).

As best seen in FIGS. 9-11C, Torque gun actuation assembly (200) is structurally supported by structure support bars (302) of socket holder assembly (300), which in turn is structurally supported by crossbar (402) of upper wheel-clamping assembly (400), and support bars (502) of lower wheel-clamping assembly (500). In particular, as best shown in FIGS. 10, 16A-16C, rotation actuation assembly is supported by support bars (302), crossbar (402), and support bars (502) such that a low RPM stepper motor (204) of rotation actuation assembly (202) is fixed to a structure support bar (302), while a second wheel (208) of rotation actuation assembly (202) is rotatably coupled with structure support bars (302). As also best seen in FIGS. 10, and 16A-16C, second wheel (208) is coupled to a bracket (212) of vertical actuation assembly (210).

As will be described in greater detail below, actuation assemblies (202, 210, 230, 240) are coupled to each other such that rotation actuation assembly (202) is configured to rotate all other actuation assemblies (210, 230, 240), along with torque gun assembly (250) about a central axis of second wheel (208). As will also be described below, vertical actuation assembly (210) is configured to vertically actuate lateral actuation assembly (230), longitudinal actuation assembly (240), and torque gun assembly (250) vertically along vertical guide rails (216). Similarly, lateral actuation assembly (230) is configured to laterally actuate longitudinal actuation assembly (240) and torque gun assembly (250) laterally along lateral guide rails (222). Longitudinal actuation assembly (240) is configured to longitudinally actuate torque gun assembly (250) in the longitudinal direction.

As will be described in greater detail below, rotation actuation assembly (202) may be used to rationally align torque gun assembly (250) and wheel-clamping assemblies (400,500) with a specific tire (70) and/or wheel hub assembly (80) to ensure torque gun assembly (250) and lug stud openings (72) of tire (70) grasped by robot assembly (10) may suitably engage lug studs (LS) in accordance with the description herein. As will also be described in greater detail below, since wheel-clamping assemblies (400, 500) may clamp two tires (70) independently of each other, rotation actuation assembly (202) may be used to align torque gun assembly (250) to suitably engage with the tire (70) grasped by the proper pair of independently controlled clamps located adjacent to a respective window (15).

As will also be described in greater detail below, vertical actuation assembly (210) and lateral actuation assembly (230) may be used to properly align torque gun assembly (250) with various lug studs (LS) on a wheel hub assembly (80); while longitudinal actuation assembly (240) may be used such that torque gun assembly (250) may suitably engage socket holder assembly (300) and lug nuts/studs (LS) of wheel assemblies (80).

A. Exemplary Rotation Actuation Assembly

Figure 10:
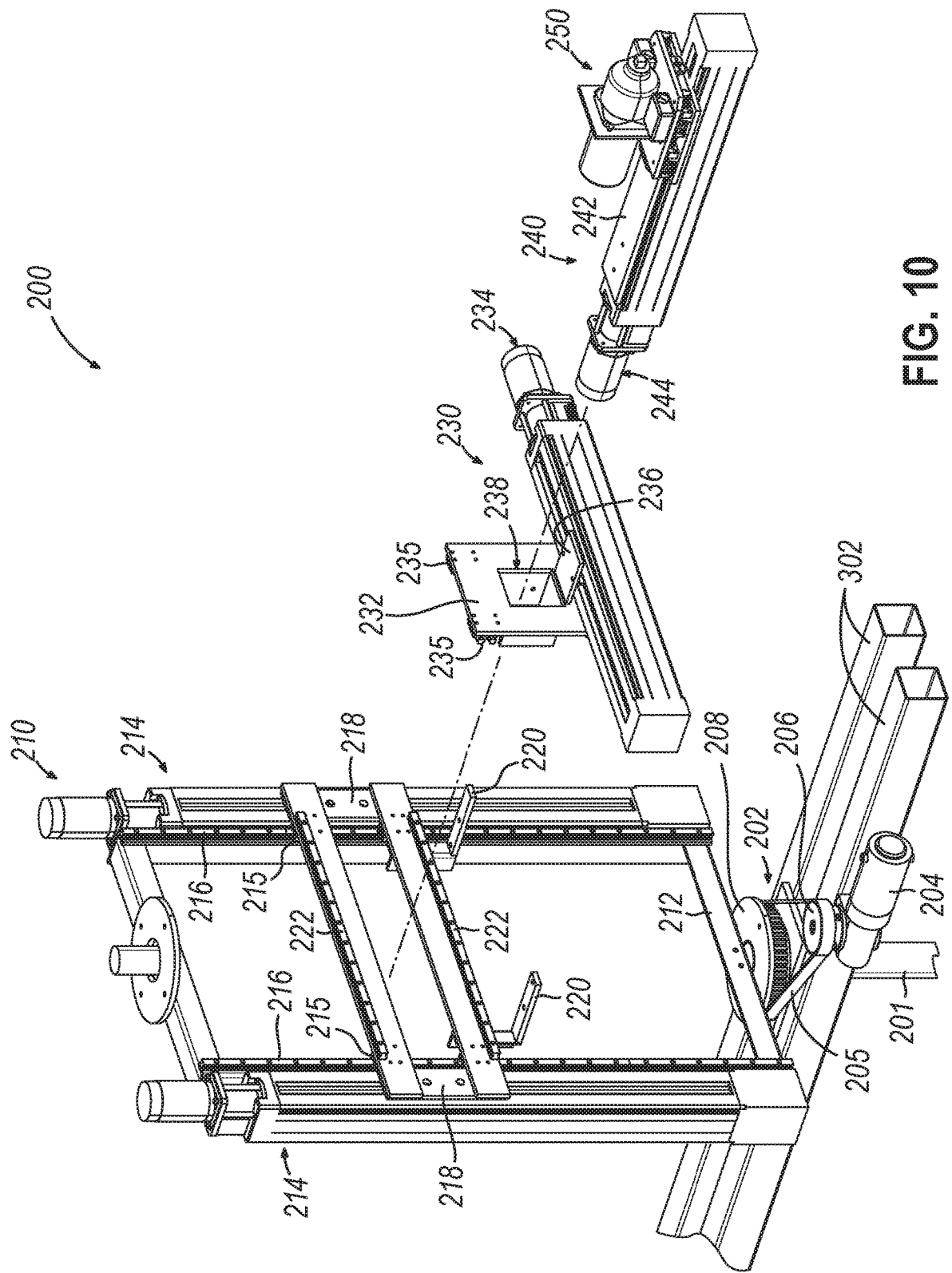
FIG. 10 is an exploded perspective view of the torque gun actuation assembly of FIG. 9.

As shown in FIG. 10, rotation actuation assembly (202) includes a low RPM stepper motor (204), a first wheel (206), a second wheel (208), and a belt (205). Stepper motor (204) is configured to rotate first wheel (206), which in turn drives belt (205) to rotate second wheel (208). Second wheel (208) is attached to a bracket (212). Bracket (212) couples second wheel (208) with the rest of torque gun actuation assembly (200). Therefore, rotation of second wheel (208) rotates bracket (212) about an axis defined by second wheel (208) in order to rotate the rest of torque gun actuation assembly (200).

Figure 16A:
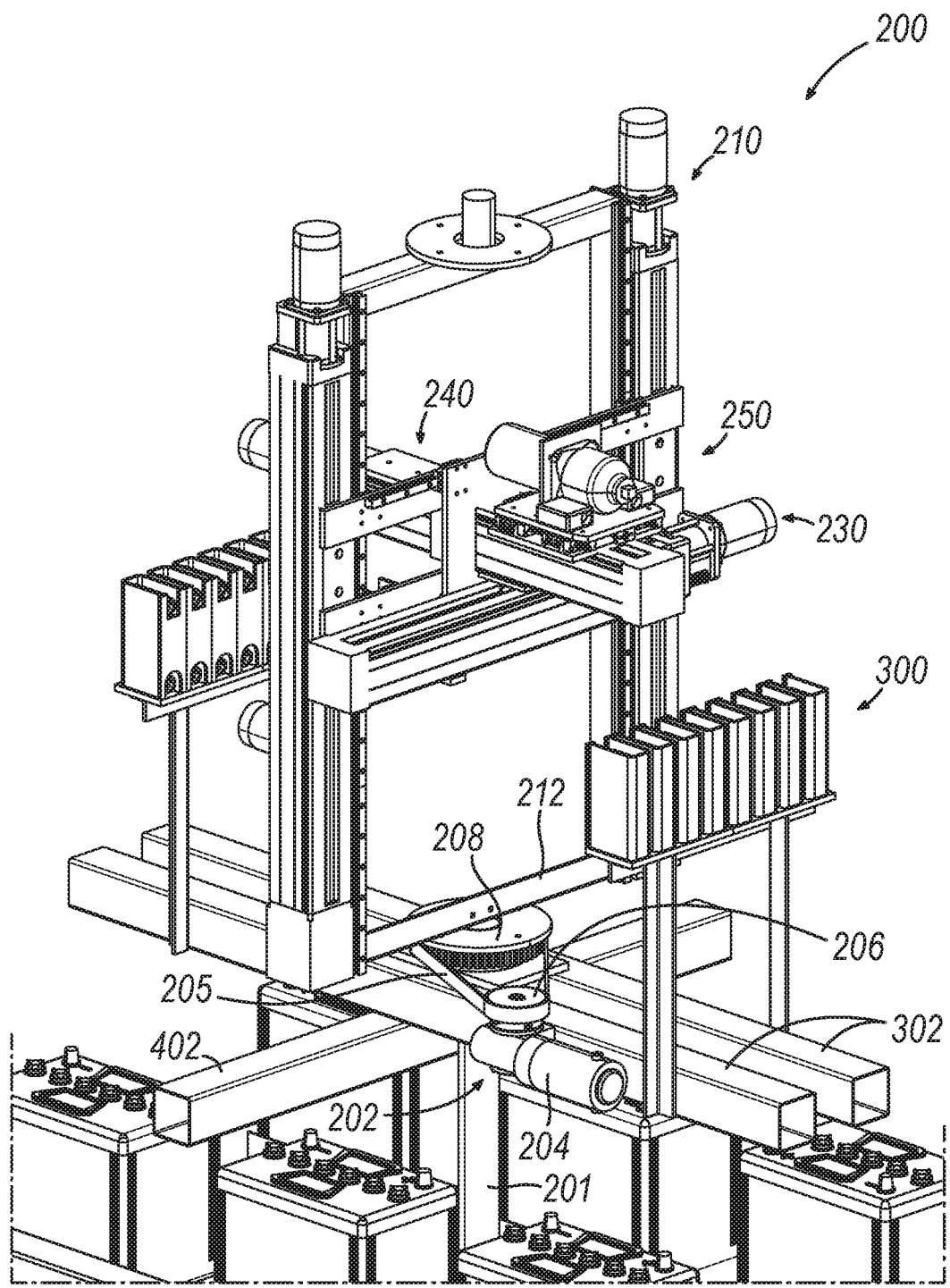
FIG. 16A is a perspective view of the torque gun actuation assembly of FIG. 9 and a socket holder assembly of the automatic wheel changer robot assembly of FIG. 1, where the torque gun actuation assembly is in a first rotational position relative socket holder assembly.
Figure 16B:
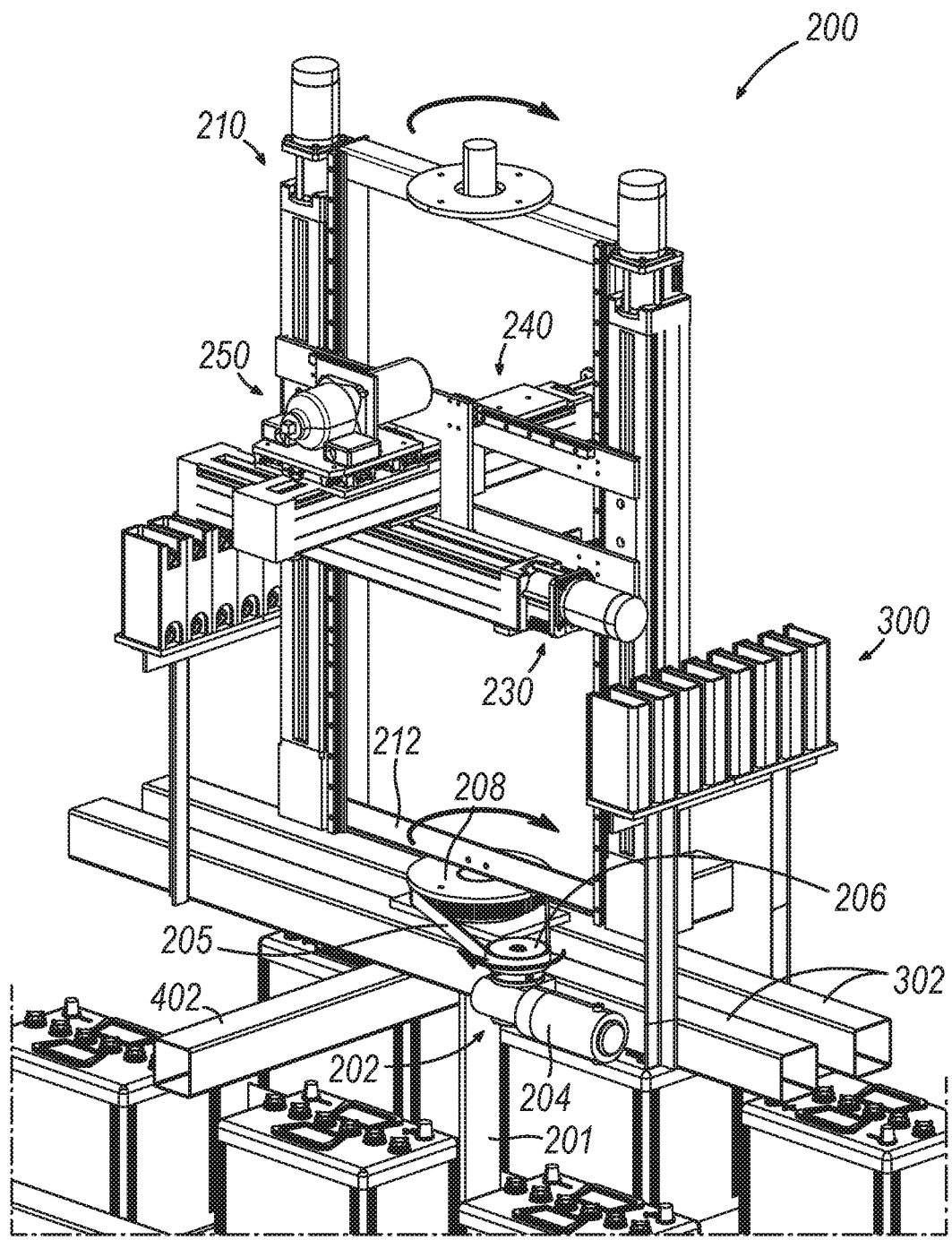
FIG. 16B is a perspective view of the torque gun actuation assembly of FIG. 9 and the socket holder assembly of FIG. 16A, where the torque gun actuation assembly is in a second rotational position relative socket holder assembly.
Figure 16C:
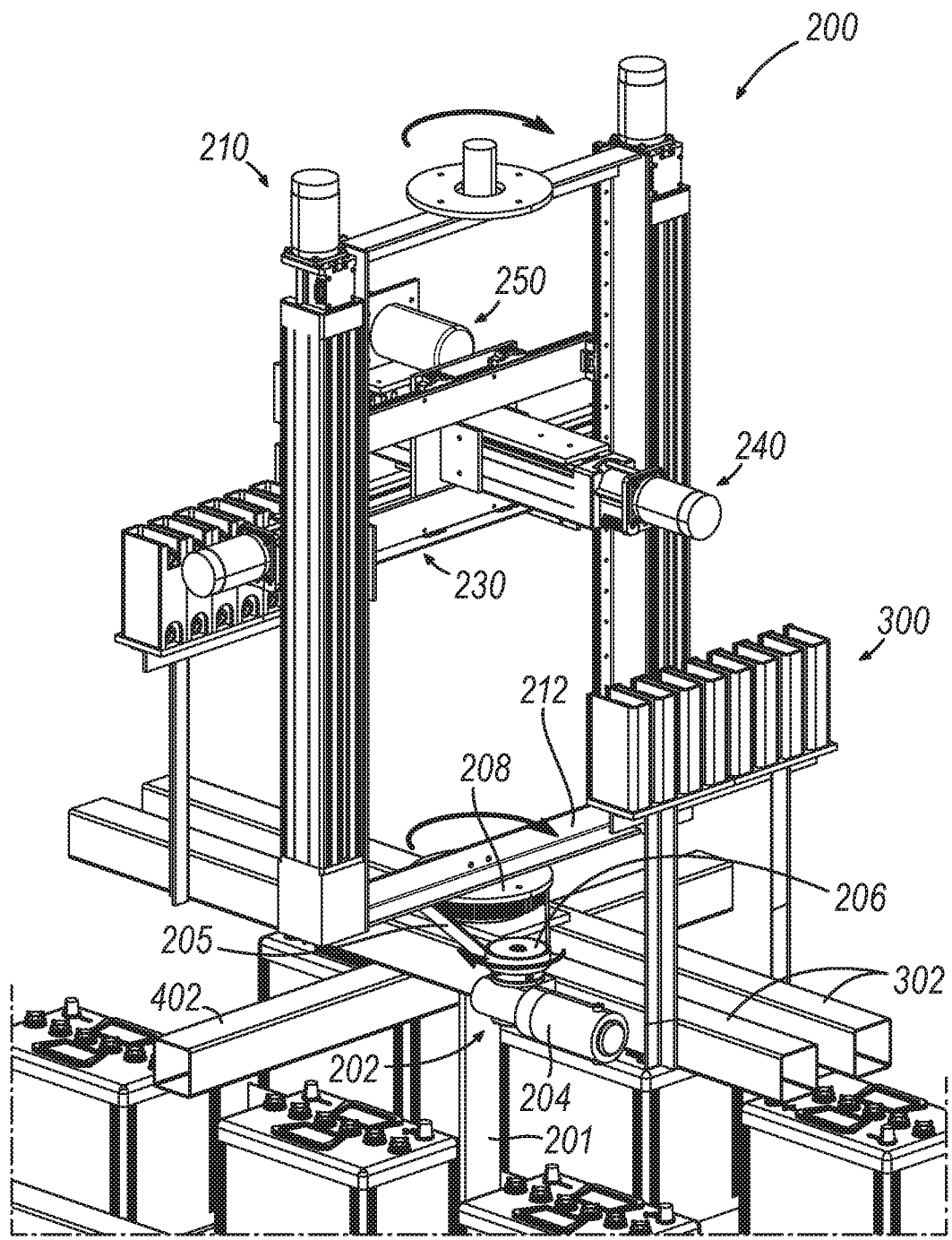
FIG. 16C is a perspective view of the torque gun actuation assembly of FIG. 9 and the socket holder assembly of FIG. 16A, where the torque gun actuation assembly is in a third rotational position relative socket holder assembly.

Therefore, as exemplified in FIGS. 16A-16C, rotation actuation assembly (202) is configured to rotate all other actuation assemblies (210, 230, 240), along with torque gun assembly (250), about a central axis of second wheel (208). Stepper motor (204) may be a low-RPM motor to enable small angle changes of torque gun assembly (250) such that torque gun assembly (250) may properly align with wheel hub assemblies (80) in accordance with the description herein.

Low-RPM stepper motor (204) is in suitable communication with internal processing and storage unit (60) such that internal processing and storage unit (60) may instruct stepper motor (204) to rotate first wheel (206). Processing and storage unit (60) may track the angular displacement and/or position of first wheel (206) to thereby determine the angular position of torque gun assembly (250). Additionally, or alternatively, internal processing and storage unit (60) may use information of other sensors and cameras, such as torque gun lidar assemblies (260) and torque gun cameras (262) in order to determine an angular position of bracket (212) relative to a targeted tire (70)/wheel hub assembly (80) or the rest of robot assembly (10), or to determine how to instruct stepper motor (204) to rotate first wheel (206), and therefore torque gun assembly (250).

B. Exemplary Vertical Actuation Assembly

As best seen in FIG. 10, vertical actuation assembly (210) includes bracket (212), a pair of vertical linear stage DC motors (214), vertical guide rails (216), a vertical carriage (215), a vertical trolley (218), a lateral motor mount (220), and lateral guide rails (222). Vertical guide rails (216) are associated with vertical linear stage DC motors (214), while vertical carriage (215) is associated with trolley (218).

Vertical carriage (215) is suitably coupled with vertical guide rails (216) such that DC motors (214) may actuate vertical carriage (215) and trolley (218) along a path defined by vertical guide rails (216). Vertical carriage (215), vertical trolley (218), lateral motor mount (220), and lateral guide rails (222) are all fixed to each other such that actuation of vertical carriage (215) along the path defined by vertical guide rails (216) leads to auction of vertical trolley (218), lateral motor mount (220), and lateral guide rails (222).

Lateral actuation assembly (230) is coupled to vertical carriage (215), vertical trolley (218), lateral motor mount (220), and lateral guide rails (222) such that lateral actuation assembly (230) also actuates along the path defined by vertical guide rails (216). In particular, a lateral linear stage DC motor (234) is coupled to lateral motor mount (220), while a lateral trolley (232) is coupled to lateral guide rails (222) via lateral carriage (235). Therefore, as best shown between FIGS. 11A-11B vertical actuation assembly (210) is configured to actuate lateral actuation assembly (230), longitudinal actuation assembly (240), and torque gun assembly (250) in the vertical direction along the path defined by vertical guide rails (216).

Vertical linear stage DC motors (214) are in suitable communication with internal processing and storage unit (60) such that internal processing and storage unit (60) may instruct motors (214) to vertically actuate vertical carriage (215), vertical trolley (218), lateral motor mount (220), and lateral guide rails (222) along the path defined by vertical guide rails (216). Processing and storage unit (60) may track the angular displacement and/or position of vertical linear stage DC motors (214) to thereby determined the vertical position of vertical carriage (215), vertical trolley (218), lateral motor mount (220), and lateral guide rails (222). This may be used to in turn determine the vertical position of torque gun assembly (250). Additionally, or alternatively, internal processing and storage unit (60) may use information of other sensors and cameras, such as torque gun lidar assemblies (260) and torque gun cameras (262) in order to determine the vertical position of torque gun assembly (250) relative to a targeted tire (70)/wheel hub assembly (80) or the rest of robot assembly (10), or to determine how to instruct DC motors (214) to vertically actuate vertical carriage (215), vertical trolley (218), lateral motor mount (220), lateral guide rails (222), and therefore torque gun assembly (250).

C. Exemplary Lateral Actuation Assembly

As shown in FIG. 10, lateral actuation assembly (230) includes a lateral trolley (232) slidably coupled to lateral guide rails (222) via lateral carriages (235), a lateral linear state DC motor (234) attached to lateral motor mount (220), and a longitudinal motor mount (236). Lateral linear state DC motor (234) is operatively coupled to lateral trolley (232) such that lateral linear state DC motor (234) may actuate lateral trolley (232) along the path defined by lateral guide rails (222).

Figure 11A:
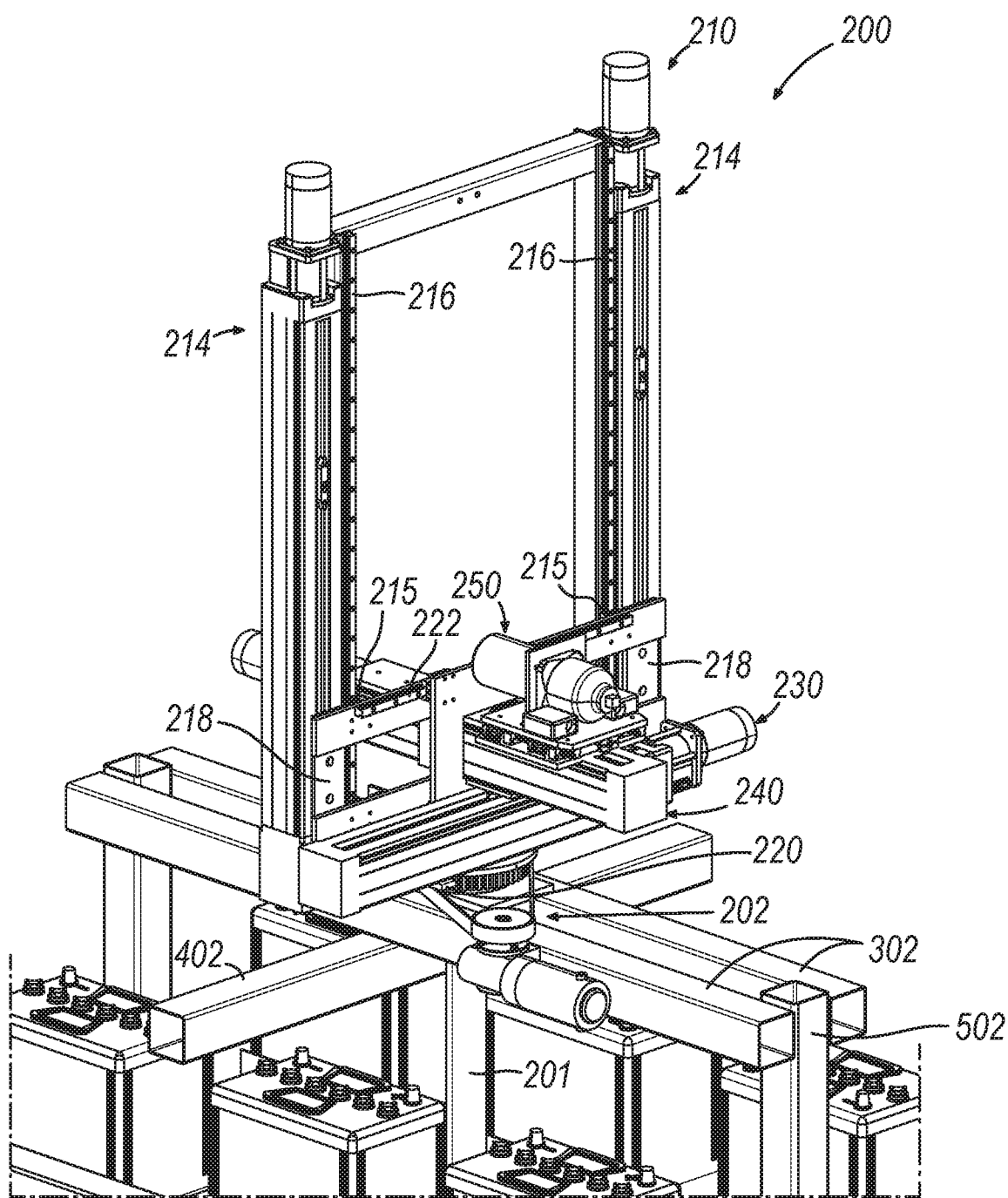
FIG. 11A is a perspective view of the mobile base assembly of FIG. 5 and the torque gun actuation assembly of FIG. 9, where a torque gun assembly is in a first position.
Figure 11B:
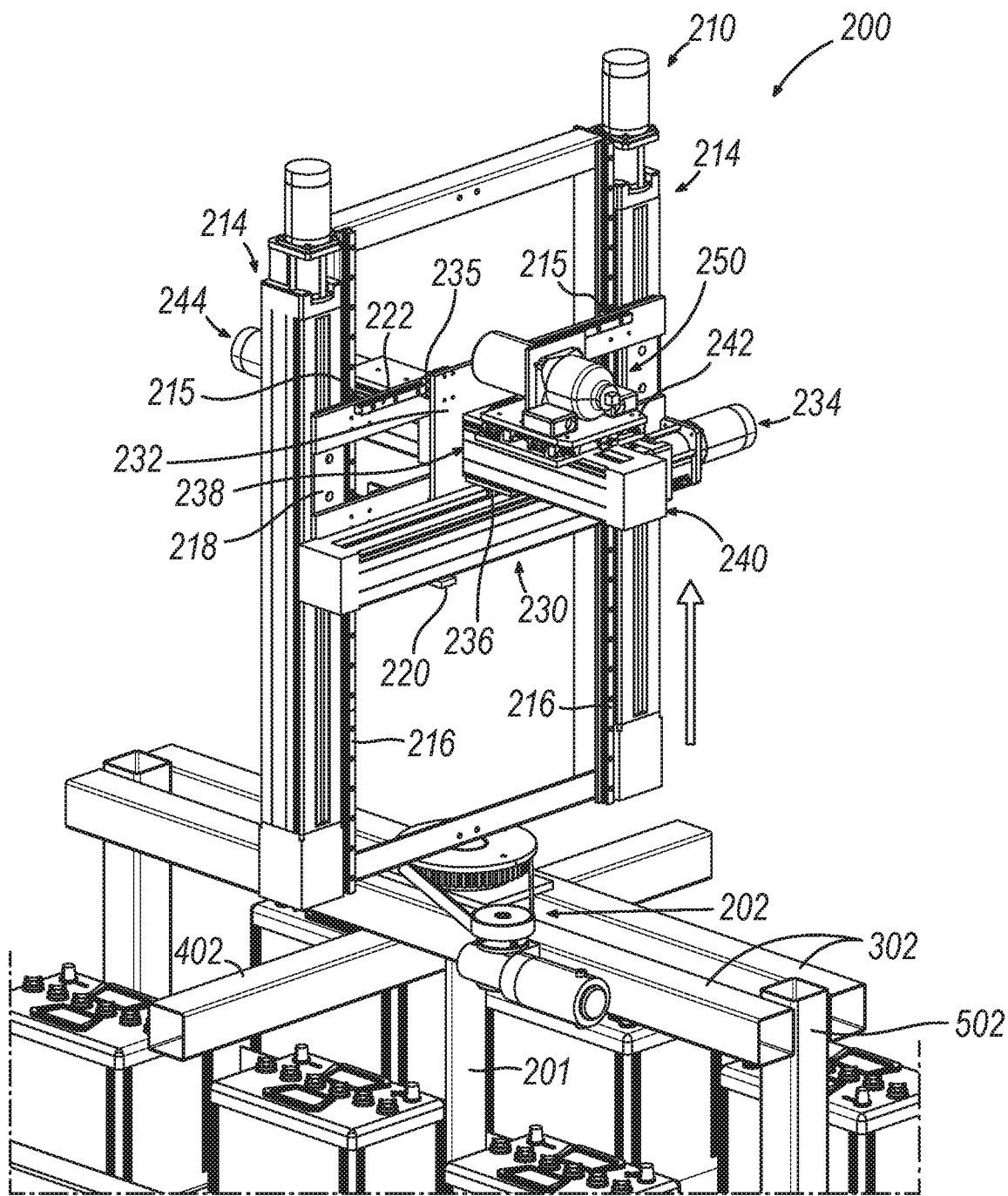
FIG. 11B is a perspective view of the mobile base assembly of FIG. 5 and the torque gun actuation assembly of FIG. 9, where the torque gun actuation assembly has actuated the torque gun assembly of FIG. 11A upward.
Figure 11C:
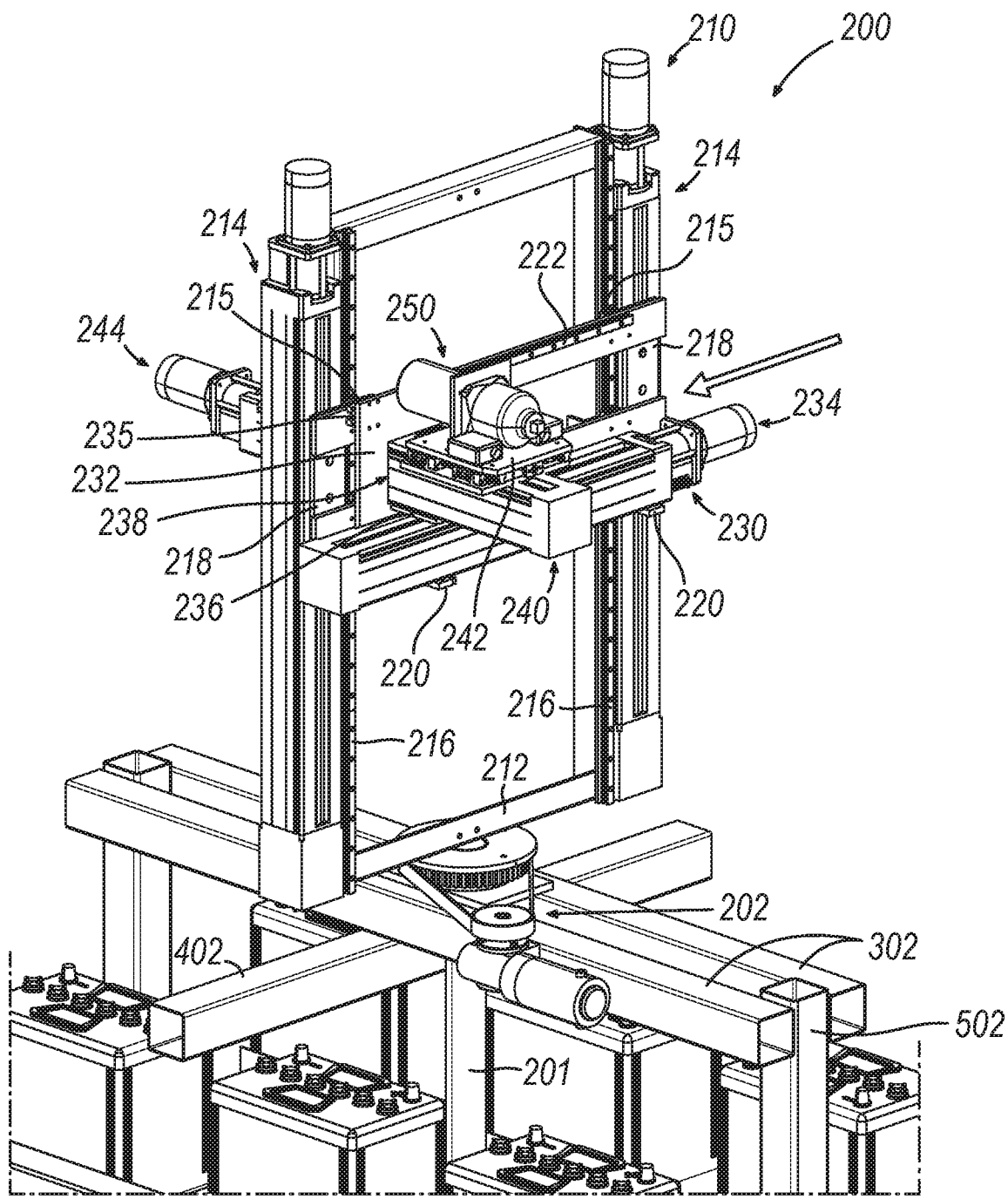
FIG. 11C is a perspective view of the mobile base assembly of FIG. 5 and the torque gun actuation assembly of FIG. 9, where the torque gun actuation assembly has actuated the torque gun assembly of FIG. 11A laterally.

Lateral trolley (232) defines a window (238) dimensioned to receive longitudinal linear stage DC motor (244). As best shown in FIGS. 11B-11C, longitudinal linear stage DC motor (244) is fixed to longitudinal motor mount (236) such that longitudinal actuation assembly (240) and torque gun assembly (250) actuate laterally along the path defined by lateral guide rails (222) along with lateral trolley (232).

Lateral linear stage DC motor (234) is in suitable communication with internal processing and storage unit (60) such that internal processing and storage unit (60) may instruct motor (234) to laterally actuate lateral trolley (232) along the path defined by lateral guide rails (222). Processing and storage unit (60) may track the angular displacement and/or position of lateral linear stage DC motor (234) to thereby determine the lateral position of lateral trolley (232), and therefore the lateral position of torque gun assembly (250). Additionally, or alternatively, internal processing and storage unit (60) may use information from other sensors and cameras, such as torque gun lidar assemblies (260) and torque gun cameras (262), to determine the lateral position of torque gun assembly (250) relative to a targeted tire (70)/wheel hub assembly (80) or the rest of robot assembly (10), or to determine how to instruct DC motor (234) to laterally actuate lateral trolley (232), and therefore torque gun assembly (250).

D. Exemplary Longitudinal Actuation Assembly

Figure 12B:
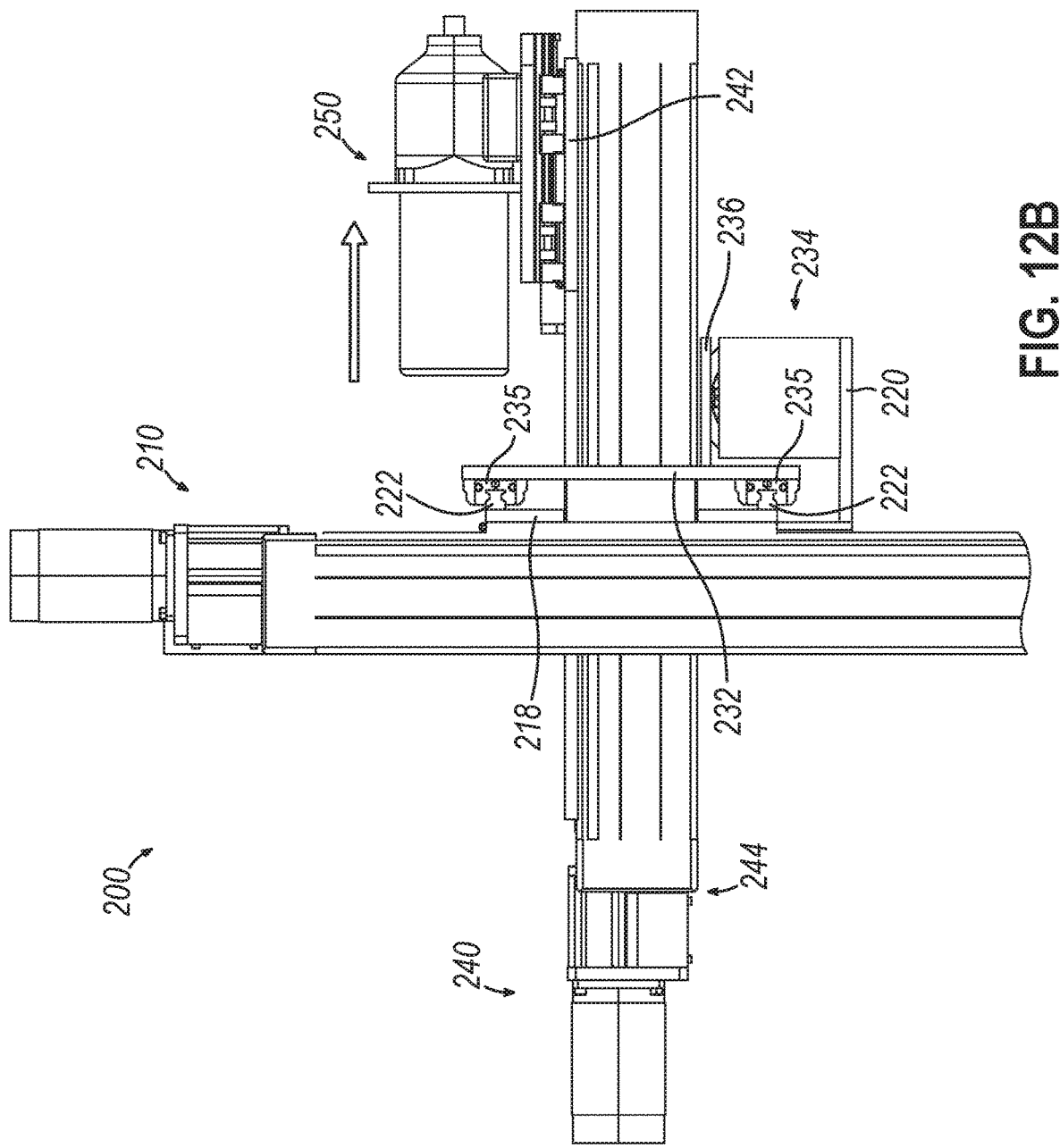
FIG. 12B is an elevated side view of the torque gun actuation assembly of FIG. 9, where the torque gun actuation assembly has actuated the torque gun assembly of FIG. 11A longitudinally.

As shown in FIG. 10, longitudinal actuation assembly (240) includes a longitudinal trolley (242) and a longitudinal linear stage motor (244). As mentioned above, longitudinal linear stage motor (244) is fixed to longitudinal motor mount (236). As best shown in FIGS. 12A-12B, longitudinal linear stage motor (244) is coupled to longitudinal trolley (242) such that motor (244) may actuate trolley (242) in the longitudinal direction.

Longitudinal trolley (242) is operatively attached to torque gun assembly (250) via torque displacement assembly (270), as will be described in greater detail below. Longitudinal trolley (242) is attached to torque gun assembly (250) such that actuation of trolley (242) along the path defined by longitudinal linear stage motor (244) leads to actuation of torque gun assembly (250) in accordance with the description herein.

Longitudinal linear stage DC motor (244) is in suitable communication with internal processing and storage unit (60) such that internal processing and storage unit (60) may instruct motor (244) to longitudinally actuate longitudinal trolley (242) along the path defined motor (244). Processing and storage unit (60) may track the angular displacement and/or position of longitudinal linear stage DC motor (244) to thereby determine the longitudinal position of trolley (242), and therefore the longitudinal position of torque gun assembly (250). Additionally, or alternatively, internal processing and storage unit (60) may use information from other sensors and cameras, such as torque gun lidar assemblies (260) and torque gun cameras (262) to determine the longitudinal position of torque gun assembly (250) relative to a targeted tire (70)/wheel hub assembly (80) or the rest of robot assembly (10), or to instruct DC motor (234) to laterally actuate lateral trolley (232), and therefore torque gun assembly (250).

While the current example of torque gun actuation assembly (200) uses a plurality of linear motors (214, 234, 244), carriages (215, 235) and rails (216, 222) to move torque gun assembly (250) relative to the rest of robot assembly (210), it should be understood that this is merely optional, as any other suitable robotic movement assemblies may be used as would be apparent to one having ordinary skill in the art in view of the teachings herein. For instance, a robotic arm configured to rotate as well as actuate vertically, laterally, and longitudinally may be used.

E. Exemplary Torque Gun Assembly and Torque Displacement Assembly

Figure 13:
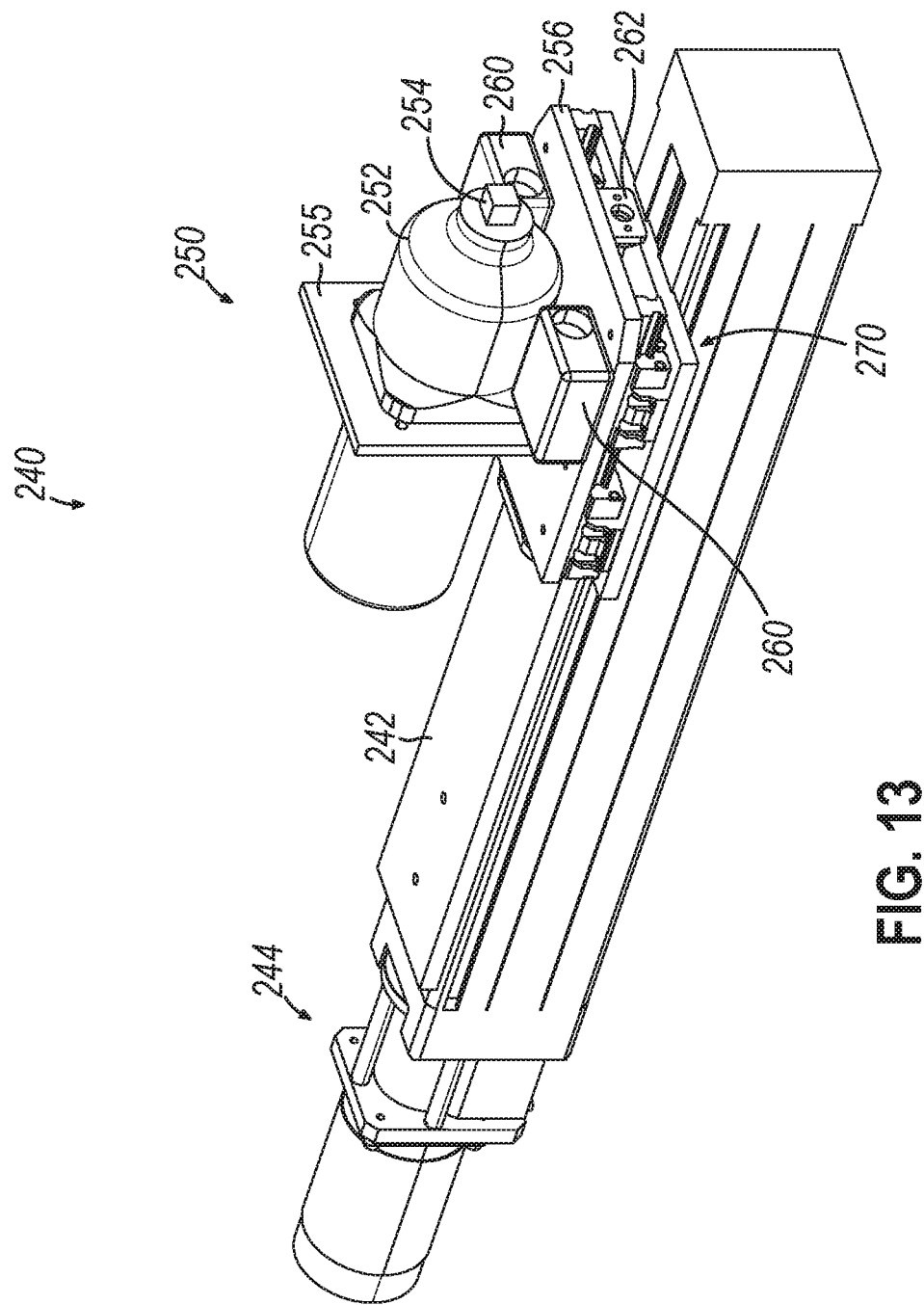
FIG. 13 is a perspective view of the torque gun assembly of FIG. 11A, a longitudinal actuation assembly of the torque gun actuation assembly of FIG. 9.

As shown in FIG. 13, torque gun assembly (250) includes a torque gun (252) having a rotating driver (254), a pair of mounting plates (255, 256) fixed to each other, a pair of torque gun lidar assemblies (260), and a camera (262). Torque gun (252) is operatively attached to mounting plates (255, 256) such that mounting plates (255, 256) provide a mechanical ground for torque gun (252) to suitably drive rotating driver (254) in accordance with the description herein. Rotating driver (254) is operable to couple with a plurality of sockets (350), while torque gun (252) is operable to drive rotation of rotating driver (254) and a corresponding socket (350) to suitably torque (that is, attach or detach) a lug nut relative to a lug stud (LS).

In particular, torque gun (252) is in communication with internal processing and storage unit (60) such that internal processing and storage unit (60) may instruct torque gun (252) to suitably rotate driver (254). Processing and storage unit (60) may measure any relevant characteristic of torque gun (252) in order to determine a torque value that rotating driver (254) is experiencing. For example, processing and storage unit (60) may measure the current that torque gun (252) is experiencing while rotating driver (254) in order to quantify that torque value. Of course, any other suitable measuring technique may be used as would be apparent to one having skill in the art in view of the teachings herein.

As mentioned above, lidar assemblies (260) and camera (262) are also in communication with internal processing and storage unit (60). Lidar assemblies (260) and camera (262) may be used to help align and verify that rotating driver (254) and torque gun (250) are suitably aligned with a lug stud (LS), tire (70), or wheel hub assembly (80) in accordance with the description herein. Lidar assemblies (260) and camera (262) may be used to map out a tire (70) or a plurality of lug studs (LS) on wheel hub assembly (80) in order for internal processing and storage unit (60) to suitably direct mobile base assembly (100), torque gun actuation assembly (200), and wheel clamp assemblies (400, 500) in accordance with the description herein. Therefore, internal processing and storage unit (60) may use information obtained from lidar assemblies (260) and camera (262) to generate actuation instructions for mobile base assembly (100), torque gun actuation assembly (200), and clamp assemblies (400, 500) in accordance with the description herein.

Once rotating driver (254), while suitably coupled with a socket (350), engages a lug nut that is attached to a lug stud (LS), rotation of driver (254) leads to the lug nut traversing across lug stud (LS) in the longitudinal direction due to the meshing engagement between complementally threads of the lug nut and lug stud (LS). With driver (254) coupled to socket (350), and socket (350) in turn coupled to the lug nut, the longitudinal motion of the lug nut due to meshing engagement between complementary threads may ultimately impart a reactionary longitudinal force on torque gun (252). If torque gun (252) were directly attached to longitudinal trolley (242), the reactionary longitudinal force on torque gun (252) may inadvertently drive longitudinal trolley (242) relative to motor (244). This may be undesirable, as inadvertent movement between trolley (242) and motor (244) may lead to mechanical damage of motor (244), miscalculation of the longitudinal position of torque gun (252), or other undesirable results.

Figure 14:
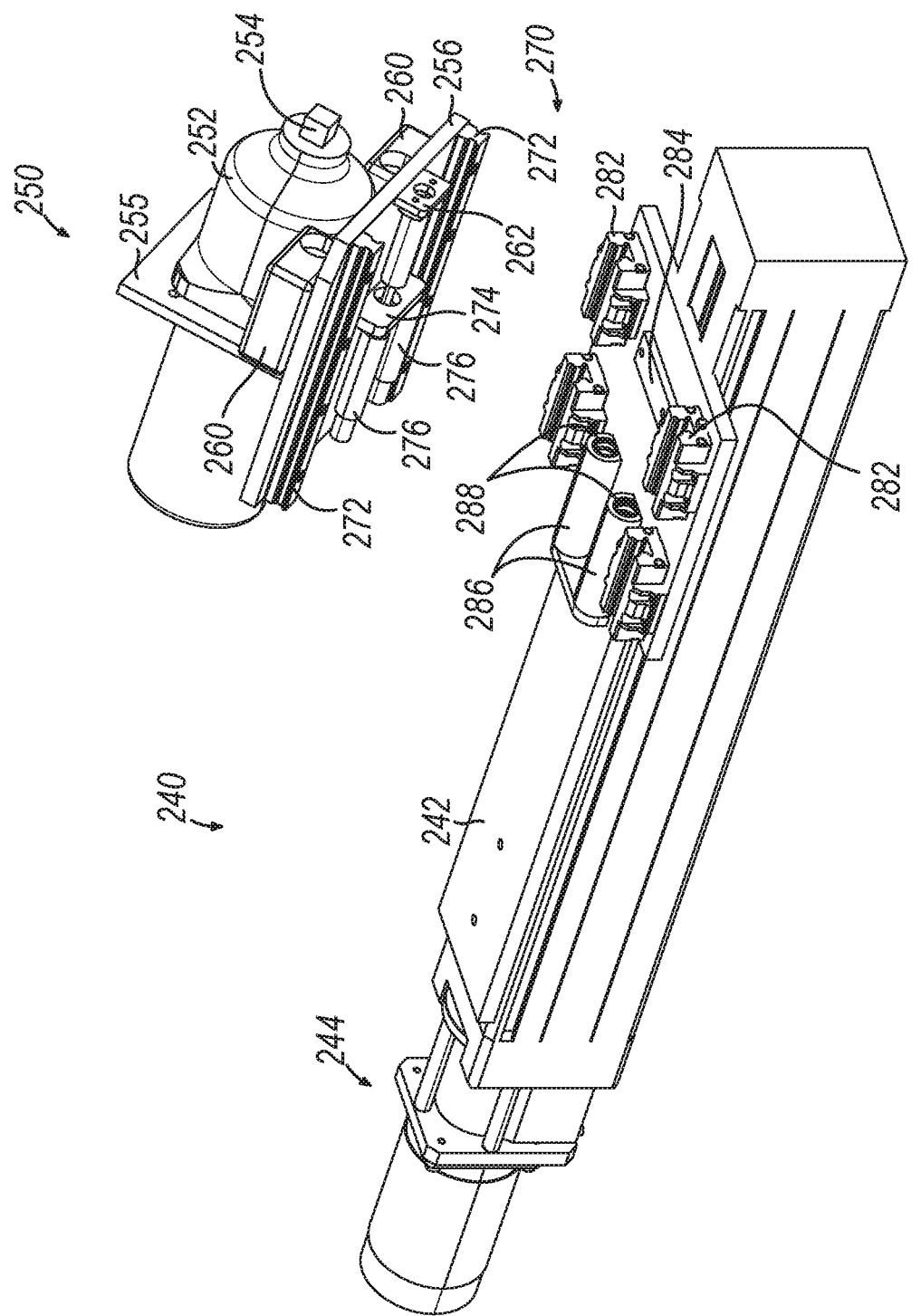
FIG. 14 is an exploded perspective view of the torque gun assembly of FIG. 11A and the longitudinal actuation assembly of FIG. 13.
Figure 15C:
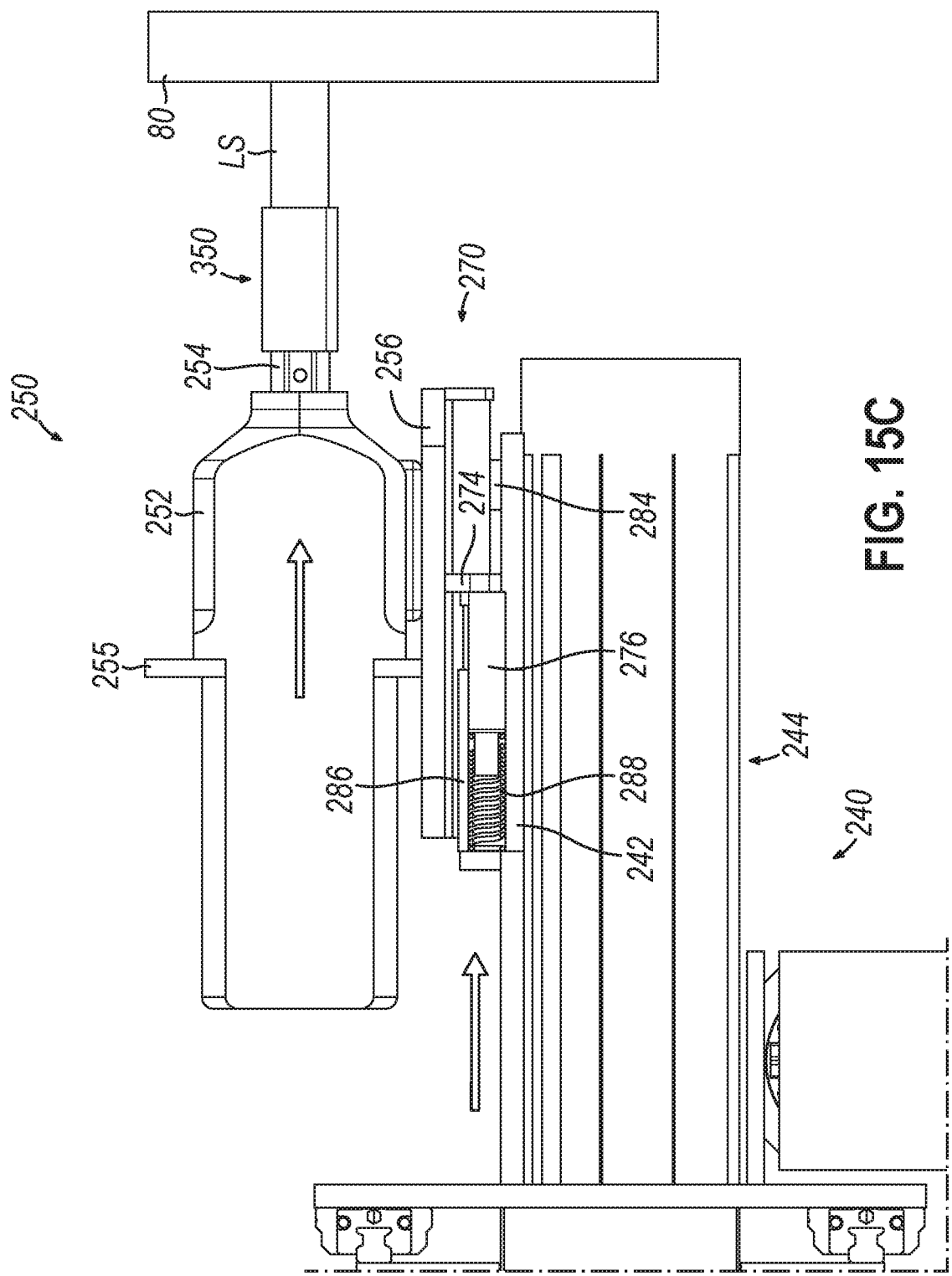
FIG. 15C is a partial cross-sectional side view of the longitudinal actuation assembly of FIG. 13 and the torque gun assembly of FIG. 11A, where the socket housing a lug nut of FIG. 15A is engaged with a lug stud, where the trolley of FIG. 15A is in a third position, where the torque gun assembly is in a second position relative to the trolley.

Therefore, it may be desirable to have a displacement assembly that allows movement of torque gun (252) relative to trolley (242) in response to driver (254) torqueing a lug nut relative to a lug stud (LS) in accordance with the description herein. FIGS. 14-15E show torque displacement assembly (270) that is configured to allow torque gun (252) to move relative to trolley (242) in response to a driver (254) actuating a lug nut along a lug stud (LS), or in response to trolley (242) initially actuating socket (350) into engagement with a lug nut attached to lug stud (LS).

Torque displacement assembly (270) includes a set of guide rails (272), a bracket (274), and two spring guide rods (276). Guide rails (272) and bracket (274) are attached to mounting plate (256), while guide rods (276) extend from bracket (274). Therefore, guide rails (272), bracket (274), and guide rods (276) are fixed relative to torque gun (252).

Torque displacement assembly (270) also includes guide carriages (282), a stop (284), and two guide channels (286) each respectively housing a bias spring (288). Guide carriages (282), stop (284), and guide channels (286) are attached to trolley (242). Guide carriages (282) are dimensioned to receive guide rails (272) such that carriages (282) and rails (272) provide a longitudinal translating path for mounting plate (256) to travel relative to trolley (242).

When assembled, guide rods (276) are slidably housed within respective guide channels (286) such that bias springs (288) biases guide rods (276) toward a direction leading out of guide channels (286). In particular, guide rods (276) are biased toward the direction leading out of channels (286) such that bracket (274) engages stop (284). Therefore, the interaction between bracket (274) and stop (284) prevents guide rods (276) from disassociating with channels (286). As will be described in greater detail below, guide rods (276) are configured to compress biasing springs (288) in order to allow torque gun (252) to actuate relative to trolley (242) during exemplary use.

FIG. 15A shows torque gun (250) and trolley (242) in a first position relative to lug stud (LS) of wheel hub assembly (80). It should be understood that lug stud (LS) may be suitably coupled with a lug nut, or socket (350) coupled to driver (254) may contain a lug nut configured to mesh with threading of lug stud (LS). Next, trolley (242) may actuate torque gun (250) toward lug stud (LS) such that trolley (242) and mounting plate (256) travel together and such that socket (350) initially engages lug stud (LS). At this point, if socket (350), lug nut, and lug stud (LS) are suitably engaged, torque gun (250) may be activated to rotate the lug nut relative to lug stud (LS).

In some instances, socket (350) may need to be further actuated toward lug stud (LS) to sufficiently engage a lug nut already attached to lug stud (LS), or such that a lug nut within socket (350) sufficiently engages lug stud (LS). Therefore, as shown in FIG. 15C, trolley (242) may be actuated longitudinally further toward lug stud (LS) such that socket (350) sufficiently engages with lug nut, or if lug nut is already housed within socket (350), such that lug nut sufficiently engages with lug stud (LS). As best seen in FIG. 15C, this movement causes mounting plate (256) to actuate relative to trolley (242), which in turn drives guide rods (276) to compress biasing spring (288), and also moves bracket (274) away from stop (284). This movement may allow motor (244) to sufficiently drive torque gun (252) so socket (350) suitably engages lug stud (LS) without having lug stud (LS) impart an undesirable reactionary force on motor (244). This movement may also prevent torque gun (252) from undesirably damaging lug stud (LS).

Figure 15D:
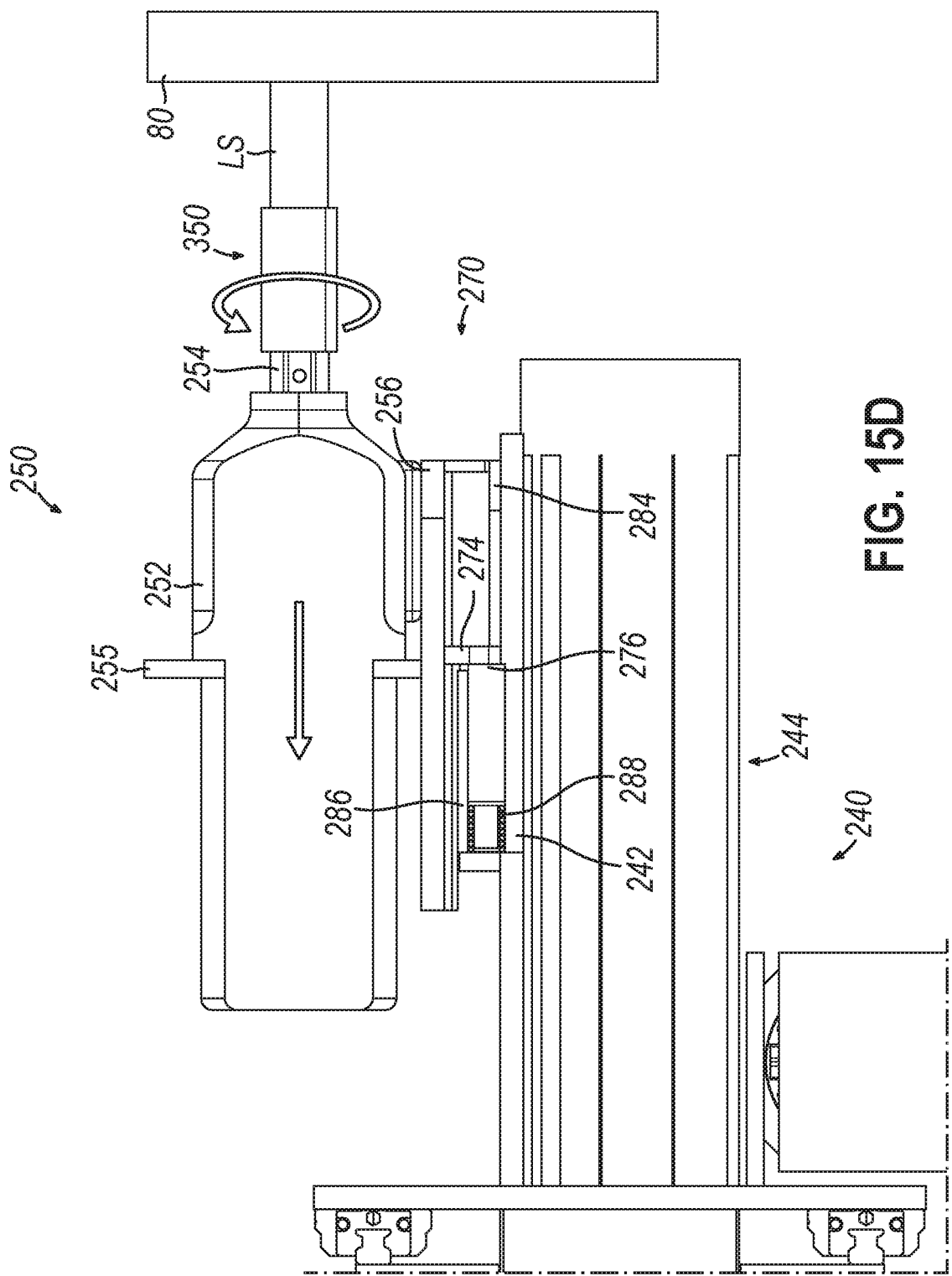
FIG. 15D is a partial cross-sectional side view of the longitudinal actuation assembly of FIG. 13 and the torque gun assembly of FIG. 11A, where the socket housing a lug nut of FIG. 15A is driven such that the lug nut travels along the lug stud in a first direction, where the trolley of FIG. 15A is in the third position, where the torque gun assembly is in a third position relative to the trolley.
Figure 15E:
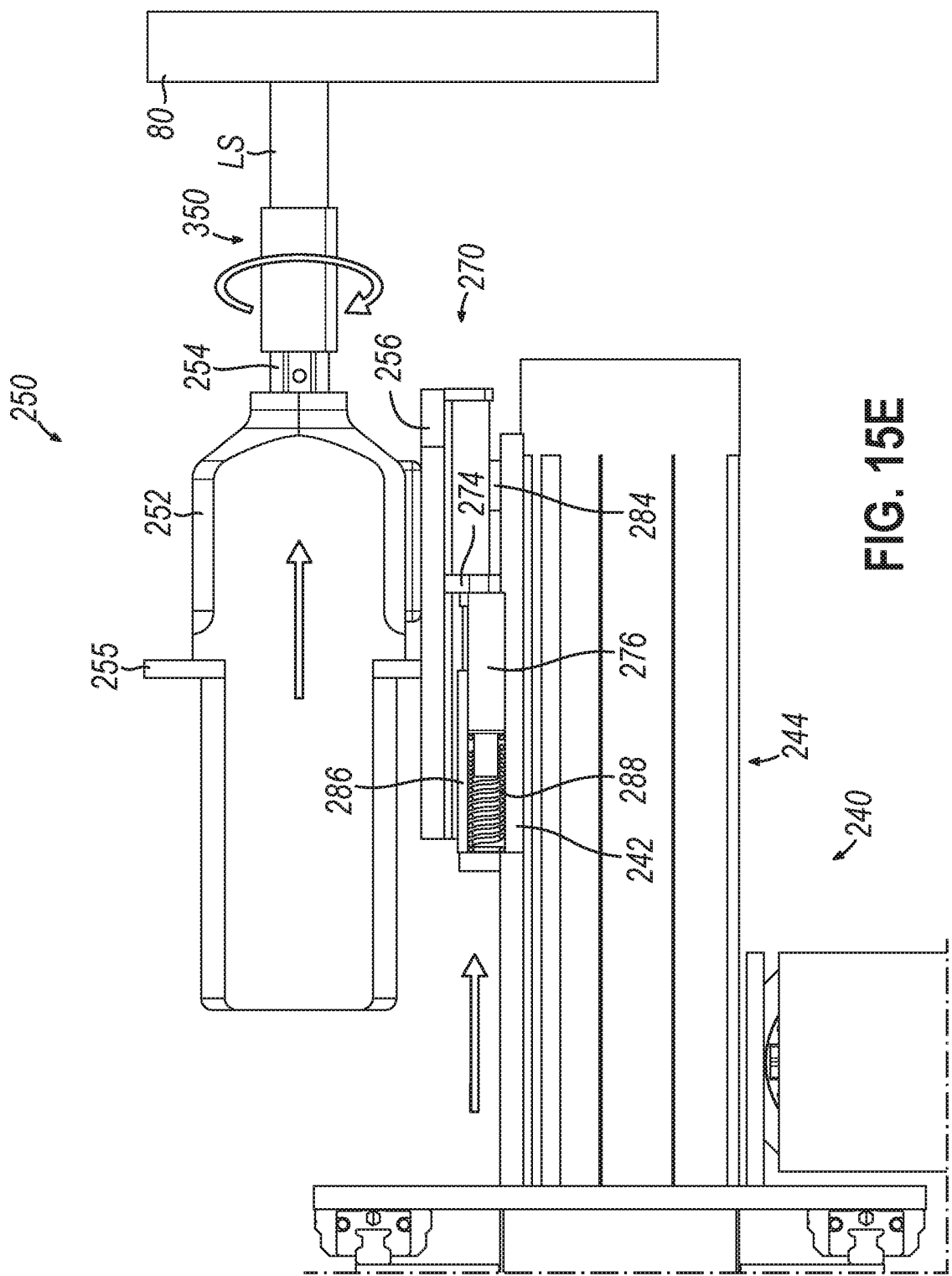
FIG. 15E is a partial cross-sectional side view of the longitudinal actuation assembly of FIG. 13 and the torque gun assembly of FIG. 11A, where the socket housing a lug nut of FIG. 15A is driven such that the lug nut travels along the lug stud in a second direction, where the trolley of FIG. 15A is in the third position, where the torque gun assembly is in the first position relative to the trolley.

Next, as shown in FIGS. 15D-15E, torque gun (252) may activate driver (254) such that socket (350) drives the lug nut along lug stud (LS). Again, this movement causes mounting plate (256) to actuate relative to trolley (242), which in turn drives guide rods (276) to compress/expand biasing spring (288), and also moves bracket (274) away from/toward stop (284). Therefore, torque displacement assembly (270) allows torque gun (252) to actuate relative to trolley (242) due to the torqueing of a lug nut without imparting a reactionary force onto motor (244).

IV. Exemplary Socket Housing Assembly

Robot assembly (10) may need to service a multitude of vehicles that may have different hub assemblies (80) with different-sized lug nuts and lug studs (LS) as compared to other vehicles. Therefore, robot assembly (10) may need to access different-sized sockets (350) in order to service a first vehicle with a first set of hub assemblies (80), then service a second vehicle with a different set of hub assemblies (80).

Additionally, robot assembly (10) may need to access a plurality of sockets (350) of the same size in order to couple and decouple multiple lug nuts from multiple lug studs (LS) of the same wheel hub assembly (80). In particular, it may be desirable to have a plurality of sockets (350) of at least the same quantity of lug nuts required to remove two tires (70) from the same vehicle. That way, when torque gun (252) utilizes a socket (350) to remove a lug nut, robot assembly (10) may decouple with the socket (350) housing a lug nut, then couple with a new socket (350) that does not have lug nut in order to remove another lug nut from wheel assembly (80). Conversely, when torque gun (252) is finished installing a lug nut on a lug stud (LS), robot assembly (10) may decouple with the socket (350) no longer housing a lug nut and then couple with a new socket (350) that is housing a lug nut in order to attach another lug nut to another lug stud (LS) of the wheel assembly (80). Additionally, it may be desirable to house sockets (350) in an organized fashion to allow torque gun (252) to easily couple and decouple with sockets (350).

Figure 17:
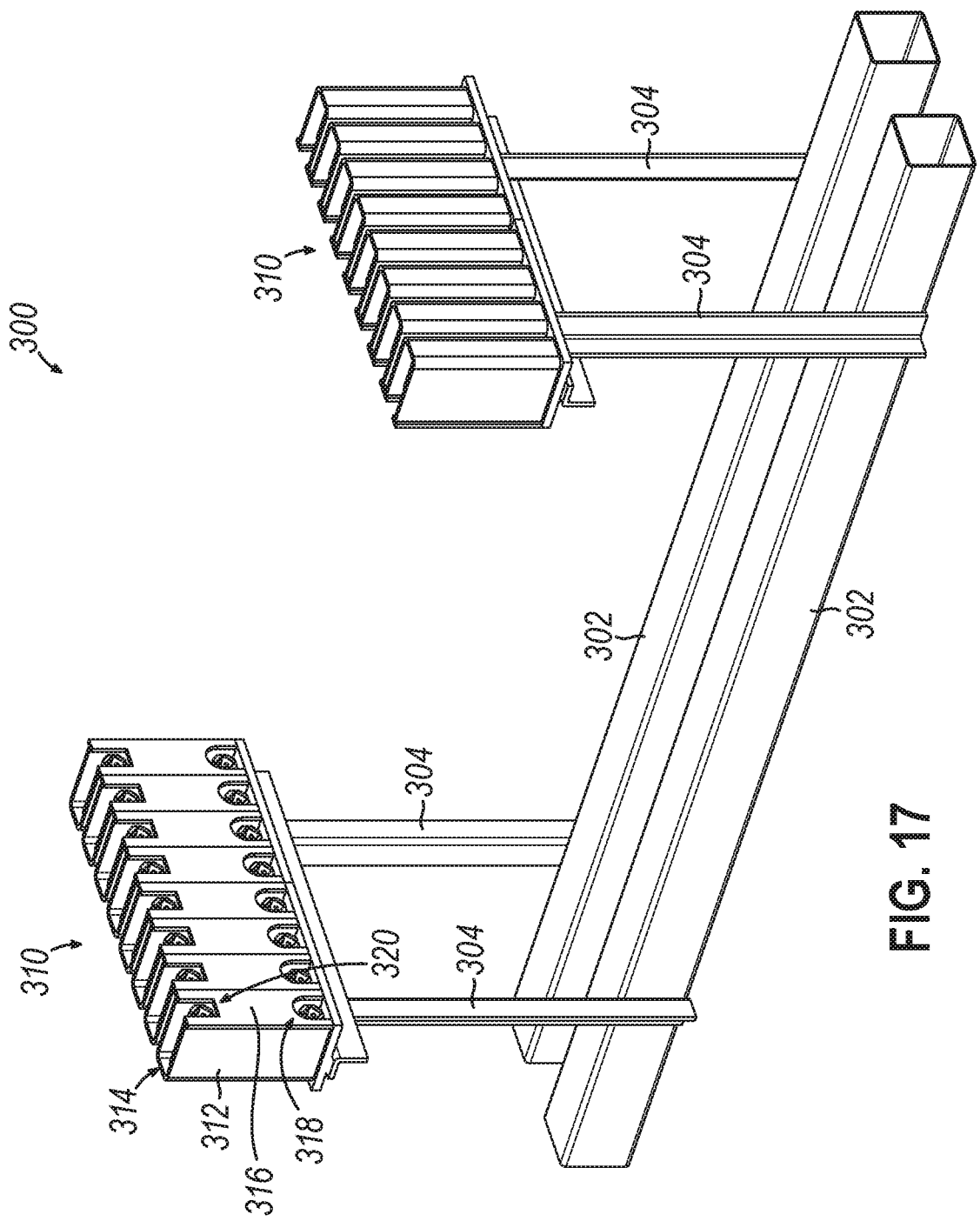
FIG. 17 is a perspective view of the socket holder assembly of FIG. 16A.
Figure 18:
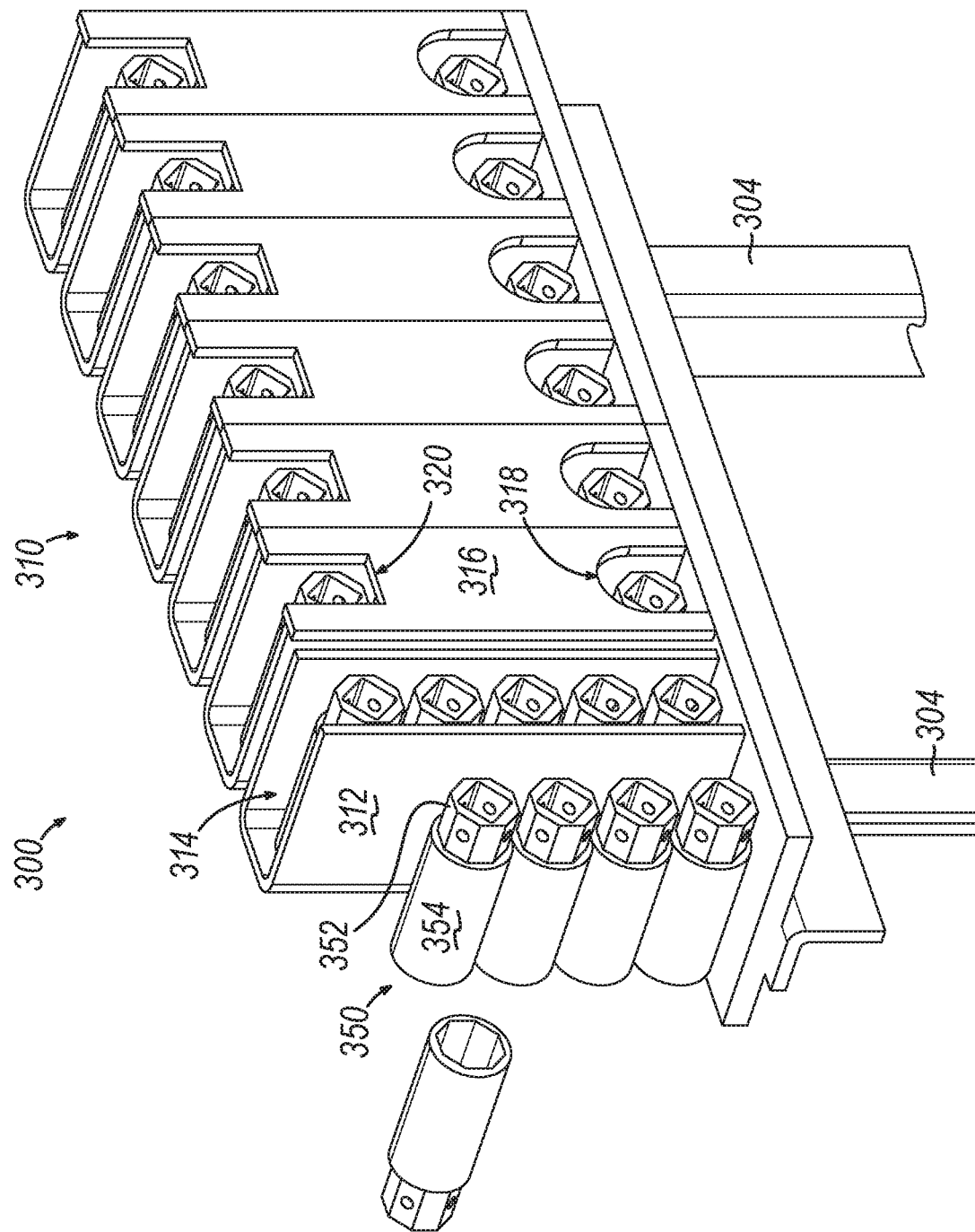
FIG. 18 is a perspective view of a plurality of socket housings of the socket holder assembly of FIG. 16A, with selected portions omitted for purposes of clarity.

FIGS. 17-18 show an exemplary socket holder assembly (300) used to store a plurality of sockets (350) such that robot assembly (10) may remove two tires (70) at the same time, then recouple those tires (70) back onto different hub assemblies (80). Socket holder assembly (300) includes two structure support bars (302) extending between two pluralities of socket housings (310). Socket housing support bars (304) extend from structure support bars (302) to support each plurality of socket housings (310). Each plurality of socket housings (310) is located such that torque gun (252) may access socket housings (310) when rotated to face a first window (15) or a second window (15) of external casing (12).

Each socket housing (312) is configured to hold an array of sockets (350) that are the same size. Each individual socket housing (312) may house a different-sized array of sockets (350) compared to other individual socket housings (312), although this is merely optional. Each socket housing (312) of the plurality of socket housings (310) includes an open top (314) and a front plate (316) defining a socket-coupling portion (318) and a socket-decoupling portion (320). Socket-decoupling portion (320) is located adjacent to open top (314). Sockets (350) include a drive-coupling end (352) and a lug-nut-coupling end (354). Driver-coupling ends (352) face toward front plate (316) when housed within socket housing (312).

Socket-coupling portion (318) defines a gap large enough for sockets (350) as well as driver (254) to slide through. Therefore, when robot assembly (10) desires to couple with a socket (350) within housing (312), robot assembly (10) may actuate torque gun (252) such that driver (254) actuates through an opening defined by socket-coupling portion (318) and suitably couple with a driver-coupling end (352) of a socket (350). Once coupled, robot assembly (10) may actuate driver (254) and socket (350) together out of socket-coupling portion (318), and then use socket (350) in accordance with the description herein.

Socket-decoupling portion (320) includes side walls that define a gap. This gap is large enough to accommodate driver (254) of torque gun (252), but it is not large enough for socket (350) to translate through. The gap also extends into open end (314). That way, when robot assembly (10) desires to decouple with socket (350), robot assembly (10) may move torque gun (252) such that driver (254) actuates socket (350) within the interior of housing (312) via open end (314), and then driver (254) actuates through the gap defined by side walls of decoupling end (354), thereby forcing socket (350) to decouple with driver (254).

V. Exemplary Wheel-Clamping Assemblies

FIGS. 19-24E show various features of wheel-clamping assemblies (400, 500). As mentioned above, and as will be described in greater detail below, upper wheel-clamping assembly (400) and lower wheel-clamping assembly (500) are configured to selectively grasp and rotate tires (70) so robot assembly (10) may remove tires from a first hub assembly (80), and then reattach the tire to a second hub assembly (80).

Figure 19:
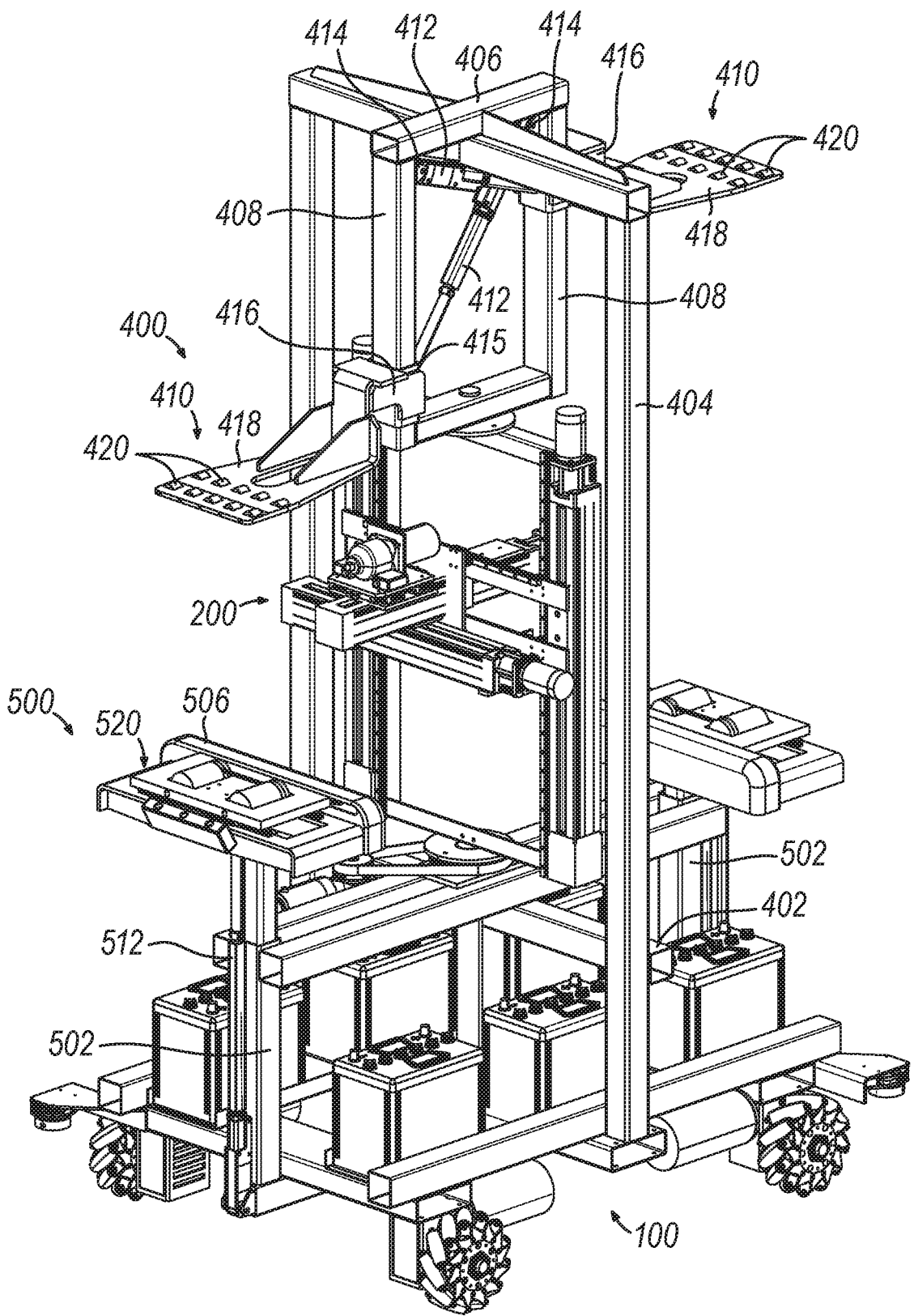
FIG. 19 is a perspective view of the automatic wheel changer robot assembly of FIG. 1, with the external casing and socket holder assembly of FIG. 16A omitted for clarity.
Figure 20A:
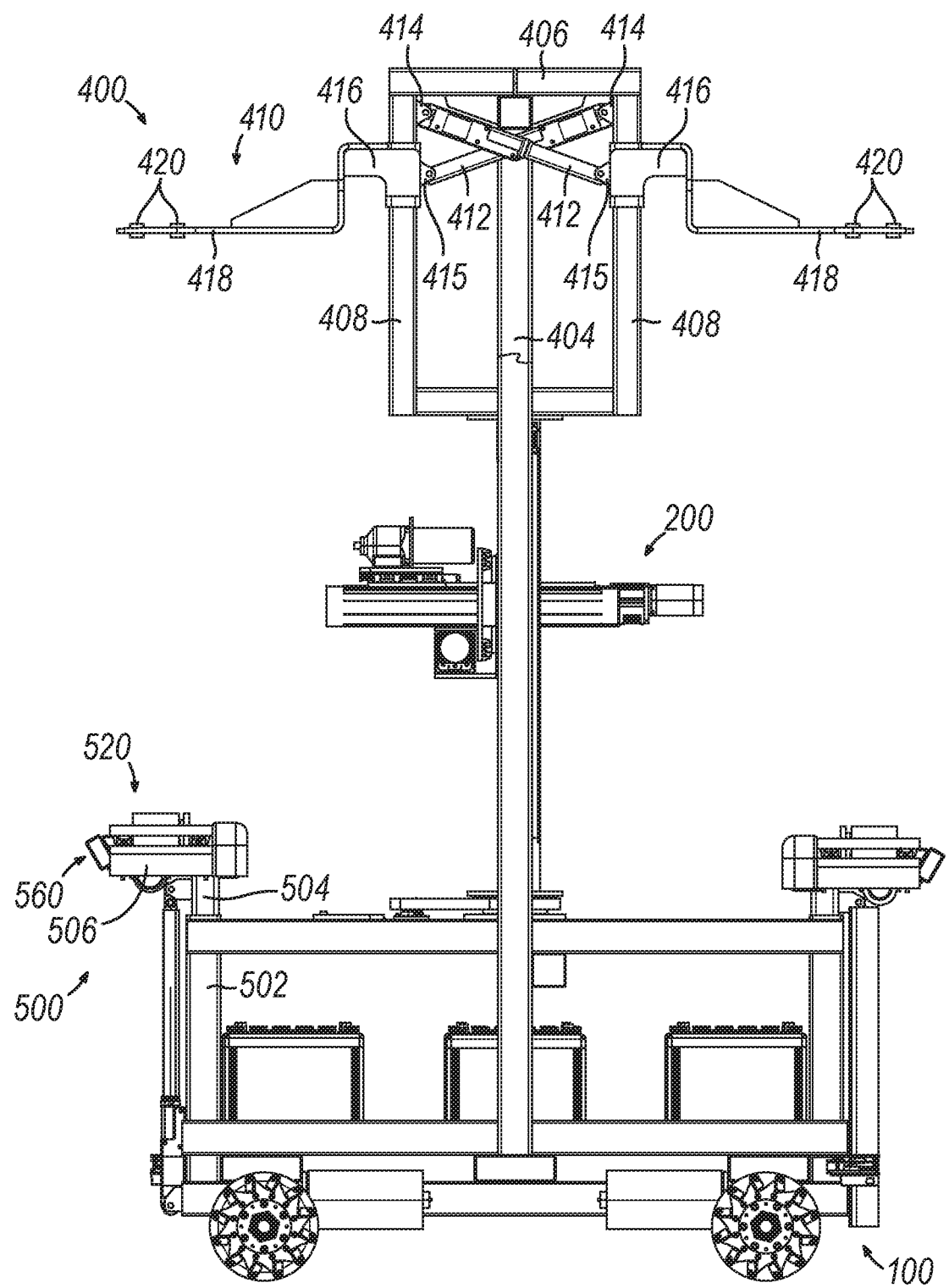
FIG. 20A is an elevation side view of the automatic wheel changer robot assembly of FIG. 1, with the external casing omitted for clarity, where an upper wheel-clamping assembly is a raised position, where a lower wheel-clamping assembly is in a lowered position.
Figure 20B:
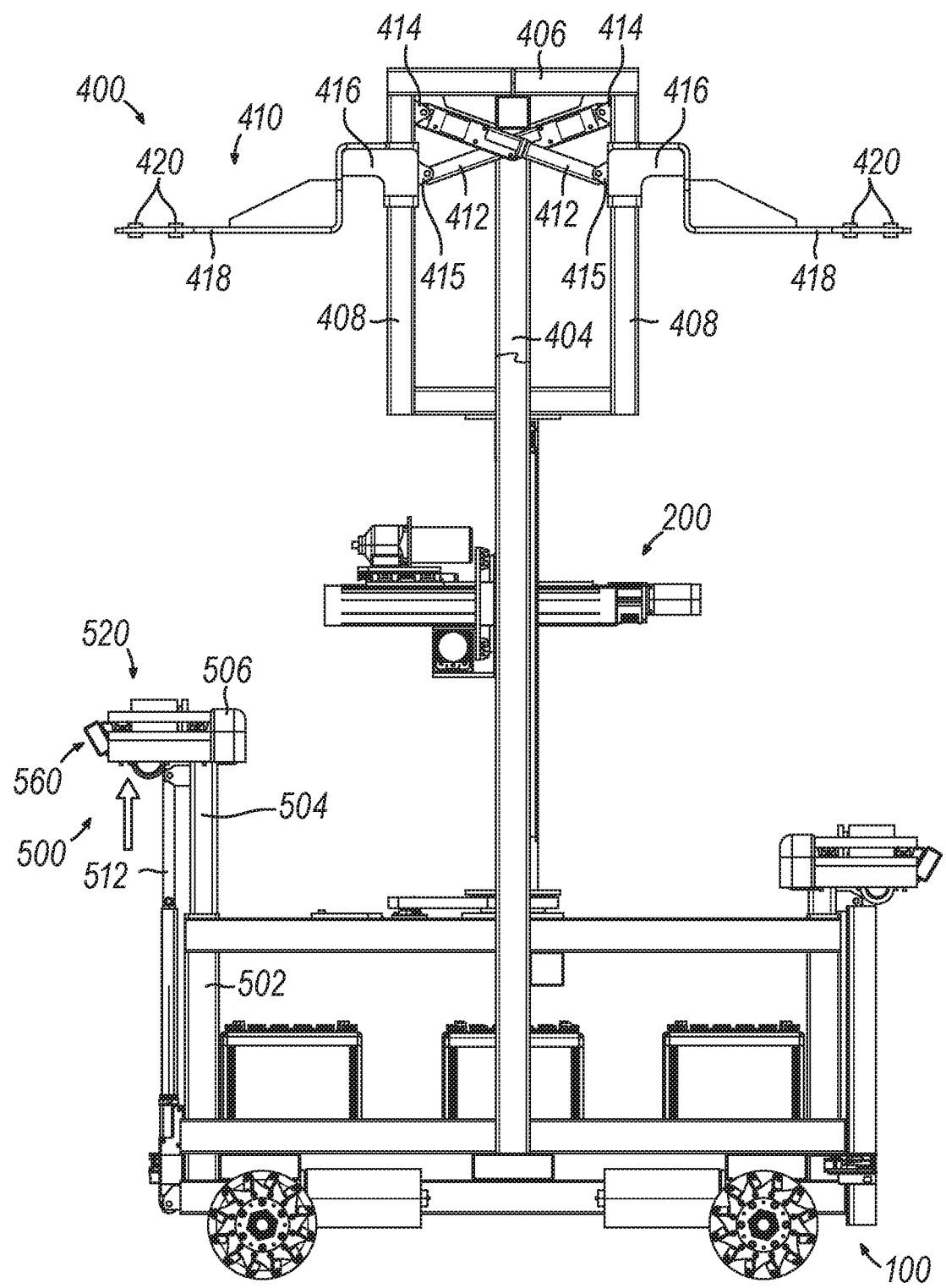
FIG. 20B is an elevation side view of the automatic wheel changer robot assembly of FIG. 1, with the external casing omitted for clarity, where the upper wheel-clamping assembly of FIG. 20A is in the raised position, where the lower wheel-clamping assembly of FIG. 20A is in a raised position.
Figure 20C:
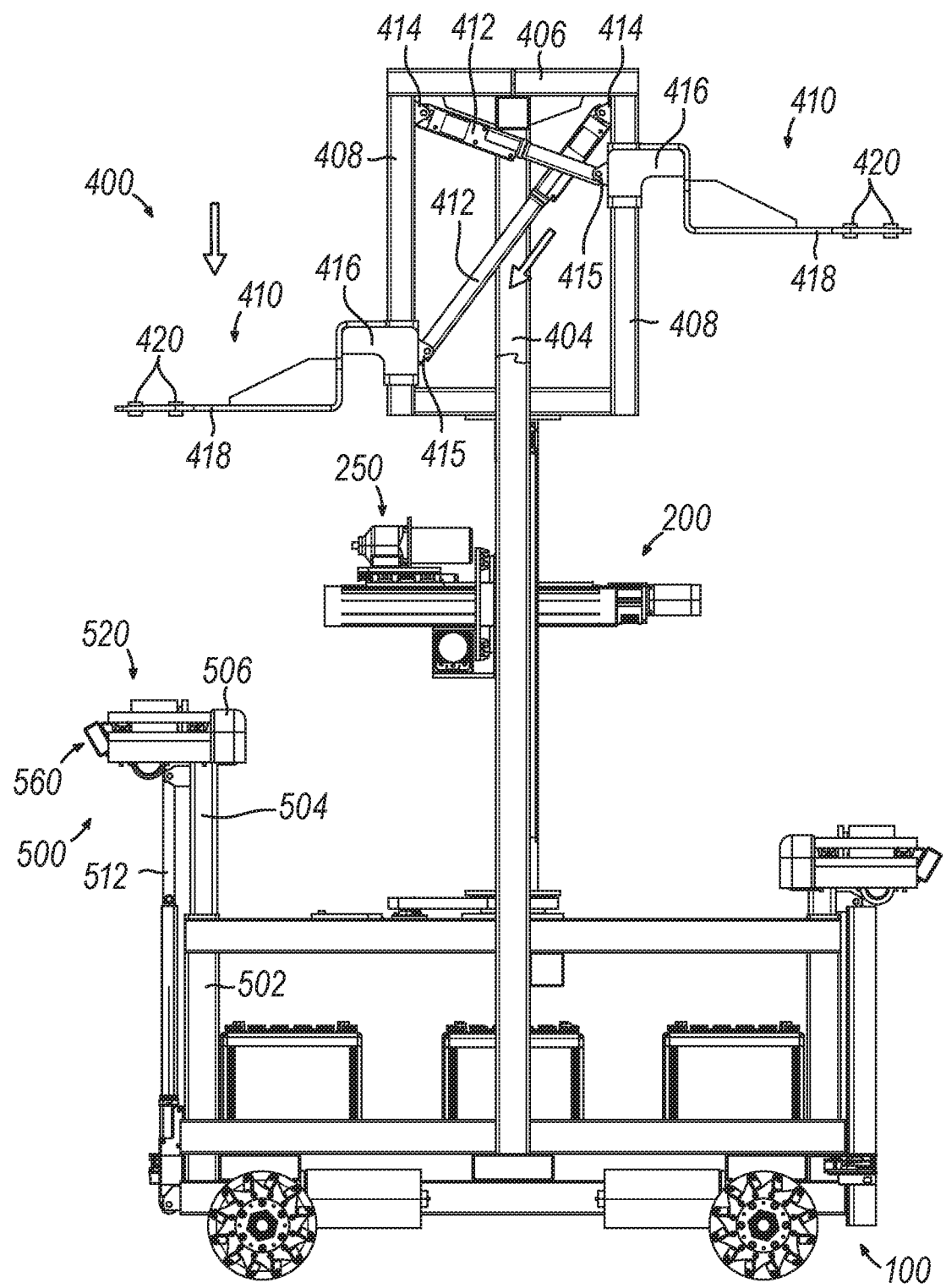
FIG. 20C is an elevation side view of the automatic wheel changer robot assembly of FIG. 1, with the external casing omitted for clarity, where the upper wheel-clamping assembly of FIG. 20A is in the raised position, where the lower wheel-clamping assembly of FIG. 20A is in a lowered position.

As best shown in FIGS. 19-20C, upper wheel-clamping assembly (400) includes a crossbar (402), a structural frame (404), an actuation frame (406) including a pair of slide rails (408), and a pair of actuating clamp assemblies (410). Crossbar (402), structural frame (404), and actuation frame (406) are configured to structurally support actuating clamp assemblies (410) so actuating clamp assemblies (410) may suitably grasp tires (70) in accordance with the description herein.

Actuating clamping assemblies (410) include a linear actuator (412), a sliding collar (416), a clamping body (418), and a plurality of idler rollers (420) rotatably attached to clamping body (418). Clamping body (418) is fixedly attached to sliding collar (416), while sliding collar (416) is slidably attached to a respective slide rail (408). Sliding collar (416) is configured to actuate along a respective slide rail (408) such that clamping body (418) may adjust its distance relative to its respective lower wheel-clamping assembly (500).

Linear actuator (412) is pivotably coupled to actuation frame (406) via pivot (414) at a first end. Additionally, linear actuator (412) is pivotably coupled to sliding collar (416) via pivot (415) at a second end. Linear actuator (412) is configured to adjust its overall length in order to drive sliding collar (416) along slide rail (408). In particular, linear actuator (412) may actuate between a fully contracted position (as shown in FIGS. 20A-20B) and a fully expanded position (as shown in FIG. 20C). As linear actuator (412) actuates between the contracted position and the expanded position, linear actuator (412) rotates about pivots (414, 415), thereby driving sliding collar (416) along slide rail (408), which in turn adjusts the overall height of clamping body (418).

Linear actuator (412) is in suitable communication with internal processing and storage unit (60) such that internal processing and storage unit (60) may instruct linear actuator (412) to actuate between the contracted position and the expanded position. Processing and storage unit (60) may track the liner displacement of linear actuator (412) to thereby determine the vertical position of clamping body (418) relative to the rest of robot assembly (10). Additionally, or alternatively, internal processing and storage unit (60) may use information from other sensors or cameras in order to determine the vertical position of clamping body (418) relative to robot assembly (10) or to determine how to instruct linear actuator (412) to drive clamping body (418).

Therefore, internal processing and storage unit (60) may control linear actuator (412) in order to move clamping body (418) to a selected vertical height. Internal processing and storage unit (60) may alter the vertical height of clamping body (418) in order to selectively grasp tires (70) in accordance with the description herein.

As best shown in FIGS. 19-22, lower wheel-clamping assembly (500) includes support bars (502), an actuation support (504) slidably attached to a respective support bar (502), a base structure (506), a vertical linear actuator (512), a lateral linear actuator (514) housed within base structure (506), a drive roller assembly (520) coupled with base structure (506), and a sensor assembly (560) attached to base structure (506).

As will be described in greater detail below, drive roller assembly (520) is configured to actuate laterally and vertically. In particular, drive roller assembly (520) may actuate laterally relative to base structure (506) in order to laterally align drive roller assembly (520) with a tire (70) to suitably engage tire (70); while drive roller assembly (520) and base structure (506) are configured to actuate vertically relative to support bar (502) in order to suitably grasp tire (70) in conjunction with upper wheel-clamping assembly (400). As will also be described in greater detail below, drive roller assembly (520) is configured to rotate a grasped tire (70) about its central axis in order to align lug stud openings (72) of tire (70) with lug studs (LS) of hub assembly (80) of a vehicle.

Support bars (502) are configured to structurally support base structure (506) and drive roller assembly (520) so drive roller assembly (520) may suitably grasp tires in accordance with the description herein. Drive roller assembly (520) is operatively coupled with support structure (506) so that drive roller assembly (520) vertically actuates with support structure (506), but also such that drive roller assembly (520) may laterally actuate relative to support structure (506).

Base structure (506) and drive roller assembly (520) are operatively coupled to actuating support (504) and vertical linear actuator (512). Vertical linear actuator (512) is mechanically grounded to a respective support bar (502). As best seen between FIGS. 20A-20B, vertical linear actuator (512) is coupled to base structure (506) such that vertical linear actuator (512) may raise and lower drive roller assembly (520) between a fully contracted position (as shown in FIG. 20A) and a fully expanded position (as shown in FIGS. 20B-20C). As mentioned above, actuating support (504) is slidably coupled to support bars (502). Additionally, actuating support (504) is coupled to base structure (506) in order to provide further structural support of base structure (506).

Vertical linear actuator (512) is in suitable communication with internal processing and storage unit (60) such that internal processing and storage unit (60) may instruct linear actuator (512) to actuate between the contracted position and the expanded position. Processing and storage unit (60) may track the linear displacement of linear actuator (512) to thereby determine the vertical position of base structure (506) and drive roller assembly (520) relative to the rest of robot assembly (10). Additionally, or alternatively, internal processing and storage unit (60) may use information from other sensors or cameras in order to determine the vertical position of base structure (506) and drive roller assembly (520) relative to robot assembly (10) or to determine how to instruct linear actuator (512) to drive base structure (506).

Therefore, internal processing and storage unit (60) may control linear actuator (512) in order to move base structure (506) and drive roller assembly (520) to a selected vertical height. Internal processing and storage unit (60) may alter the vertical height of base structure (506) and drive roller assembly (520) in order to selectively grasp tires (70) in accordance with the description herein.

Figure 21:
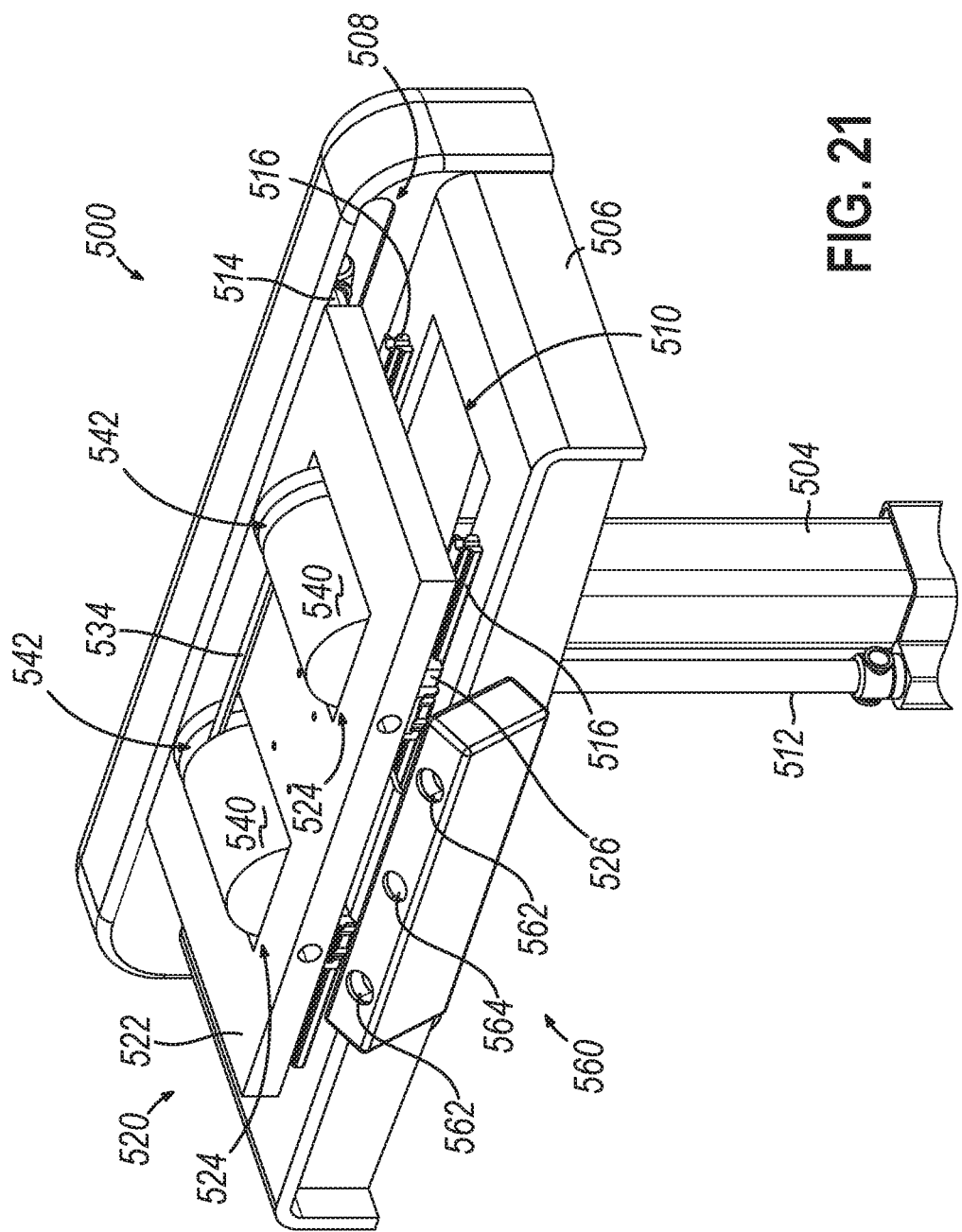
FIG. 21 is a perspective view of the lower wheel-clamping assembly of FIG. 20A.
Figure 22:
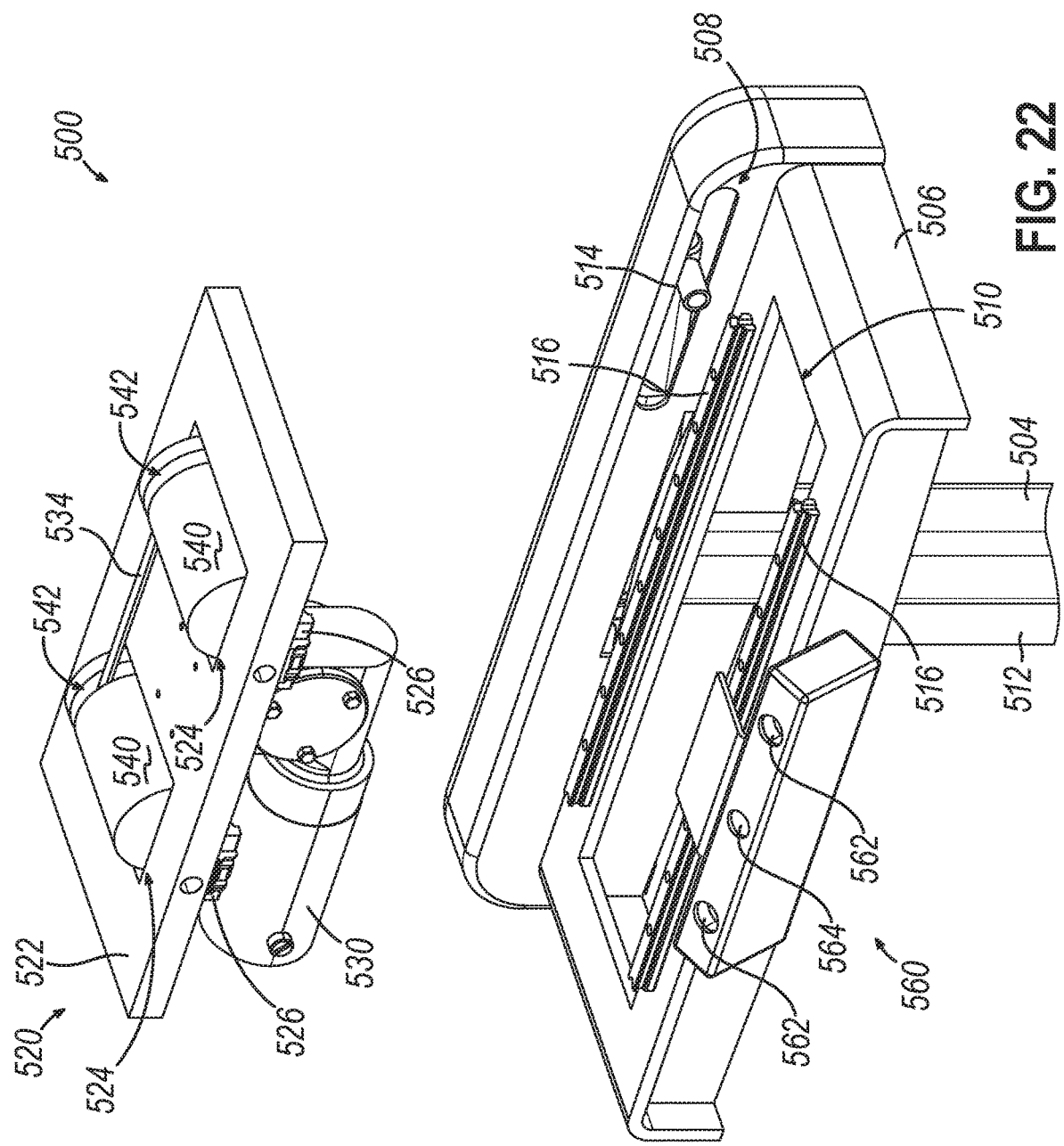
FIG. 22 is an exploded perspective view of the lower wheel-clamping assembly of FIG. 20A.
Figure 23:
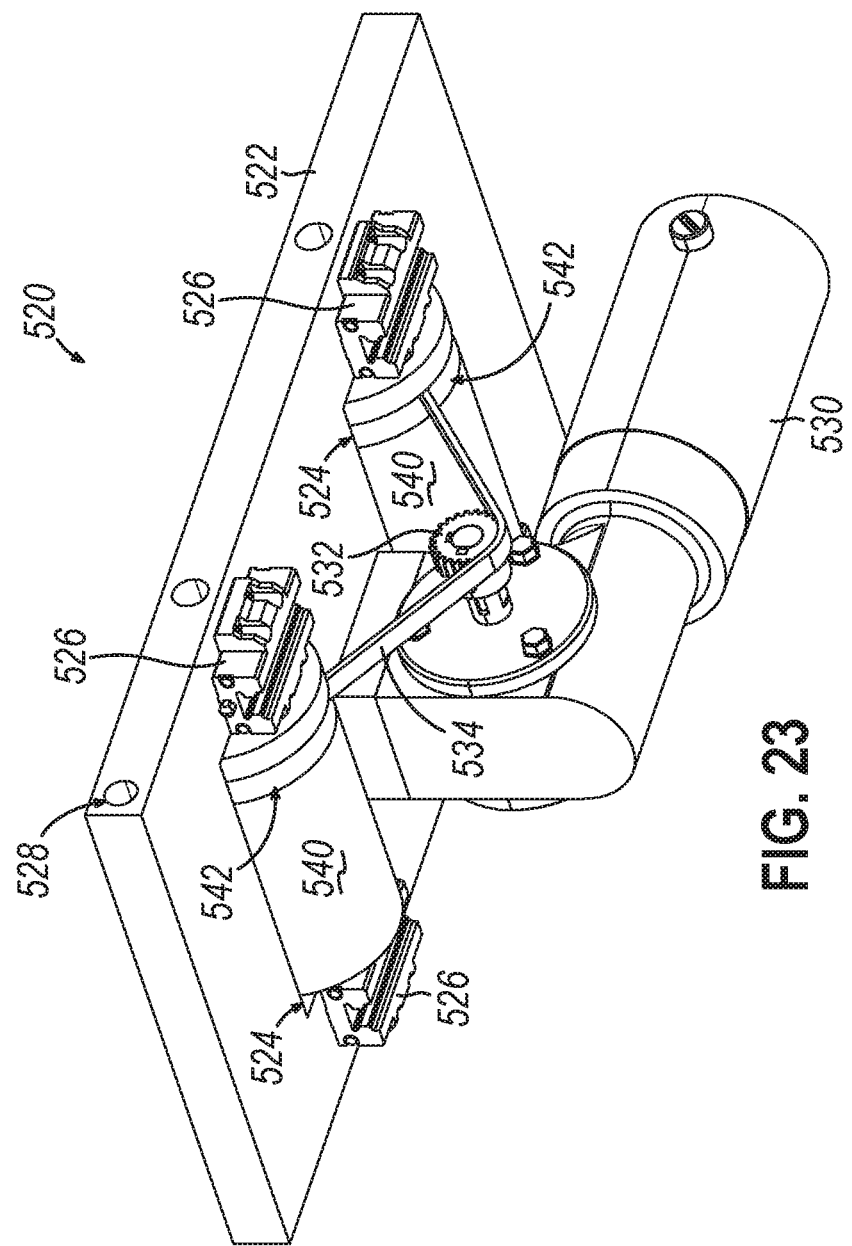
FIG. 23 is a perspective view of a drive roller assembly of the lower wheel-clamping assembly of FIG. 20A.

FIGS. 21-23 show base structure (506), drive roller assembly (520), and sensor assembly (560) in greater detail. As mentioned above, and as will be described in greater detail below, drive roller assembly (520) may actuate laterally relative to base structure (506) in order to laterally align drive roller assembly (520) with a tire (70) to suitably engage tire (70). Wheel drive roller assembly (520) is also configured to rotate a grasped tire (70) about its central axis.

Sensor assembly (560) includes a pair of lidar assemblies (562) and a camera assembly (564); which may be substantially similar to torque gun lidar assemblies (260) and camera assembly (262) of torque gun actuation assembly (200) described above. Lidar assemblies (562) and camera (564) are also in communication with internal processing and storage unit (60). Lidar assemblies (562) and camera (564) may be used to help align and verify that wheel clamp assemblies (400, 500) are suitably aligned with wheel hub assembly (80) in accordance with the description herein. Lidar assemblies (562) and camera (564) may be used to map out a wheel hub assembly, such as determining the absolute and/or relative location of a plurality of lug studs (LS) on wheel hub assembly (80), in order for internal processing and storage unit (60) to suitably direct mobile base assembly (100), torque gun actuation assembly (200), and wheel clamp assemblies (400, 500) in accordance with the description herein. Therefore, internal processing and storage unit (60) may use information obtained from lidar assemblies (562) and camera (564) to generate actuation instructions for mobile base assembly (100), torque gun actuation assembly (200), and clamp assemblies (400, 500) in accordance with the description herein.

Base structure (506) houses lateral linear actuator (514). Lateral linear actuator (514) partially extends out of a guide slot (508) defined by base structure (506) such that lateral linear actuator (514) may suitably couple with a base (522) of drive roller assembly (500). Lateral linear actuator (514) is mechanically grounded to base structure (506) such that lateral linear actuator (514) may expand and contract its overall length relative to base structure (506).

Base structure (506) also includes a pair of lateral guide rails (516) and defines a driver roller opening (510). Drive roller opening (510) is dimensioned to receive selected portions of drive roller assembly (520). Lateral guide rails (516) are configured to receive a lateral carriage (526) of drive roller assembly (520) in order to slidably couple base structure (506) with base (522) of drive roller assembly (520). Therefore, lateral guide rails (516) and lateral carriages (526) allow drive roller assembly (520) to actuate laterally relative to base structure (506), but also allows base structure (506) to structurally support drive roller assembly (520).

Drive roller assembly (520) includes base (522), lateral carriages (526), a DC reduced-speed stepper motor (530), a drive shaft (532), two drive rollers (540), and a belt (534). Lateral carriages (526) are fixed to the underside of base (522). Base (522) defines two drive roller openings (524) that each receive a respective drive roller (540). Drive rollers (540) are rotatably coupled with base (522) such that drive rollers (540) actuate with base (522) relative to base structure (506). Base (522) also includes a lateral linear actuator coupling (528) configured to couple base (522) with lateral linear actuator (514). Lateral linear actuator (514) is coupled to base (522) such that expansion and contraction of the overall length of lateral linear actuator (514) relative to base structure (506) drives translation of base (522), and therefore the rest of drive roller assembly (520), along the path defend by lateral guide rails (516).

Lateral linear actuator (514) is in suitable communication with internal processing and storage unit (60) such that internal processing and storage unit (60) may instruct lateral linear actuator (514) to actuate between the contracted position and the expanded position. Processing and storage unit (60) may track the linear displacement of lateral linear actuator (514) to thereby determine the lateral position of drive roller assembly (520) relative to base structure (506). Additionally, or alternatively, internal processing and storage unit (60) may use information from other sensors or cameras in order to determine the lateral position of drive roller assembly (520) relative to base structure (506) or to determine how to instruct linear actuator (514) to drive base (522).

Therefore, internal processing and storage unit (60) may control lateral linear actuator (514) in order to move drive roller assembly (520) to laterally align drive roller assembly (520) with tire (70). Internal processing and storage unit (60) may alter the lateral position of drive roller assembly (520) in order to selectively grasp tires (70) in accordance with the description herein.

Stepper motor (530) is coupled to the underside of base (522). Stepper motor (530) is configured to rotate drive shaft (532), which in turn rotates belt (534). Belt (534) is coupled to drive rollers (540) such that rotation of belt drives rotation of drive rollers (540). In the current example, drive roller (540) defines an annular recess (542) that houses a portion of belt (534). Therefore, stepper motor (530) is configured to rotate drive shaft (532), which in turn rotates belt (534) to thereby rotate drive rollers (540). Stepper motor (530) may be a reduced speed motor to enable rotation of drive rollers (540) at a controlled angular velocity.

Stepper motor (530) is in suitable communication with internal processing and storage unit (60) such that internal processing and storage unit (60) may instruct stepper motor (530) to rotate drive shaft (532), which then rotates drive rollers (540). Processing and storage unit (60) may track the angular displacement and/or position of drive shaft (532). Additionally, or alternatively, internal processing and storage unit (60) may use information of other sensors and cameras, such as sensor assembly (560), torque gun lidar assemblies (260), and torque gun cameras (262) in order to determine how internal processing and storage unit (60) may instruct stepper motor (530).

FIG. 24A-24E show an exemplary use of wheel-clamping assemblies (400, 500) to initially grasp tire (70) and then rotate tire (70) about its central axis to angularly align lug stud openings (72) of tire (70) with lug studs (LS) of an exemplary hub assembly (80). FIG. 24A shows wheel-clamping assemblies (400, 500) positioned such that clamping body (418) is adjacent to a top portion of tire (70), and drive rollers (540) are adjacent to a bottom portion of tire (70). It should be understood that in this embodiment clamping body (418) is positioned close enough to tire (70) such that clamping body (418) does not contact or otherwise engage the body or wheel well of the vehicle. This distance may be determined from the vehicle profile described above, specifically the known distance from top of the vehicle wheel to the vehicle body.

It should also be understood that drive rollers (540), as shown in FIG. 24A, may not initially be suitably laterally aligned with tire (70). Sensor assembly (560) may capture images or obtain other data and transmit those images and data to internal processing and storage unit (60) such that internal processing and storage unit (60) may instruct lateral linear actuator (514) to actuate drive roller assembly (520) in the lateral direction that will result in drive rollers (540) being suitably aligned with tire (70). FIGS. 24A-24B show drive roller assembly (520) being laterally actuated via lateral linear actuator (514) such that drive rollers (540) are suitably centered relative to tire (70).

With drive assembly (520) laterally aligned, drive roller assembly (520) may be actuated upward in accordance with the description herein, while clamping body (418) is driven downward in accordance with the description herein. Drive roller assembly (520) and clamping body (418) are actuated until they suitably engage tire (70). Internal processing and storage unit (60) may determine if drive roller assembly (520) and clamping body (418) are suitably engaging tire (70) via any suitably means as would be apparent to one of skill in the art in view of the teaching herein. For instance, internal processing and storage unit (60) may read the level of current going through linear actuators (412, 512) such that the output current of actuators (412, 512) may correlate to the reactionary force tire (70) imposes on linear actuators (412, 512) while wheel-clamping assemblies (400, 500) grasp tire (70).

As best shown in FIG. 24D, with tire (70) suitably grasped by drive roller assembly (520) and clamping body (418), robot assembly (10) may move tire (70) with wheel hub assembly (80) to a desired location. Robot assembly (10) may laterally and vertically align tire (70) with wheel hub assembly (80). In particular, robot assembly (10) may vertically move tire (70) by actuating wheel-clamping assemblies (400, 500), while robot assembly (10) may laterally align tire (70) via movement of mobile base assembly (100). However, as shown in FIG. 24D, lug studs (LS) of wheel hub assembly (80) may not initially be rotationally aligned with lug stud openings (72) of tire (70). Therefore, as shown in FIG. 24E. drive roller assembly (520) may rotate drive rollers (540), in accordance with the description herein, to thereby rotate tire (70) until lug studs (LS) are suitably aligned with lug stud openings (72) as shown in FIG. 24E. Internal processing and storage unit (60) may stop rotation of tire (70) once lug studs (LS) are aligned with lug stud openings (72). Internal processing and storage unit (60) may determine lug studs (LS) are aligned with lug stud openings (72) via any suitably means as would be apparent to one of skill in the art in view of the teachings herein. For instance, cameras (262, 564) may be used in order to track the placement of lug studs (LS) relative to lug stud openings (72).

With lug stud openings (72) aligned with lug studs (LS), robot assembly (10) may attach tire (70) to hub assembly (80) in accordance with the description herein.

Figure 25:
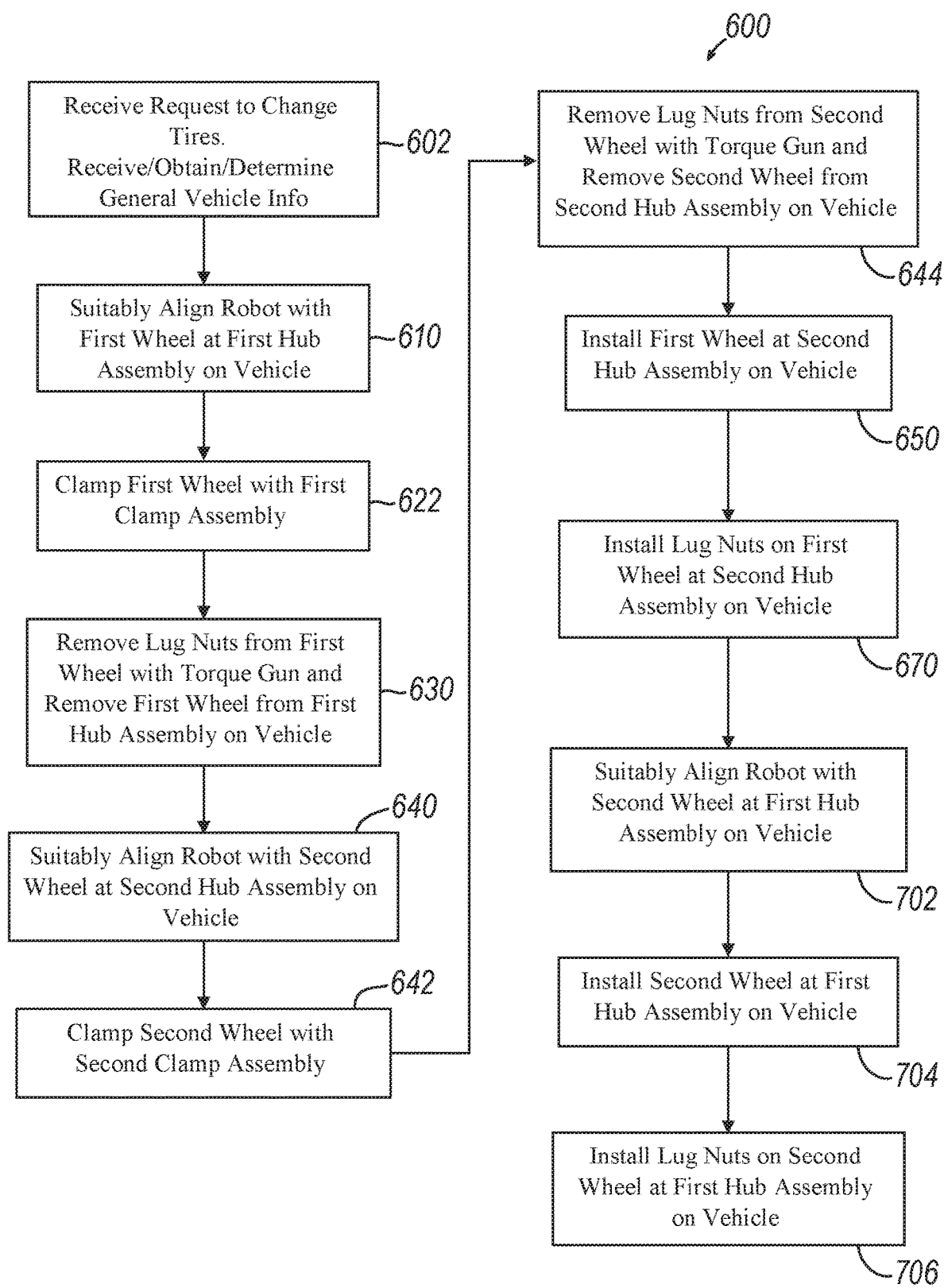
FIG. 25 is a flow chart of a basic tire rotation to be performed by the automatic wheel changer robot assembly of FIG. 1.

VI. Exemplary Method of Changing Wheels on a Vehicle Utilizing Robot Assembly FIG. 25 shows the steps of an exemplary tire rotation process (600) utilizing robot assembly (10) as described above. The order of the individual steps discussed below is merely one example of a number of possible example processes where the order and number of the steps can be varied. It should be understood that prior to starting the tire rotation process (600), robot assembly (10) may be located at the home position coupled with charging station (50) (as shown in FIG. 8). It should also be understood that, prior to starting the tire rotation process (600), a vehicle may be driven over a general perimeter (32) and lifted to an appropriate height for robot assembly (10) to efficiently access and manipulate tires (70) and wheel hub assembly (80) of the lifted vehicle.

With a vehicle suitably lifted by general perimeter (32), a technician may generate a request to change/rotate tires such that robot assembly (10), as shown in step (602), receives the request to change tires. The technician may generate the request to change/rotate tires using any suitable means as would be apparent to one having skill in the art in view of the teachings herein. In some instances, the technician does not generate the request to change tires, but another device generates the request upon specific conditions being satisfied, such as a lift generating the request in response to lifting the vehicle to a predetermined height.

Additionally, the technician may need to provide additional information with the request, such as selecting a vehicle profile, similar to the vehicle profile described above, so that robot assembly (10) operates with estimated or actual parameters associated with the lifted vehicle. Such parameters may include information related to the presence of hub caps, the OEM-recommended lug nut/bolt torque values, the distance from the top of the vehicle wheel to the vehicle body, etc. Robot assembly (10) may also acquire vehicle information in other suitable ways as would be apparent to one having ordinary skill in the art in view of this disclosure, such as identifying the vehicle through use of cameras (14, 16, 262, 564), then uploading or downloading the vehicle profile automatically.

In the instance where the vehicle profile indicates hub caps are present, robot assembly (10) may indicate to the technician to remove those hub caps. Robot assembly (10) may then suspend its operation with respect to the vehicle until the technician communicates with robot assembly (10) that the hub caps have been removed.

Figure 26:
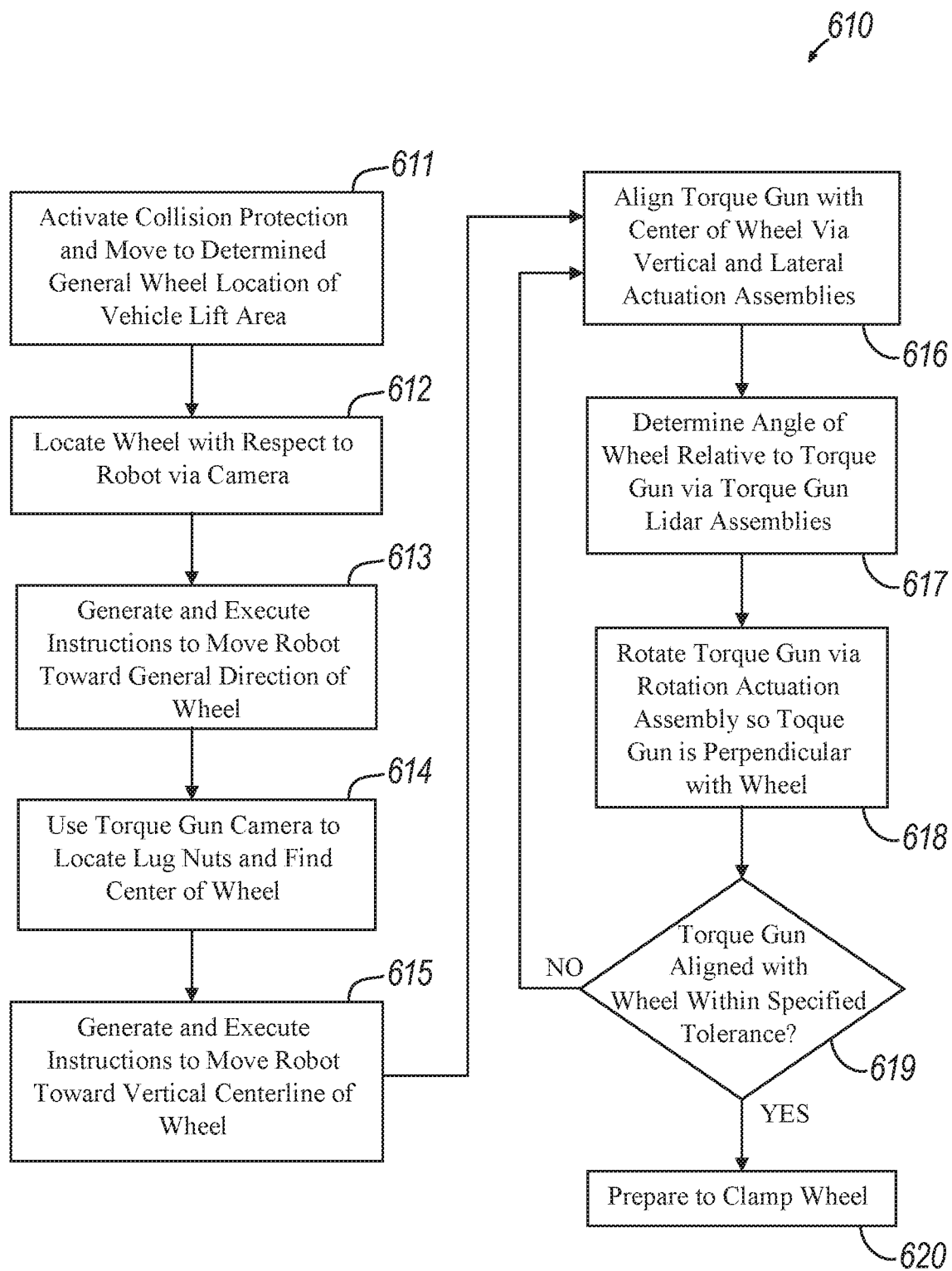
FIG. 26 is a flow chart of the automatic wheel changer robot assembly of FIG. 1 aligned with a wheel attached to a hub assembly of a vehicle.

After robot assembly (10) receives the initial request as shown in step (602), robot assembly (10) moves from the home position and charging station (50) to suitably align with a first tire (70) located at a first hub assembly (80) on the vehicle, as shown in step (610). Step (610) is shown in greater detail in FIG. 26.

As shown in step (611), robot assembly (10) may activate lidar collision avoidance detectors (120) in order to prevent unwanted collision of robot assembly (10) in accordance with the description herein. Additionally, robot assembly (10) may utilize cameras (14, 16) in order to find the proper QR identifier (42, 44, 46, 48) associated with the first hub assembly (80). Once the first hub assembly (80) is located, unit (60) may instruct DC motors (125) to drive front and rear Mecanum wheel assemblies (130, 140) in order to move robot assembly (10) to the first hub assembly (80) associated with the proper QR identifier (42, 44, 46, 48). Mobile base assembly (100) may align a first window (15) to face the general direction of first tire (70) once reaching the first QR identifier (42, 44, 46, 48). As mentioned above, lidar collision avoidance detectors (120) may alter the path robot assembly (10) takes to first hub assembly (80) to avoid collisions. Additionally, lidar collision avoidance detectors (120) may stall movement of robot assembly (10) until a potential obstruction is moved. Robot assembly (10) may also use the second camera (14, 16) that is not locked-in on the proper QR identifier (42, 44, 46, 48) to search for unwanted objects.

Once robot assembly (10) reaches the general wheel/hub location associated with the proper QR identifier (42, 44, 46, 48), robot assembly (10) may locate the targeted first tire (70) associated with first hub assembly (80), as shown in step (612). Robot assembly (10) may utilize any suitable camera (14, 16, 262, 564) to locate the targeted first tire (70). Unit (60) may utilize AI/computer vision to locate the targeted first tire (70) based on images obtained from camera (14, 16, 262, 564). Unit (60) may locate the target first tire (70) using bounded box coordinates and the location of camera (14, 16, 262, 564) used to obtain images of the first tire (70).

Once robot assembly (10) locates the first tire (70) with respect to robot assembly (10), unit (60) may then generate and execute instructions to move robot assembly (10) toward the general direction of wheel (70), as shown in step (613). Robot assembly (10) may move toward the lateral center of wheel (70) (i.e., so that the lateral center of window (15) is aligned with a vertical axis that extends through the central through-hole (74) of tire (70)). Again, movement of robot assembly (10) toward the general direction of wheel (70) may be accomplished by unit (60) instructing DC motors (125) to drive front and rear Mecanum wheel assemblies (130, 140) in accordance with the description herein.

With the first window (15) of robot assembly generally aligned with the lateral center of wheel (70), robot assembly (10) may utilize camera (262) to locate lug nuts and find the center of wheel (70) as shown in step (614). Unit (60) may utilize AI/computer vision to locate the targeted lug nuts and the center of wheel (70) based on images obtained from camera (14, 16, 262, 564). Unit (60) may locate the targeted lug nuts and the center of wheel (70) using bounded box coordinates and the known location of the camera (14, 16, 262, 564) used to obtain images of the targeted lug nuts and the center of wheel (70). Next, as shown in step (615), unit (60) may generate and execute instructions to move robot assembly (10) further toward the vertical center line of wheel (70). In other words, steps (614, 615) are similar to steps (612, 613), respectively, but more refined.

Next, as shown in step (616), unit (60) may actuate torque gun (252) via vertical and lateral actuation assembly (210, 230) in order to align driver (254) of torque gun (252) with the center of the first tire (70) on the first hub (80).

If first tire (70) and first hub (80) are not suitably aligned with driver (254) of torque gun (252) (i.e., if driver (254) extends along an axis that is not aligned with the longitudinal axis of lug studs (LS)), torque gun (252) may not be able to suitably engage the lug nuts and lug studs (LS) in accordance with the description herein. Therefore, as shown in step (617), unit (60) may determine the rotational angle of first tire (70) on first hub (80) relative to torque gun (252) utilizing torque gun lidar assemblies (260). Next, as shown in step (618), unit (60) may rotate torque gun (252) via rotation actuation assembly (202) so torque gun (252) is perpendicular with the first tire (70) of the first hub assembly (80) (i.e., driver (254) extends along an axis that is parallel to, and substantially collinear with, the longitudinal axis of lug studs (LS)).

Next, as shown in step (619), unit (60) may verify that torque gun (252) is suitably aligned with first tire (70) within the specified tolerance. Unit (60) may utilize information from torque gun lidar assemblies (260), torque gun camera (262), or any other suitable sensor/detector to verify alignment of torque gun (252) with first tire (70), as would be apparent to one or ordinary skill in the art in view of the teachings herein. If unit (60) determines torque gun (252) is not suitably aligned with first tire (70) within the specified tolerance, robot assembly (10) may return to step (616) and repeat the process until torque gun (252) is suitably aligned with first tire (70). If unit (60) determines torque gun (252) is suitably aligned with first tire (70) within the specified tolerance, robot assembly (10) may then prepare to clamp the first tire (70), as shown in step (620).

Figure 27:
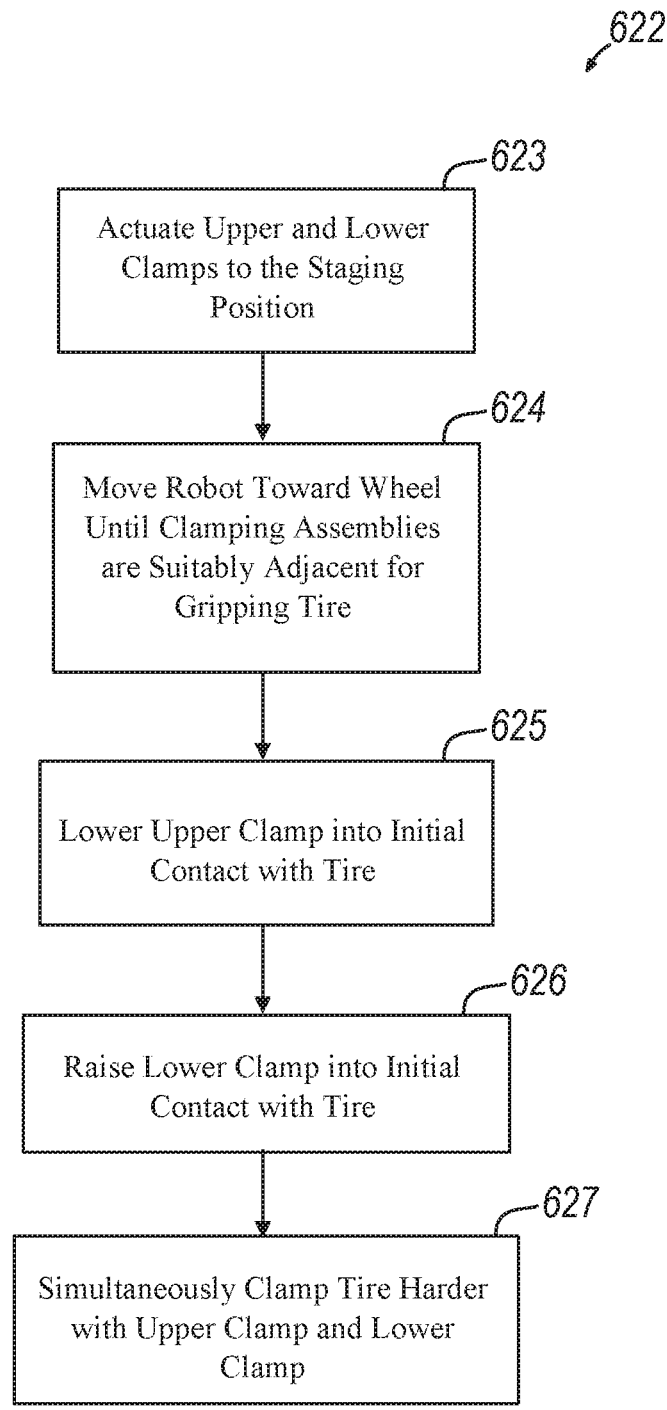
FIG. 27 is a flow chart of the automatic wheel changer robot assembly of FIG. 1 clamping a wheel attached to the hub assembly of a vehicle.

With step (610) completed, as shown in FIG. 25, robot assembly (10) may then suitably clamp first tire (70) with portions of upper and lower wheel-clamping assemblies (400, 500) associated with the first window (15), as shown in step (622). Step (622) is further elaborated in FIG. 27. As shown in step (623), unit (60) may instruct wheel-clamping assemblies (400, 500) to move clamping body (418) and drive roller assembly (520) to vertical "staging position," similar to the position shown in FIG. 24A. It should be understood that robot assembly (10) may utilize information from the vehicle profile in order to determine what a vertical height for clamping body (418) in order to not damage the body of vehicle. Additionally, robot assembly (10) may utilize information from the vehicle profile in order to determine the gap between clamping body (418) and drive roller assembly (520) in the staging position.

With step (623) complete, unit (60) may instruct mobile base assembly (100) to move robot assembly (10) toward first tire (70) and first hub assembly (80) such that wheel-clamping assemblies (400, 500) are suitably adjacent for gripping first tire (70). Unit (60) may utilize torque gun lidar assemblies (260) may make sure robot assembly (10) does not actuate too far toward wheel (70) such that robot assembly (10) potentially damages the vehicle. Unit (60) may adjust the positioning of lower wheel-clamping assembly (500) to suitably align driver rollers (540) in accordance with the description herein.

Next, as shown in steps (625, 626), unit (60) may instruct upper wheel-clamping assembly (400) to actuate clamping body (418) downward to initially engage first tire (70) in accordance with the description herein, while unit (60) may instruct lower wheel-clamping assembly (500) to actuate drive roller assembly (520) upward to initially engage first tire (70) in accordance with the description herein.

Unit (60) may control the amount the force wheel-clamping assemblies (400, 500) use to grasp tire (70) and adjust the force used in accordance with the description herein. For instance, unit (60) may measure the current flowing through linear actuators (412, 512) in order to calculate the force used to grasp tire (70). Next, as shown in step (627), unit (60) may instruct wheel-clamping assemblies (400, 500) to simultaneously grasp tire (70) with a greater force such that tire (70) is suitably clamped by wheel-clamping assemblies (400, 500).

Figure 28:
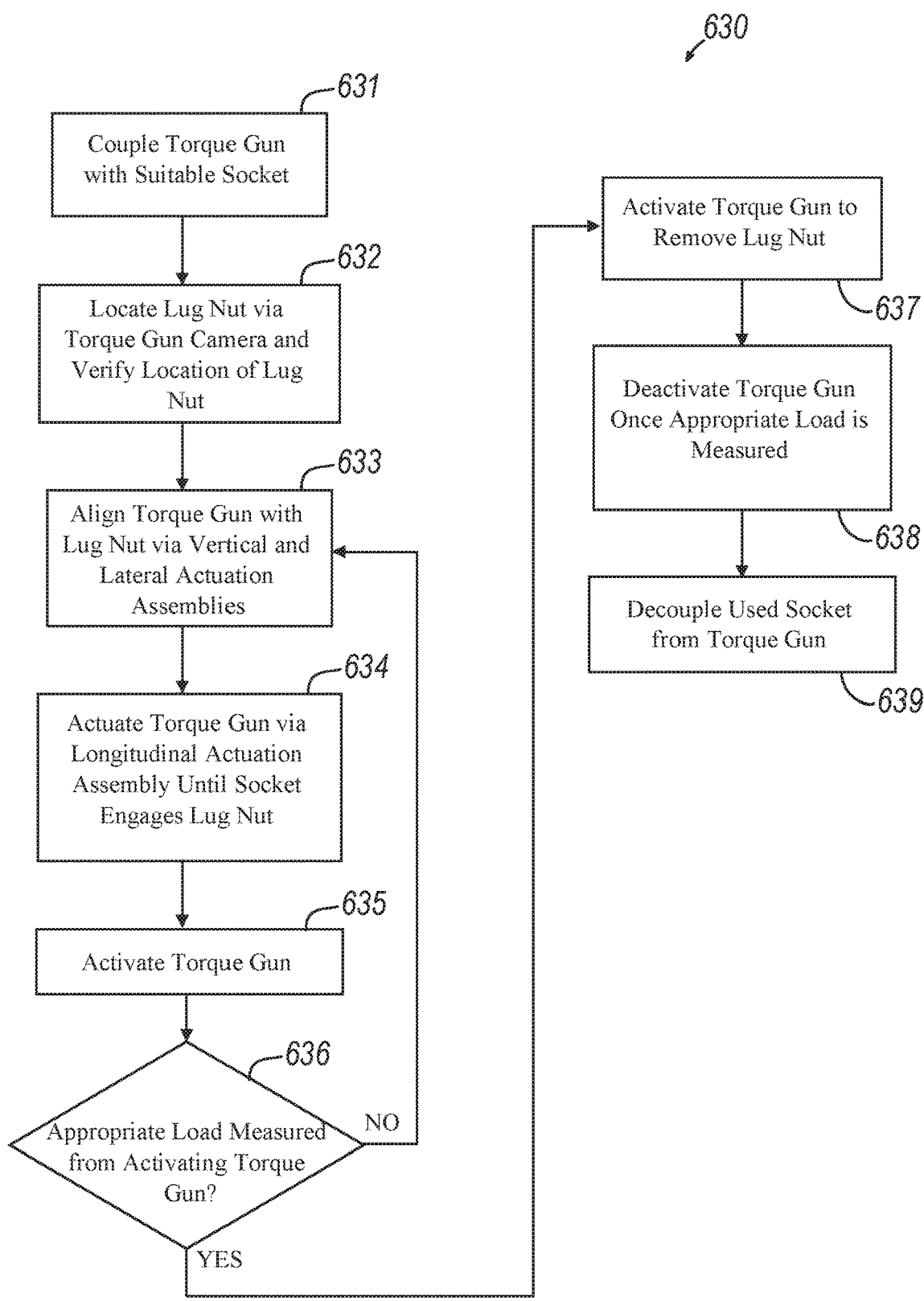
FIG. 28 is a flow chart of the automatic wheel changer robot assembly of FIG. 1 removing lug nuts from a wheel attached to the hub assembly of a vehicle.

Referring back to FIG. 25, with first tire (70) suitably clamped in step (622), robot assembly (10) may then advance to step (630) in order to remove lug nuts from first wheel hub assembly (80) and first tire (70). FIG. 28 shows step (630) in greater detail. First, as shown in step (631), unit (60) may instruct torque gun actuation assembly (200) such that torque gun (252) moves to couple with a suitable socket (350) in accordance with the description herein. Next, as shown in step (632), unit (60) may locate a targeted lug nut and verify that location via torque gun camera (262). Unit (60) may utilize AI/computer vision to locate the targeted lug nut based on images obtained from camera (14, 16, 262, 564). Unit (60) may locate the targeted lug nut using bounded box coordinates and the location of camera (14, 16, 262, 564) used to obtain images of the targeted lug nuts.

Next, as shown in step (633), unit (60) may instruct torque gun actuation assembly (200) to move torque gun (252) into alignment with the targeted lug nut via vertical and lateral actuation assemblies (210, 230). Next, as shown in step (634), unit (60) may instruct torque gun actuation assembly (200) to move torque gun (252) longitudinally until socket (350) associated with driver (254) engages lug nut. Unit (60) may utilize torque gun lidar assemblies (260) to make sure torque gun (252) does not actuate too far toward wheel (70) such that robot assembly (10) potentially damages the vehicle. Unit (60) may also measure the current flowing through DC motor (244) to make sure torque gun (252) does not actuate too far toward wheel (70).

Next, as shown in steps (635, 636), unit (60) may instruct torque gun actuation assembly (200) to activate torque gun (252) and measure the torque load experienced from activating torque gun (252). In particular, if socket (350) coupled to torque gun (252) suitably engages a lug nut, activating torque gun (252) will impart a load on torque gun (252) that is greater than if socket (350) coupled to torque gun (252) is not suitably engaged with a lug nut. Unit (60) may determine this load through any suitably means as would be apparent to one of skill in the art in view of the teachings herein. For instance, unit (60) may measure the current of activating torque gun (252) to estimate the torque load experienced by torque gun (252). If the measured load on torque gun (252) is not within the acceptable range, robot assembly (10) may return to step (633) and repeat those steps until the measured load on torque gun (252) is within the acceptable range. If the measured load on torque gun (252) is within the acceptable range, robot assembly (10) may move to step (637).

Step (637) includes activating the torque gun (252) to remove a lug nut from lug stud (LS) in accordance with the description herein. Next, as shown in step (638), unit (60) may deactivate torque gun (252) once unit (60) determines the torque load experienced by torque gun (252) is within an acceptable range associated with complete removable of the lug nut from lug stud (LS). Next, as shown in step (639) unit (60) may instruct torque gun actuation assembly (200) to move torque gun (252) to decouple the used socket (350) from driver (254) in accordance with the description herein.

Unit (60) may repeat the sub-steps of step (630) until all lug nuts are removed from the first hub assembly (80). Unit (60) may remove lug nuts in a specified pattern according to the vehicle profile. After all lug nuts are removed, robot assembly (10) may complete step (630) by removing the first tire (70) from the first hub assembly (80). In particular, with wheel-clamping assembly (400, 500) still suitably grasping tire (70), and with all lug nuts suitably removed from first hub assembly (80), unit (60) may instruct mobile base assembly (100) to move robot assembly (10) away from hub assembly (80), thereby decoupling first tire (70) from first hub assembly (80).

Next, as shown in step (640), robot assembly (10) may move to the second general wheel location (34, 36, 38, 40) associated with the second hub assembly (80) and second tire (70). Step (640) may be substantially similar to step (610) described above, except robot assembly (10) is moving toward second tire (70) and second hub assembly (80) while holding the first tire (70). Robot assembly (10) may align with the second tire (70) and second hub assembly (80) such that second window (15) faces toward second tire (70) and second hub assembly (80). In other words, the portion of robot assembly (10) grasping first tire (70) is facing away from second tire (70) and second hub assembly (80) so that robot assembly (10) may grasp both first and second tires (70) simultaneously. Additionally, rotation actuation assembly (202) of torque gun actuation assembly (200) may rotate torque gun (252) to align with second window (15) instead of first window (15).

Next, as shown in step (642), robot assembly (10) may grasp the second wheel utilizing portions of wheel-clamping assemblies (400, 500) associated with second window (15) of robot assembly (10). Step (642) may be substantially similar to step (622) described above, except that robot assembly (10) is interacting with second tire (70) at second subassembly (80) with wheel-clamping assemblies (400, 500) associated with second window (15).

Next, as shown in step (644), robot assembly (10) may remove lug nuts from second wheel (70) with torque gun (252) and then remove the second wheel (70) from the second hub (80) such that robot assembly (10) is grasping both the first and second tires (70) simultaneously. Step (644) may be substantially similar to step (630), except robot assembly (10) is interacting with second tire (70) and second hub assembly (80).

Figure 29:
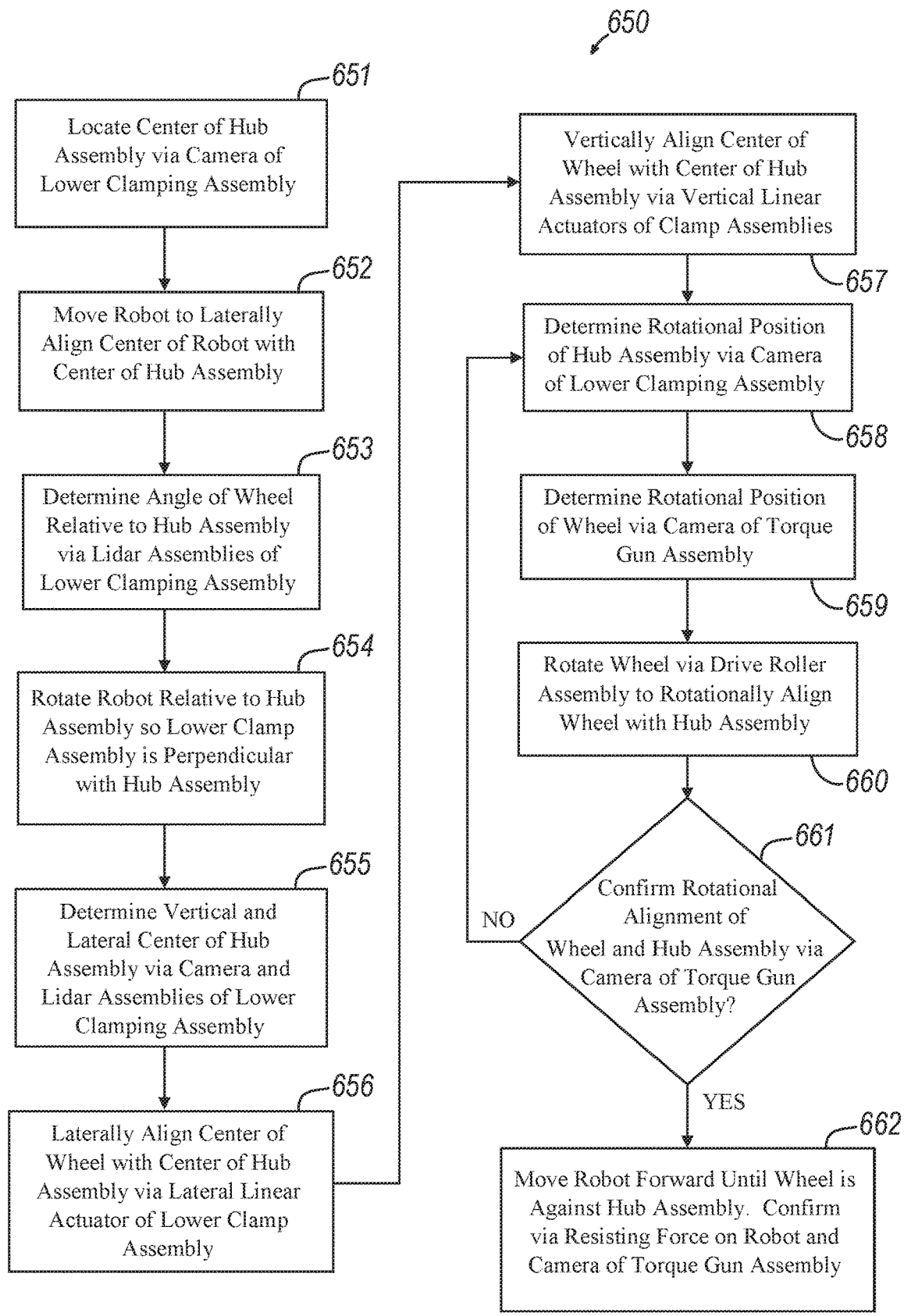
FIG. 29 is a flow chart of the automatic wheel changer robot assembly of FIG. 1 placing a wheel onto a hub assembly of a vehicle.

Next, as shown in step (650), robot assembly (10) may install the first tire (70) at the second hub assembly (80) on the vehicle. FIG. 29 shows step (650) in greater detail. First robot assembly (10) may rotate via mobile base assembly (100) such that first window (15) associated with first tire (70) is now facing second hub assembly (80). Additionally, rotation actuation assembly (202) of torque gun actuation assembly (200) may rotate torque gun (252) to align with first window (15).

Next, as shown in step (651), robot assembly (10) may locate the targeted center of the second hub assembly (80). Since robot assembly (10) is grasping tires (70), torque gun camera (262) may not be able to visually capture the second hub assembly (80). Therefore, camera (564) of sensor assembly (560) may be utilized to image the second hub assembly (80). Unit (60) may utilize AI/computer vision to locate the targeted second hub assembly (80) based on images obtained from camera (14, 16, 262, 564). Unit (60) may locate the target second hub assembly (80) using bounded box coordinates and the location of camera (14, 16, 262, 564) used to obtain images of second hub assembly (80).

Next, as shown in step (652), unit (60) may then generate and execute instructions to move robot assembly (10) toward the lateral center of hub assembly (80). Again, movement of robot assembly (10) toward the center of second hub assembly (80) may be accomplished by unit (60) instructing DC motors (125) to drive front and rear Mecanum wheel assemblies (130, 140).

If second hub assembly (80) has not been suitably aligned with then-grasped first tire (70), lug stud openings (72) may not suitably receive lug studs (LS) in accordance with the description herein. Therefore, as shown in step (653), unit (60) may determine the angle of second hub (80) relative to lower wheel-clamping assembly (500) utilizing lidar assemblies (562) of drive roller assembly (520). Next, as shown in step (654), unit (60) may rotate robot assembly (10) via base movement assembly (100) so lower wheel-clamping assembly (500) is perpendicular with the second hub assembly (80). Unit (60) may verify that lower wheel-clamping assembly (500) is suitably aligned with second hub assembly (80) within a specified tolerance. Unit (60) may utilize information from lidar assemblies (562), camera (564), or any other suitable sensor/detector to verify alignment of lower wheel-clamping assembly (500) (and therefore grasped first tire (70)) with second hub assembly (80) as would be apparent to one of ordinary skill in the art in view of the teachings herein. If unit (60) determines lower wheel-clamping assembly (500) is not suitably aligned with second hub assembly (80) within the specified tolerance, robot assembly (10) may return to step (653) and repeat the process until lower wheel-clamping assembly (500) is suitably aligned with second hub assembly (80). If unit (60) determines that lower wheel-clamping assembly (500) is suitably aligned with second hub assembly (80) within the specified tolerance, robot assembly (10) may then move to step (655).

Next, as shown in step (655), unit (60) may determine the vertical and lateral center of second hub assembly (80) via camera (564) and lidar assemblies (562). Unit (60) may utilize AI/computer vision to locate the center of second hub assembly (80) based on images obtained from camera (14, 16, 262, 564) and data obtained from lidar assemblies (562). Unit (60) may locate the targeted center of second hub assembly (80) using bounded box coordinates and the location of camera (14, 16, 262, 564) used to obtain images of the targeted center of second hub assembly (80).

Next, as shown in step (656), unit (60) may generate and execute instructions to move lower wheel-clamping assembly (500), and therefore first tire (70), further toward the vertical center line of second wheel hub assembly (80). In particular, unit (60) may instruct lateral linear actuator (514) to move drive roller assembly (520) into lateral alignment of second wheel hub assembly (80) such that drive roller assembly (520) carries first tire (70) into lateral alignment with second wheel hub assembly (80). Prior to instructing lateral linear actuator (514) to move drive roller assembly (520), unit (60) may instruct upper wheel-clamping assembly (400) to reduce the clamping force clamping body (418) imparts on first tire (70), thereby allowing first tire (70) to actuate laterally with drive roller assembly (520). After drive roller assembly (520) and first tire (70) are actuated laterally into alignment with second hub assembly (80), clamping body (418) may increase the clamping force that clamping body (418) imparts on first tire (70).

Next, as shown in step (657), unit (60) may instruct upper and lower clamping assemblies (400, 500) to vertically align the center of second hub assembly (80) with the center of tire (70). Upper and lower wheel-clamping assemblies (400, 500) may move in tandem to align the center of second hub assembly (80) with the center of tire (70).

Next, as shown in steps (658, 659), unit (60) may determine the rotational position of the second hub assembly (80) via camera (564); while unit (60) may also determine the rotational position of first tire (70) via torque gun camera (262). In particular, the rotational position of the lug studs (LS) of the second hub assembly (80) may be determined relative to the center of second hub assembly (80) while the rotational position of the lug stud openings (72) of tire (70) may be determined relative to the center of tire (70).

Unit (60) may utilize AI/computer vision to determine the rotational positions of second hub assembly (80) and first tire (70) based on images obtained from camera (14, 16, 262, 564) and data obtained from lidar assemblies (260, 562). Unit (60) may locate the rotational positions based on bounded box coordinates and the location of camera (14, 16, 262, 564) used to obtain images of the second hub assembly (80) and first tire (70).

Once unit (60) determines the rotational positions of the second hub assembly (80) and the first tire (70), unit (60) may determine how much first tire (70) needs to be rotated in order to rotationally align lug stud openings (72) with lug suds (LS). Then, as shown in step (660), unit (60) may then instruct drive roller assembly (520) to rotate tire (70) in accordance with the description above until lug stud openings (72) are aligned with lug suds (LS) (similar to that shown between FIGS. 24D-24E). As shown in step (661), unit (60) may confirm rotational alignment of first tire (70) with second hub assembly (80) utilizing camera (262). If unit (60) does not confirm rotational alignment within a specified tolerance, robot assembly (10) may return to step (658).

If unit (60) does confirm rotational alignment within the specified tolerance, as shown in step (662), unit (60) may instruct robot assembly (10) to move forward via mobile base assembly (100) until first tire (70) is suitably coupled with lug studs (LS) of second hub assembly (80). Unit (60) may measure resisting forces on robot assembly (10) in order to confirm first tire (70) is suitably resting on second hub assembly (80). For instance, unit (60) may measure the current flowing through DC motors (125) driving Mecanum wheel assemblies (130, 140). The current flowing through DC motors (125) may increase when robot assembly (10) is suitably pressing first tire (70) against second hub assembly (80). Unit (60) may also confirm first tire (70) is suitably resting on second hub assembly (80) via visual confirmation using torque gun camera (262).

Figure 30:
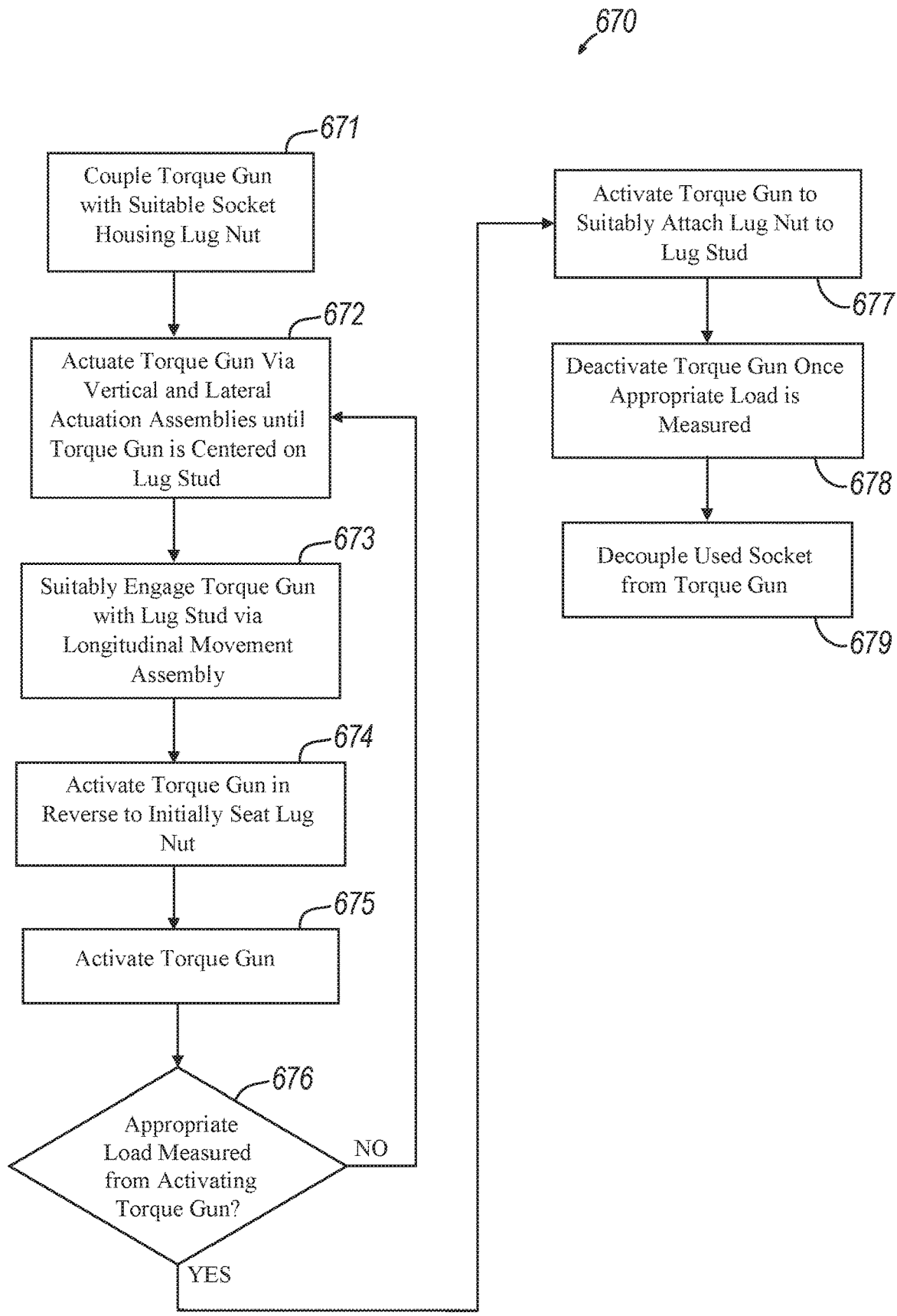
FIG. 30 is a flow chart of the automatic wheel changer robot assembly of FIG. 1 attaching lug nuts on a hub assembly after a wheel has been attached to the hub assembly.

Next, as shown in FIG. 25, robot assembly (10) may then move to step (670) to install lug nuts on first tire (70) and second hub assembly (80). FIG. 30 shows step (670) in greater detail. First, in step (671), unit (60) instructs torque gun actuation assembly (200) to couple driver (254) of torque gun (252) with a suitable socket (350) housing a lug nut that was previously removed from hub assembly (80) in accordance with the desorption herein. In some instances, all sockets (350) housed within a socket housing (312) are not used to remove a lug nut. Therefore, unit (60) may instruct torque gun actuation assembly (200) to cycle past a number of sockets (350) not housing lug nuts in order to finally couple with a socket (350) that houses a lug nut via coupling and decoupling driver (254) of torque gun (252) with empty sockets (350).

Once driver (254) is coupled with a suitable socket (350), as shown in step (672), unit (60) may instruct torque gun actuation assemblies (210, 230) to actuate torque gun (252) into alignment with a suitable lug stud (LS). Next, as shown in step (673), unit (60) may instruct torque gun actuation assembly (240) to move torque gun (252) such that socket (350) coupled to driver (254) suitably engages lug stud (LS). Next, as shown in step (674), unit (60) may activate torque gun (252) in the reverse direction (i.e., rotate driver (254) in a direction associated with lug nut disengaging from lug stud (LS)) in order to initially seat the lug nut on lug stud (LS).

Next, as shown in step (675) unit (60) may activate torque gun (252) in the direction associated with lug nut engaging lug stud (LS), thereby driving the lug nut along lug stud (LS) in accordance with the description herein.

Next, as shown in step (676), unit (60) measures the torque load experienced from activating torque gun (252). In particular, if the lug nut suitably engages lug stud (LS), activating torque gun (252) will impart a load on torque gun (252) that is greater than if lug nut is not suitably engaging lug stud (LS). Unit (60) may determine this load through any suitable means as would be apparent to one of skill in the art in view of the teachings herein. For instance, unit (60) may measure the current to torque gun (252) to estimate the torque load experienced by torque gun (252). If the measured load on torque gun (252) is not within the acceptable range, robot assembly (10) may return to step (672) and repeat those steps until the measured load on torque gun (252) is within the acceptable range. If the measured load on torque gun (252) is within the acceptable range, robot assembly (10) may move to step (677).

Next, as shown in step (677), unit (60) may activate torque gun (252) until the lug nut is suitably attached with lug stud (LS). It should be understood that at this moment, upper and lower wheel-clamping assemblies (400, 500) may have suitably reduced the clamping force on first tire (70) such that lug nuts may suitably couple first tire (70) on second wheel hub (80). Then, once the appropriate torque is achieved and measured, as shown in step (678), unit (60) may instruct torque gun (252) to deactivate. Next, as shown in step (679), unit (60) may then instruct torque gun actuation assembly (200) to decouple the used socket (350) from driver (254) of torque gun (252) in accordance with the description herein. Robot assembly (10) may then repeat step (670) until all lug nuts are suitably installed on second wheel hub (80) such that first tire (70) is suitably coupled with second wheel hub (80). It should be understood that torque gun (252) may initially install all lug nuts on their respective lug studs (LS) to a partial torque value, then re-torque lug nuts to a final torque value following a specific pattern, as determined by the vehicle profile.

Next, as shown in FIG. 25 and steps (702, 704, 706), robot assembly (10) may then suitably align second wheel (70) with first hub assembly (80), install second wheel at first hub assembly (80), and then install lug nuts on second wheel (70) at first hub assembly (80).

Step (702) involves robot assembly (10) moving back to the first general wheel location (34, 36, 38, 40) associated with the first hub assembly (80), and then aligning second window (15) grasping second tire (70) with first hub assembly (80). Additionally, rotation actuation assembly (202) of torque gun actuation assembly (200) may rotate torque gun (252) to align with second window (15) instead of first window (15). Robot assembly (10) may align second tire (70) with first hub assembly (80) in a substantially similar manner to that by which robot assembly (10) aligned first tire (70) with second hub assembly (80) as described above.

Similarly, steps (704, 706) may be substantially similar to steps (650, 670) described above, respectively, except instead of robot assembly (10) interacting with first tire (70) and second hub assembly (80), robot assembly (10) is interacting with second wheel (70) and first hub assembly (80).

Once robot assembly (10) completes step (706), thereby rotating a first pair of tires (70) on vehicle, robot assembly (10) may then rotate the second pair of tires (70) on the vehicle in accordance with the description above. In instances where there are more than two pairs of tires (70), robot assembly (10) may rotate all pairs of tires (70) in a specified (e.g., in manufacturer specifications or a vehicle profile) in accordance with the description herein. After completing the last rotation, robot assembly (10) may return to the home position and charging station (50) in order to charge batteries (110). While robot assembly (10) moves toward charging station (50), mobile base assembly (100) may activate lidar collision detectors (120) and utilize them in a similar manner as described above.

While robot assembly (10) is being used to rotate tires (70) on a raised vehicle, robot assembly (10) may be used to accomplish other tasks as would be apparent to one of skill in the art in view of the teachings herein. For instance, robot assembly (10) may be utilized to replace tires (70) on the vehicle or install new tires (70) on the vehicle.

Robot assembly (10) may load all or some information gathered during a tire rotation task (600), or any other suitable task, and upload the acquired data to external processing unit (20). External processing unit (20) may utilize this information in conjunction with artificial intelligence to analyze images and data of all tasks performed by robot assembly (10) in accordance with the description herein. External processing unit (20) may modify the software from which robot assemblies (10) operate utilizing artificial intelligence and data obtained. External processing unit (20) may then communicate these updates to all robot assemblies (10). Therefore, robot assembly (10) may modify its future performance of tasks based on previous performance of the same or similar tasks by the same robot assembly (10) or different robot assemblies (10).

Thus, one aspect of the invention is a robotic device that comprises one or more drive components, a torque gun, one or more visual sensors (such as one or more lidar assemblies) that produce visual data, and a controller programmed to accept input of the visual data from the visual sensors and responsively operate the drive components to bring the device into proximity with a tire or wheel, remove the tire or wheel from the vehicle using the torque gun and other components, and reattach the tire or wheel to the vehicle using the torque gun. Another aspect is such a robotic device that automatically rotates a vehicle's tires/wheels in a pattern, such as that specified by the vehicle's manufacturer.

II. Exemplary Embodiments

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A robotic device, comprising: (a) a drive assembly, comprising: a mobile base assembly configured to move the robotic device, (b) a torque gun actuation assembly operable to attach a lug nut to a lug stud or detach the lug nut from the lug stud while a first wheel is attached to the lug stud; (c) a sensor assembly; and (d) a controller in communication with the drive assembly, the torque gun actuation assembly, and the sensor assembly; wherein the controller is configured to generate a set of instructions based, at least in part, on information obtained from the sensor assembly; wherein the controller is configured to communicate the set of instructions to the drive assembly and the torque gun actuation assembly; and wherein the drive assembly and the torque gun actuation assembly are configured to utilize the set of instructions to cooperatively (i) remove the first wheel from a hub, or (ii) attach the first wheel to the hub.

Example 2

The robotic device of Example 1, wherein: the mobile base assembly comprises a frame and a wheel assembly, and the sensor assembly comprises at least one lidar detector fixed to the frame.

Example 3

The robotic device of Example 2, wherein the wheel assembly comprises a plurality of Mecanum wheel assemblies.

Example 4

The robotic device of Example 3, wherein each Mecanum wheel assembly of the plurality of Mecanum wheel assemblies comprises an individual DC motor.

Example 5

The robotic device of any one or more of Examples 1 through 4, wherein the torque gun actuation assembly comprises a torque gun.

Example 6

The robotic device of Example 5, wherein the torque gun actuation assembly is configured to rotate the torque gun between a first rotational position and a second rotational position, the torque gun faces toward a first wheel-clamping assembly in the first rotational position, and the torque gun faces toward a second wheel-clamping assembly in the second rotational position.

Example 7

The robotic device of Example 6, further comprising a socket holder assembly housing a plurality of sockets, and wherein the torque gun is configured to selectively couple and decouple with each socket of the plurality of sockets, one at a time.

Example 8

The robotic device of Example 7, wherein: the torque gun actuation assembly is configured to rotate the torque gun into a third rotational position, and the torque gun faces the socket holder assembly in the third rotational position.

Example 9

The robotic device of any one or more of Examples 5 through 8, wherein: the torque gun actuation assembly is configured to vertically and horizontally actuate the torque gun into alignment with a lug stud, and the torque gun actuation assembly is further configured to actuate the torque gun into operable engagement with the lug stud.

Example 10

The robotic device of any one or more of Examples 5 through 9, wherein the torque gun actuation assembly comprises a mount adapted to couple the torque gun with the torque gun actuation assembly.

Example 11

The robotic device of Example 10, wherein the sensor assembly comprises: a camera fixed to the mount, and a lidar assembly attached to the mount.

Example 12

The robotic device of Example 11, wherein the mount comprises a torque displacement assembly configured to longitudinally actuate the torque gun relative to the torque gun actuation assembly in response to attaching or detaching the lug nut to the lug stud.

Example 13

A robotic device, comprising: (a) one or more processing units; (b) a visual sensor configured to produce visual data and communicate the visual data to the one or more processing units; (c) an actuation assembly in communication with the one or more processing units, wherein the actuation assembly is configured to actuate the robotic device in proximity to a vehicle having a plurality of wheels, and (d) an engagement assembly in communication with the one or more processing units, wherein the engagement assembly comprises a wheel-clamping assembly that is configured to selectively grasp a first wheel and a second wheel at the same time, wherein the wheel-clamping assembly is configured to rotate the first wheel and the second wheel each about a respective central axis, and wherein the one or more processing units are programmed to accept the visual data from the visual sensor and responsively operate to drive the actuation assembly and the engagement assembly to remove each of the plurality of wheels from an original location on the vehicle and reattach each of the plurality of wheels at a different location on the vehicle.

Example 14

The robotic device of Example 13, further comprising an external casing defining a first window and a second window, wherein the first window is adjacent to a first portion of the wheel-clamping assembly configured to grasp the first wheel, and wherein the second window is adjacent to a second portion of the wheel-clamping assembly configured to grasp the second wheel.

Example 15

The robotic device of Example 14, wherein the visual sensor comprises a first camera and a second camera attached to the external casing.

Example 16

The robotic device of any one or more of Examples 14 through 15, wherein: the first window faces in a first direction, the second window faces in a second direction, and the first direction and the second direction are opposite of each other.

Example 17

The robotic device of any one or more of Examples 13 through 16, wherein: the wheel-clamping assembly comprises an upper wheel-clamping assembly and a lower wheel-clamping assembly, and the upper wheel-clamping assembly and the lower wheel-clamping assembly are configured to vertically actuate relative to each other between a disengaged position and an engaged position.

Example 18

The robotic device of Example 17, wherein: the upper wheel-clamping assembly comprises a clamping body and a plurality of idler rollers attached to the clamping body, and wherein the lower wheel-clamping assembly comprises a drive roller assembly configured to rotate the first wheel while the upper wheel-clamping assembly and the lower wheel-clamping assembly are in the engaged position.

Example 19

The robotic device of any or more of Examples 17 through 18, wherein the visual sensor comprises a lidar assembly and a camera attached to the lower wheel-clamping assembly.

Example 20

A robotic device, comprising: (a) a control unit; (b) a visual sensor configured to communicate visual data to the control unit; (c) an actuation assembly in communication with the control unit, wherein the actuation assembly is configured to actuate the robotic device in proximity to a vehicle, and (d) an engagement assembly in communication with the control unit, wherein the engagement assembly comprises: (i) a wheel-clamping assembly configured to selectively grasp a wheel, and (ii) a torqueing assembly configured to selectively attach and detach a plurality of lug nuts to a respective lug stud, wherein the control unit is programmed to accept the visual data from the visual sensor and responsively operate to drive the actuation assembly and the engagement assembly to: (i) actuate the robotic device into proximity to the vehicle, (ii) remove the wheel from a first location of the vehicle, and (iii) reattach the wheel to a second location of the vehicle.

We claim:

1. A robotic device, comprising:
   (a) a drive assembly, comprising a mobile base assembly configured to move the robotic device,
   (b) a torque gun actuation assembly operable to attach a lug nut to a lug stud or detach the lug nut from the lug stud while a first wheel is attached to the lug stud, wherein the torque gun actuation assembly comprises a torque gun and a mount configured to couple the torque gun with at least a portion of the torque gun actuation assembly, wherein the mount comprises a torque displacement assembly configured to longitudinally actuate the torque gun relative to the portion of the torque gun actuation assembly in response to attaching or detaching the lug nut to the lug stud;
   (c) a sensor assembly comprising a camera fixed to the mount and a lidar assembly attached to the mount; and
   (d) a controller in communication with the drive assembly, the torque gun actuation assembly, and the sensor assembly;
   wherein the controller is configured to generate a set of instructions based, at least in part, on information obtained from the sensor assembly;
   wherein the controller is configured to communicate the set of instructions to the drive assembly and the torque gun actuation assembly; and
   wherein the drive assembly and the torque gun actuation assembly are configured to utilize the set of instructions to cooperatively (i) remove the first wheel from a hub, or (ii) attach the first wheel to the hub.

2. The robotic device of claim 1, wherein:
   the mobile base assembly comprises a frame and a wheel assembly, and
   the sensor assembly comprises at least one lidar detector fixed to the frame.

3. The robotic device of claim 2, wherein the wheel assembly comprises a plurality of Mecanum wheel assemblies.

4. The robotic device of claim 3, wherein each Mecanum wheel assembly of the plurality of Mecanum wheel assemblies comprises an individual DC motor.

5. The robotic device of claim 1, wherein
   the torque gun actuation assembly is configured to rotate the torque gun between a first rotational position and a second rotational position,
   the torque gun faces toward a first wheel-clamping assembly in the first rotational position, and
   the torque gun faces toward a second wheel-clamping assembly in the second rotational position.

6. The robotic device of claim 5,
   further comprising a socket holder assembly housing a plurality of sockets, and
   wherein the torque gun is configured to selectively couple and decouple with each socket of the plurality of sockets, one at a time.

7. The robotic device of claim 6, wherein:
   the torque gun actuation assembly is configured to rotate the torque gun into a third rotational position, and
   the torque gun faces the socket holder assembly in the third rotational position.

8. The robotic device of claim 1, wherein:
   the torque gun actuation assembly is configured to vertically and horizontally actuate the torque gun into alignment with a lug stud, and
   the torque gun actuation assembly is further configured to actuate the torque gun into operable engagement with the lug stud.

9. A robotic device, comprising:
   (a) one or more processing units;
   (b) a visual sensor configured to produce visual data and communicate the visual data to the one or more processing units;
   (c) an actuation assembly in communication with the one or more processing units, wherein the actuation assembly is configured to actuate the robotic device in proximity to a vehicle having a plurality of wheels, and
   (d) an engagement assembly in communication with the one or more processing units, wherein the engagement assembly comprises a wheel-clamping assembly that is configured to selectively grasp a first wheel and a second wheel at the same time, wherein the wheel-clamping assembly is configured to rotate the first wheel and the second wheel each about a respective central axis, and wherein the one or more processing units are programmed to accept the visual data from the visual sensor and responsively operate to drive the actuation assembly and the engagement assembly to remove each of the plurality of wheels from an original location on the vehicle and reattach each of the plurality of wheels at a different location on the vehicle.

10. The robotic device of claim 9,
further comprising an external casing defining a first window and a second window,
wherein the first window is adjacent to a first portion of the wheel-clamping assembly configured to grasp the first wheel, and
wherein the second window is adjacent to a second portion of the wheel-clamping assembly configured to grasp the second wheel.

11. The robotic device of claim 10, wherein the visual sensor comprises a first camera and a second camera attached to the external casing.

12. The robotic device of claim 10, wherein:
the first window faces in a first direction,
the second window faces in a second direction, and
the first direction and the second direction are opposite of each other.

13. The robotic device of claim 9, wherein:
the wheel-clamping assembly comprises an upper wheel-clamping assembly and a lower wheel-clamping assembly, and
the upper wheel-clamping assembly and the lower wheel-clamping assembly are configured to vertically actuate relative to each other between a disengaged position and an engaged position.

14. The robotic device of claim 13, wherein:
the upper wheel-clamping assembly comprises a clamping body and a plurality of idler rollers attached to the clamping body, and
wherein the lower wheel-clamping assembly comprises a drive roller assembly configured to rotate the first wheel while the upper wheel-clamping assembly and the lower wheel-clamping assembly are in the engaged position.

15. The robotic device of claim 13, wherein the visual sensor comprises a lidar assembly and a camera attached to the lower wheel-clamping assembly.

16. A robotic device, comprising:
(a) a control unit;
(b) a visual sensor configured to communicate visual data to the control unit;
(c) an actuation assembly in communication with the control unit, wherein the actuation assembly is configured to actuate the robotic device in proximity to a vehicle; and
(d) an engagement assembly in communication with the control unit, wherein the engagement assembly comprises:
(i) a wheel-clamping assembly configured to selectively grasp a wheel, and
(ii) a torquing assembly configured to selectively attach and detach a plurality of lug nuts to a respective lug stud, wherein the torquing assembly comprises:
(A) a torque gun,
(B) a mount coupling the torque gun to the rest of the torquing assembly, and
(C) a torque displacement assembly configured to longitudinally actuate the torque gun relative to the rest of the torquing assembly in the process of attaching or detaching the lug nut to the lug stud.
wherein the control unit is programmed to accept the visual data from the visual sensor and responsively operate to drive the actuation assembly and the engagement assembly to:
(i) actuate the engagement assembly into proximity to the vehicle, and
(ii) remove the wheel from, or attach the wheel to, a first location of the vehicle.

\* \* \* \* \*